(12) United States Patent
Tsukagoshi

(10) Patent No.: US 10,547,857 B2
(45) Date of Patent: Jan. 28, 2020

(54) TRANSMISSION DEVICE, TRANSMISSION METHOD AND RECEPTION DEVICE

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 347 days.

(21) Appl. No.: 14/909,592

(22) PCT Filed: Oct. 1, 2014

(86) PCT No.: PCT/JP2014/076334
§ 371 (c)(1),
(2) Date: Feb. 2, 2016

(87) PCT Pub. No.: WO2015/053157
PCT Pub. Date: Apr. 16, 2015

(65) Prior Publication Data
US 2016/0212434 A1    Jul. 21, 2016

(30) Foreign Application Priority Data

Oct. 11, 2013   (JP) .................................. 2013-214235

(51) Int. Cl.
*H04N 19/30* (2014.01)
*H04N 19/136* (2014.01)
(Continued)

(52) U.S. Cl.
CPC .............. *H04N 19/30* (2014.11); *H04N 5/38* (2013.01); *H04N 5/44* (2013.01); *H04N 7/0127* (2013.01);
(Continued)

(58) Field of Classification Search
CPC .............................. H04N 19/30; H04N 19/31
(Continued)

(56) References Cited

U.S. PATENT DOCUMENTS 6,111,610 A     8/2000  Faroudja
7,852,919 B2 * 12/2010  Crinon .................. H04N 19/44
                                              348/305
(Continued)

FOREIGN PATENT DOCUMENTS

JP     11-243507 A    9/1999
JP    2004-180290 A   6/2004
(Continued)

OTHER PUBLICATIONS

Extended European Search Report of EP Patent Application No. 14851673.5, dated Jul. 10, 2017, 14 pages.

(Continued)

*Primary Examiner* — Jeremiah C Hallenbeck-Huber
(74) *Attorney, Agent, or Firm* — Chip Law Group

(57) ABSTRACT

When a switching portion at which a sequence of video streams to be transmitted is switched from a first sequence to a second sequence having a different frame rate from the first sequence is provided, display control information is inserted into at least encoded image data of a picture corresponding to the switching portion or a packet containing the encoded image data. A reception side performs display control of pictures using the display control information and implements an excellent display.

15 Claims, 40 Drawing Sheets

(51) Int. Cl.
H04N 19/169 (2014.01)
H04N 19/44 (2014.01)
H04N 5/38 (2006.01)
H04N 5/44 (2011.01)
H04N 7/01 (2006.01)

(52) U.S. Cl.
CPC ......... H04N 19/136 (2014.11); H04N 19/188 (2014.11); H04N 19/44 (2014.11)

(58) Field of Classification Search
USPC .................................................. 375/240.12
See application file for complete search history.

(56) References Cited

U.S. PATENT DOCUMENTS

| | | | |
|---|---|---|---|
| 2008/0253466 A1* | 10/2008 | Fu | H04N 21/2389 375/240.26 |
| 2009/0003439 A1* | 1/2009 | Wang | H04N 19/70 375/240.08 |
| 2012/0287987 A1 | 11/2012 | Budagavi et al. | |
| 2012/0293618 A1* | 11/2012 | Tsukagoshi | H04N 13/0059 348/43 |
| 2013/0170561 A1* | 7/2013 | Hannuksela | H04N 21/23424 375/240.25 |
| 2013/0208792 A1* | 8/2013 | He | H04N 19/00569 375/240.12 |
| 2013/0315315 A1* | 11/2013 | Wahadaniah | H04N 19/70 375/240.16 |
| 2014/0092953 A1* | 4/2014 | Deshpande | H04N 19/31 375/240.01 |
| 2014/0098868 A1* | 4/2014 | Wang | H04N 19/70 375/240.13 |

FOREIGN PATENT DOCUMENTS

| | | |
|---|---|---|
| JP | 2008-245325 A | 10/2008 |
| JP | 2010-074545 A | 4/2010 |
| JP | 2012-124896 A | 6/2012 |
| WO | 2012/023281 A1 | 2/2012 |

OTHER PUBLICATIONS

Haque, et al., "On HEVC Descriptors for Temporal Sub-Streams with Multiple PIDs in a MPEG-2 Transport Stream", International Organisation for Standardisation Organisation Internationale De Normalisation, ISO/IEC JTC1/SC29/WG11, MPEG2012/m26187 Coding of Moving Pictures and Audio, Jul. 2012, 06 pages.

"Proposed Draft New Recommendation J.h-dpi, Seamless Splicing for Heterogeneous MPEG-2/H.264 Bitstreams", International Telecommunication Union, COM 9—C 104—E, Oct. 2007, 10 pages.

Grüneberg, et al., "Text of ISO/IEC 13818-1: 2013 / Final Draft Amendment 3—Transport of HEVC video over MPEG-2 Systems", International Organisation for Standardization Organisation Internationale De Normalisation, ISO/IEC JTC1/SC29AVG11, MPEG105/N13656, Coding of Moving Pictures and Audio, Jul. 2013, 18 pages.

Coding Results for Mixed-Rate Progressive Content Frame Sequence With Additional Metadata vs. Field Sequence, Joint Collaborative Team on Video Coding (JCT-VC) of ITU-T SG 16 WP 3 and ISO/IEC JTC 1/SC 29/WG 11, MPEG105/N13656, 11th Meeting: Shanghai, CN, Oct. 10-19, 2012, 04 pages.

Sjöberg, et al., "Overview of HEVC High-level Syntax and Reference Picture Management", IEEE, 2012, 14 pages.

Gary J. Sullivan, Jens-Rainer Ohm, Woo-Jin Han, Thomas Wiegand, "Overview of the High Efficiency Video Coding (HEVC) Standard", IEEE Transactions on Circuits and Systems for Video Technology, vol. 22, No. 12, pp. 1649-1668, Dec. 2012.

Haque, et al., "On HEVC Descriptors for Temporal sub-streams with a Single PID in a MPEG2 Transport Stream", MPEG2012/m26187, Meeting, Stockholm, ISO/IEC JTC1/SC29/WG11, Jul. 16, 2012, 06 pages.

"Proposed Draft New Recommendation J.h-dpi, Seamless Splicing for Heterogeneous MPEG-2/H.264 Bitstreams", International Telecommunication Union, COM 9—C 104—E, MPEG, Oct. 2007, 10 pages.

Gruneberg, et al., "Text of ISO/IEC 13818-1: 2013 / Final Draft Amendment 3—Transport of HEVC Video Over MPEG-2 Systems", ISOAEC JTC1/SC29AVG11 MPEG105/N13656, Vienna, Austria, Jul. 2013.

Bar-Nir, et al., "Coding Results for Mixed-Rate Progressive Content Frame Sequence with Additional Metadata Vs. Field Sequence", Joint Collaborative Team on Video Coding (JCT-VC) of ITU-T SG 16 WP 3 and ISO/IEC JTC 1/SC29/WG 11, JCTVC-K0165, 11th Meeting: Shanghai, CN, Oct. 10-19, 2012 04 pages.

Sjoberg, et al., "Overview of HEVC High-Level Syntax and Reference Picture Management", IEEE Transactions on Circuits and Systems for Video Technology, vol. 22, Issue 12, Dec. 2012, pp. 1858-1870.

Office Action for EP Patent Application No. 148516735, dated Mar. 23, 2018, 10 pages.

Office Action for JP Patent Application No. 2015-541544, dated Nov. 13, 2018, 4 pages of Office Action and 3 pages of English Translation.

Kazushi Sato, "On Inter-Layer Prediction Enabling/Disabling for HEVC Scalable Extensions", Joint Collaborative Team on Video Coding (JCT-VC) of ITU-T SG 16 WP3 and ISO/IEC JTC1/ SC 29/WG11, 11th meeting Shanghai, JCTVC-K0175r1, Oct. 10-19, 2012, 06 pages.

Extended European Search Report of EP Application No. 19190982. 9, dated Sep. 18, 2019, 13 pages.

Haque, et al., "On HEVC descriptors for Temporal sub-streams with multiple PIDs in a MPEG-2 Transport Stream", Sony Electronics, Inc. and Sony Corp., International Organisation for Standardisation, ISO/IEC JTC1/SC29/WG11, Stockholm, Sweden, Jul. 2012, 6 pages.

"Proposed draft new Recommendation J.h-dpi, Seamless splicing for heterogeneous MPEG-2/H.264 bitstreams", <KDDI Corporation, International Telecommunication Union (ITU), XP030003547, Oct. 2007, 10 pages.

Gruneberg, et al., "Text of ISO/IEC 13818-1: 2013 / Final Draft Amendment 3—Transport of HEVC video over MPEG-2 Systems", Systems, International Organisation for Standardisation, ISO/IEC JTC1/SC29/WG11 MPEG105/N13656, Vienna, Austria, Jul. 2013, 18 pages.

Bar-Nir, et al, "Coding results for mixed-rate progressive content frame sequence with additional metadata vs. Held sequence", Harmonic Inc. and Ambarella, Joint Collaborative Team on Video Coding (JCT-VC) of ITU-T SG16 WP3 and ISO/IEC JTC1/SC29/WG11, 11th meeting, Shanghai, CN, Oct. 10-19, 2012, 4 pages.

Sjoberg, et al., "Overview of HEVC High-Level Syntax and Reference Picture Management", Transactions on Circuits and Systems for Video Technology, IEEE, vol. 22, No. 12, Oct. 5, 2012, pp. 1858-1870.

\* cited by examiner

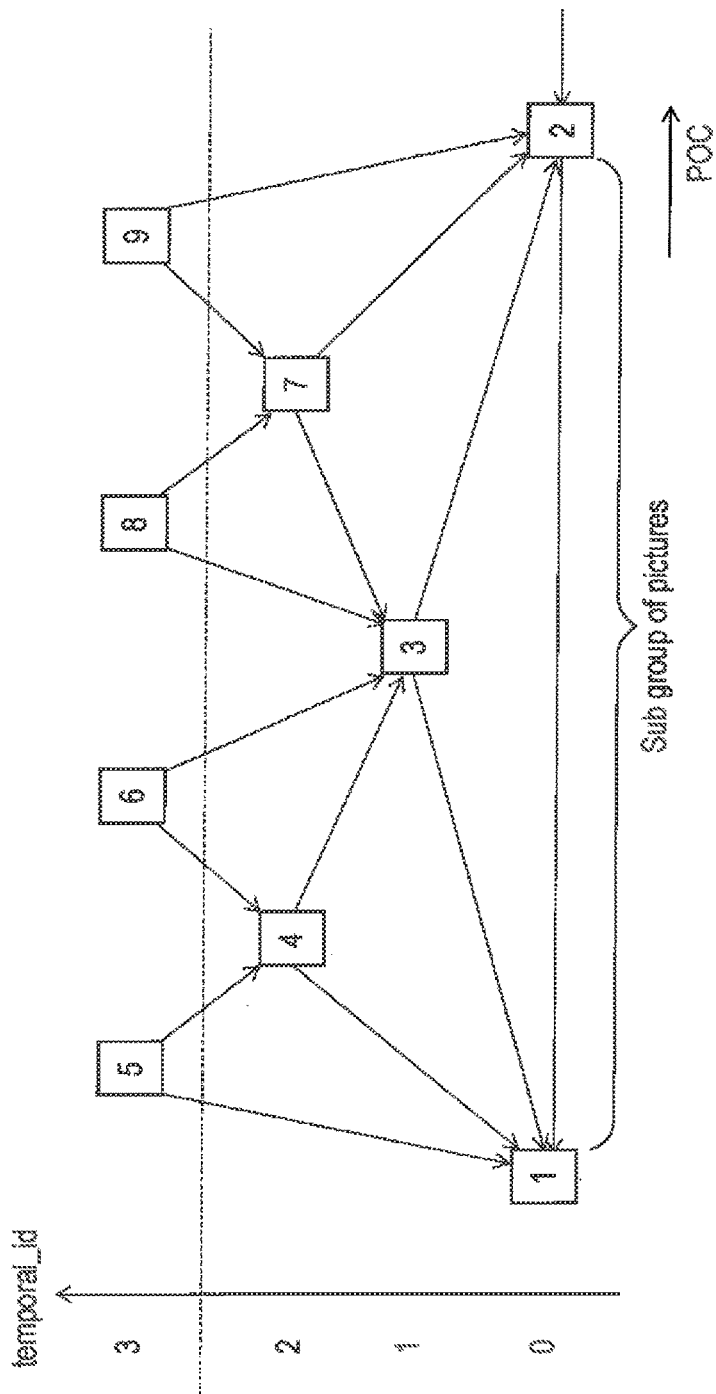

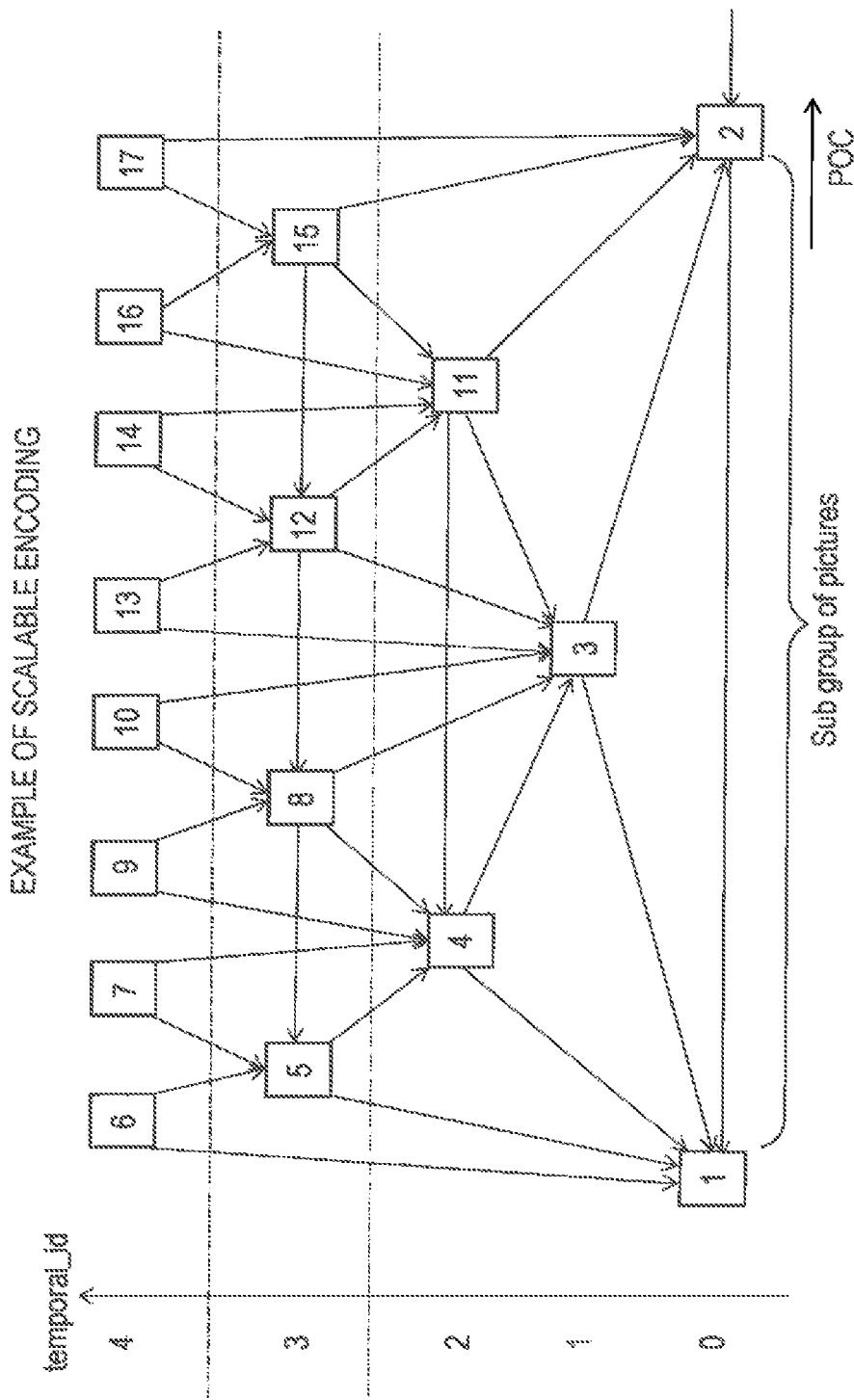

FIG. 5

(a)
```
nal_unit_header() {                    Descriptor
        forbidden_zero_bit              f(1)
        nal_unit_type                   u(6)
        nuh_layer_id                    u(6)
        nuh_temporal_id_plus1           u(3)
}
```

(b)
Semantics

Forbidden_zero_bit    (1bit)
   0 IS MANDATORY.
Nal_unit_type    (6bits)
   VALUE IS DECIDED FOR EACH OF FOLLOWING NALunits.

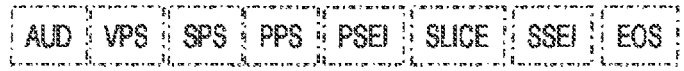

Nuh_layer_id    (6bits)
   0 IS ASSUMED.
Nuh_temporal_id_plus1    (3bits)
   INDICATE temporal_id. HAVE VALUE (1 TO 7) OBTAINED BY ADDING 1.
   VALUE OF temporal_id IS 0 TO 6.

FIG. 6

FIRST Picture OF GOP 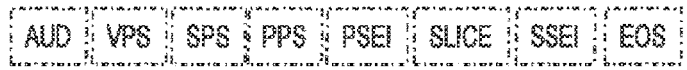

Pictures OTHER THAN FIRST Picture OF GOP 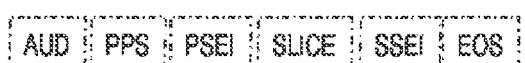

FIG. 15

Interface to Video stream Prefix_SEI

| Syntax | No. of Bits | Format |
|---|---|---|
| user_data_unregistered (size) { | | |
| uuid_iso_iec_11578 | 128 | uimsbf |
| for( i = 16; i < payloadSize; i++ ) | | |
| user_data_payload_byte | 8 | bslbf |
| } | | |

FIG. 16  Interface to Video stream Prefix_SEI

| Syntax | No. of Bits | Format |
|---|---|---|
| au_timing_control_information ( ) { | | |
| userdata_id | 16 | uimslbf |
| au_timing_control_information_length | 8 | bslbf |
| last_au_flag | 1 | bslbf |
| next_au_presentation_skip_flag | 1 | bslbf |
| current_au_repeat_flag | 1 | bslbf |
| offset_timing_control_flag | 1 | bslbf |
| if ( current_au_repeat_flag) { | | |
| repeat_type | 4 | uimslbf |
| } | | |
| else | | |
| reserved | 4 | 0xf |
| if (offset_timing_control_flag) { | | |
| offset_to_cpb_removal_delay | 24 | tcimslbf |
| offset_to_dpb_output_delay | 24 | tcimslbf |
| } | | |
| } | | |

FIG. 17

```
semantics
userdata_id (16 bits)
    INCLUDE ID OF PREDETERMINED USER DATA THEREIN.
au_timing_control_information_length (8bits)
    INDICATE BYTE NUMBER (COUNT FROM PRESENT ELEMENT TO NEXT ELEMENT) OF "au_timing_control_information".
last_au_flag (1bit)
    INDICATE THAT CURRENT au IS LAST access unit OF coded video sequence.
        1       au IS LAST au
        0       au IS NOT LAST au
next_au_presentation_skip_flag (1bit)
        1       DISPLAY OF SUBSEQUENT AU IS SKIPPED UNTIL DISPLAY PERIOD OF TIME OF CURRENT AU ENDS.
        0       DISPLAY OF SUBSEQUENT AU IS NOT SKIPPED. (DECODED IMAGE IS DISPLAYED AT DISPLAY
                TIMING DESIGNATED BY STREAM).
current_au_repeat_flag (1bit)
        1       au TO BE DISPLAYED AT NEXT timing grid IS REPLACED BY REPEATING DISPLAY OF CURRENT au.
        0       NEXT AU IS DISPLAYED AT DISPLAY TIMING DESIGNATED BY STREAM.
repeat_type (4bits)
                INDICATE NUMBER OF repeat OF DISPLAY OF CURRENT au.
        0000    reserved
        0001    NUMBER OF REPETITIONS IS 1
        0010    NUMBER OF REPETITIONS IS 2
        0011    NUMBER OF REPETITIONS IS 3
        others  reserved
offset_timing_control_flag (1bit)
        1       "offset_to_cpb_removal_delay" AND "offset_to_dpb_output_delay" ARE TRANSMITTED.
        0       "offset_to_cpb_removal_delay" AND "offset_to_dpb_output_delay" ARE NOT TRANSMITTED.
offset_to_cpb_removal_delay (24bits)
        DIFFERENCE VALUE WITH "cpb_removal_delay" OF CORRESPONDING picture
offset_to_dpb_output_delay (24bits)
        DIFFERENCE VALUE WITH "dpb_output_delay" OF CORRESPONDING picture
```

| Syntax | No. of Bits | Format |
|---|---|---|
| pes_extension_field_data () { | | |
|   start_sync_byte | 8 | bslbf |
|   extension_field_type | 8 | bslbf |
|   reserved | 4 | 0xf |
|   maximum_temporal_layer_minus1 | 4 | bslbf |
|   offset_timestamp_information () | | |
|   au_presentation_control() | | |
| } | | |

(b)

semantics start_sync_byte (8bits)
  CODE VALUE INDICATING START OF extension field
extension_field_type (8bits)
  0x02  INDICATE THAT "offset_timestamp_information ()" AND "au_presentation_control ()" ARE SUPPLIED.
  others  reserved
maximum_temporal_layer_minus1 (4bits)  VALUE OBTAINED BY SUBTRACTING 1 FROM MAXIMUM VALUE OF "temporal_layer_id" IN ALL OF PLURALITY OF sub-streams CONFIGURING SERVICE

| Syntax | No. of Bits | Format |
|---|---|---|
| offset_timestamp_information () { | | |
| reserved | 8 | 0xff |
| offset_to_DTS | 24 | umsbf |
| offset_to_PTS | 24 | umsbf |
| } | | |

(b)

semantics offset_to_DTS (24bits)
    INDICATE OFFSET DIFFERENCE VALUE (WITH 90kHz UNIT CODE) FROM DTS ATTACHED TO PES header.
offset_to_PTS (24bits)
    INDICATE OFFSET DIFFERENCE VALUE (WITH 90kHz UNIT CODE) FROM PTS ATTACHED TO PES header.

FIG. 30

| | | |
|---|---|---|
| au_presentation_control() { | | |
| reserved | 1 | |
| last_au_flag | 1 | bslbf |
| next_au_presentation_skip_flag | 1 | bslbf |
| current_au_repeat_flag | 1 | bslbf |
| if ( current_au_repeat_flag ) { | | |
| repeat_type | 4 | uimsbf |
| } | | |
| else | | |
| reserved | 4 | 0xf |
| } | | |

FIG. 31

```
semantics
last_au_flag (1bit)
    INDICATE THAT CURRENT au IS LAST access unit OF coded video sequence.
    1       au IS LAST au
    0       au IS NOT LAST au
next_au_presentation_skip_flag (1bit)
    1       DISPLAY OF SUBSEQUENT AU IS SKIPPED UNTIL DISPLAY PERIOD OF TIME OF CURRENT AU ENDS.
    0       DISPLAY OF SUBSEQUENT AU IS NOT SKIPPED. (DECODED IMAGE IS DISPLAYED AT DISPLAY
            TIMING DESIGNATED BY STREAM).
current_au_repeat_flag (1bit)
    1       au TO BE DISPLAYED AT NEXT timing grid IS REPLACED BY REPEATING DISPLAY OF CURRENT AU.
    0       NEXT AU IS DISPLAYED AT DISPLAY TIMING DESIGNATED BY STREAM.
repeat_type (4bits)    INDICATES NUMBER OF repeat OF DISPLAY OF CURRENT au.
    0000    reserved
    0001    NUMBER OF REPETITIONS IS 1
    0010    NUMBER OF REPETITIONS IS 2
    0011    NUMBER OF REPETITIONS IS 3
    others  reserved
```

FIG. 32

| Syntax | No. of Bits | Format |
|---|---|---|
| Temporal_control_descriptor ( ) { | | |
| Temporal_control_descriptor_tag | 8 | uimsbf |
| Temporal_control_descriptor_length | 8 | uimsbf |
| au_timing_control_SEI_existed | 1 | bslbf |
| reserved | 7 | 0x7 |
| } | | |

FIG. 33

| | | |
|---|---|---|
| HEVC_descriptor() { | | |
| descriptor_tag | 8 | uimsbf |
| descriptor_length | 8 | uimsbf |
| profile_space | 2 | uimsbf |
| tier_flag | 1 | bslbf |
| profile_idc | 5 | uimsbf |
| reserved_zero_16bits | 16 | bslbf |
| level_idc | 8 | uimsbf |
| profile_compatibility_indication | 32 | bslbf |
| temporal_layer_subset_flag | 1 | bslbf |
| HEVC_still_present_flag | 1 | bslbf |
| HEVC_24hr_picture_present_flag | 1 | bslbf |
| frame_packing_arrangement_SEI_present_flag | 1 | bslbf |
| reserved | 4 | bslbf |
| if ( temporal_layer_subset_flag == '1' ) { | | |
| temporal_id_min | 3 | uimsbf |
| reserved | 5 | bslbf |
| temporal_id_max | 3 | uimsbf |
| reserved | 5 | bslbf |
| } | | |
| } | | |

# TRANSMISSION DEVICE, TRANSMISSION METHOD AND RECEPTION DEVICE

TECHNICAL FIELD

The present technology relates to a transmission device, a transmission method, and a reception device. More particularly, the present technology relates to a transmission device that performs scalable encoding on image data of pictures configuring moving image data and transmits encoded image data and the like.

BACKGROUND ART

When compressed moving image services are provided through broadcasting or on a network, an upper limit of a reproducible frame frequency is restricted according to decoding capabilities of receivers. Thus, at a service provision side, it is necessary to restrict its service to services of a low frame frequency or provide services of a plurality of high and low frame frequencies at the same time in view of the reproduction capabilities of receivers which are in widespread use.

In order to support the services of the high frame frequency, the cost of the receivers increases, and it is an obstructive factor in an early spread. In the early stages, only cheap receivers dedicated for the services of the low frame frequency have been spread, and if the service provision side starts services of the high frame frequency in the future, it is difficult to view them without a new receiver, and it is an obstructive factor in distributing new services.

For example, temporal scalability performed by performing scalable encoding on image data of pictures configuring moving image data in H.265/High Efficiency Video Coding (HEVC) has been proposed (see Non Patent Document 1). A reception side can identify a layer of each picture based on a temporal ID (temporal_id) inserted into a header of a Network Abstraction Layer (NAL) unit and perform selective decoding of up to a layer corresponding to a decoding capability.

CITATION LIST

Non Patent Document

Non Patent Document 1: Gary J. Sullivan, Jens-Rainer Ohm, Woo-Jin Han, Thomas Wiegand, "Overview of the High Efficiency Video Coding (HEVC) Standard," IEEE TRANSACTIONS ON CIRCUITS AND SYSTEMS FORVIDEO TECNOROGY, VOL. 22, NO. 12, pp. 1649-1668, December 2012

SUMMARY OF THE INVENTION

Problems to be Solved by the Invention

It is an object of the present technology to enable the reception side to perform an excellent display even when the frame rate dynamically changes.

Solutions to Problems

The concept of the present technology lies in
a transmission device, including:
an image encoding unit that classifies image data of pictures configuring moving image data into a plurality of layers, encodes the image data of the pictures of each of the classified layers, divides the plurality of layers into a predetermined number of layer sets, and generates the predetermined number of video streams including the encoded image data of the pictures of divided layer sets, respectively, the image encoding unit performing the encoding so that at least decoding intervals of the encoded image data of the pictures of the lowest layer set are predetermined intervals;

a transmitting unit that transmits a container of a predetermined format including at least a video stream having the encoded image data of the pictures of the lowest layer set among the predetermined number of generated video streams; and an information inserting unit that, when a switching portion at which a sequence of the video streams to be transmitted is switched from a first sequence to a second sequence having a different frame rate from the first sequence is provided, inserts display control information into at least encoded image data of a picture corresponding to the switching portion or a packet containing the encoded image data.

In the present technology, the image encoding unit encodes image data of pictures configuring moving image data, and generates a predetermined number of video streams. In this case, the image data of the pictures configuring the moving image data is classified into a plurality of layers and encoded. Then, the plurality of layers are divided into a predetermined number of layer sets, and a predetermined number of video streams including the encoded image data of the pictures of the divided layer sets.

The image encoding unit performs the encoding so that at least decoding intervals of the encoded image data of the pictures of the lowest layer set are predetermined intervals for example, equal intervals. As a result, for example, when the reception side has a decoding capability capable of processing encoded image data of pictures of a plurality of layers included in the lowest layer set, the reception side can consecutively perform the decoding process of the encoded image data of each picture naturally.

For example, the image encoding unit may perform the encoding so that decoding timings of the encoded image data of the pictures of a layer set positioned to be higher than the lowest layer set are intermediate timings of decoding timings of the encoded image data of the pictures of all layer sets positioned to be lower than the layer set. The intermediate timing mentioned herein need not be necessarily a median timing and means a timing that does not overlap with decoding timings at the lower side. As a result, for example, when the reception side has a capability of decoding encoded image data of pictures of a layer set positioned to be higher than the lowest layer set as well as that of the lowest layer set, the reception side can sequentially perform the decoding process of each picture smoothly.

The transmitting unit transmits a container of a predetermined format including at least a video stream having the encoded image data of the pictures of the lowest layer set among the predetermined number of generated video streams. For example, the container may be a transport stream (MPEG-2 TS) employed in a digital broadcasting standard. Further, for example, the container may be a container having MP4 used in the Internet delivery or any other format.

When a switching portion at which a sequence of the video streams to be transmitted is switched from a first sequence to a second sequence having a different frame rate from the first sequence is provided, the information inserting unit inserts display control information into at least encoded image data of a picture corresponding to the switching portion or a packet containing the encoded image data. For example, the display control information may be information for performing control such that a display of a last picture of the first sequence is repeated by a predetermined number or for controlling a display period of time of the last picture of the first sequence such that a display of pictures of the second sequence is skipped.

Further, for example, the display control information may be display offset information for controlling a display timing of pictures of the second sequence. In this case, for example, the container may be a transport stream, and the information inserting unit may insert the display control information into an extension field of a PES packet. As a result, it is possible to control the reading of the image data of the pictures from the uncompressed data buffer, for example, using the display control information.

As described above, in the present technology, when the switching portion at which the sequence of video streams to be transmitted is switched from the first sequence to the second sequence having the different frame rate from the first sequence is provided, the display control information is inserted into at least encoded image data of a picture corresponding to the switching portion or a packet containing the encoded image data and transmitted. Thus, the reception side can control the reading of the image data of the pictures from the uncompressed data buffer, for example, based on the display control information and can perform an excellent display without incurring a display gap even when the frame rate changes dynamically.

In the present technology, for example, the information inserting unit may further insert identification information identifying a last picture of the first sequence into encoded image data of the last picture of the first sequence. As a result, when the switching portion at which the sequence of video streams to be transmitted is switched from the first sequence to the second sequence having the different frame rate from the first sequence is provided, the reception side can easily identify the last picture of the first sequence based on the identification information.

Further, in the present technology, for example, an identification information inserting unit that inserts identification information identifying whether the display control information gets inserted into the encoded image data or the packet containing the encoded image data into a layer of the container may be provided. For example, the container may be a transport stream, and the identification information inserting unit may insert the identification information into a video elementary stream loop arranged in association with each of the predetermined number of video streams under a program map table as a descriptor. In this case, at the reception side, it is possible to easily identify whether or not the display control information gets inserted into the encoded image data based on the identification information without performing the decoding process on the encoded image data.

Further, another concept of the present technology lies in a reception device including:

a receiving unit that receives at least a video stream having encoded image data of pictures of a lowest layer set among a predetermined number of video streams including encoded image data of pictures of layer sets, respectively, the predetermined number of video streams being obtained by classifying image data of pictures configuring moving image data into a plurality of layers, encoding the plurality of layers, and dividing the plurality of layers into the predetermined number of layer sets; and a processing unit that processes the received video stream, wherein at least the video stream having the encoded image data of the pictures of the lowest layer set among the predetermined number of video streams is encoded so that decoding intervals of the pictures are predetermined intervals, and when a switching portion at which a sequence of the received video stream is switched from a first sequence to a second sequence having a different frame rate from the first sequence is provided, display control information is inserted into at least encoded image data of a picture corresponding to the switching portion or a packet containing the encoded image data.

In the present technology, the receiving unit receives at least a video stream having encoded image data of pictures of a lowest layer set among a predetermined number of video streams including encoded image data of pictures of layer sets, respectively, the predetermined number of video streams being obtained by classifying image data of pictures configuring moving image data into a plurality of layers, encoding the plurality of layers, and dividing the plurality of layers into the predetermined number of layer sets. The processing unit processes the received video stream.

In this case, at least the video stream having the encoded image data of the pictures of the lowest layer set among the predetermined number of video streams is encoded so that decoding intervals of the pictures are predetermined intervals, for example, equal intervals. As a result, for example, when there is a decoding capability capable of processing encoded image data of pictures of a plurality of layers included in the lowest layer set, it is possible to consecutively perform the decoding process of the encoded image data of each picture naturally.

Further, in this case, when a switching portion at which a sequence of the received video stream is switched from a first sequence to a second sequence having a different frame rate from the first sequence is provided, display control information is inserted into at least encoded image data of a picture corresponding to the switching portion or a packet containing the encoded image data. Thus, for example, it is possible to control the reading of the image data of the pictures from the uncompressed data buffer based on the display control information and perform an excellent display without incurring a display gap even when the frame rate changes dynamically.

For example, the display control information may be information for performing control such that a display of a last picture of the first sequence is repeated by a predetermined number or for controlling a display period of time of the last picture of the first sequence such that a display of pictures of the second sequence is skipped. Further, for example, the display control information may be display offset information for controlling a display timing of pictures of the second sequence.

Further, another concept of the present technology lies in a reception device including:

a receiving unit that receives a container of a predetermined format including at least a video stream having encoded image data of pictures of a lowest layer set among a predetermined number of video streams including encoded image data of pictures of layer sets, respectively, the predetermined number of video streams being obtained by classifying image data of pictures configuring moving image data into a plurality of layers, encoding the plurality of layers, and dividing the plurality of layers into the predetermined number of layer sets, wherein at least the video stream having the encoded image data of the pictures of the lowest layer set among the predetermined number of video streams is encoded so that decoding intervals of the pictures are predetermined intervals, and when a switching portion at which a sequence of the received video stream is switched from a first sequence to a second sequence having a different frame rate from the first sequence is provided, display control information is inserted into at least encoded image data of a picture corresponding to the switching portion;

an image decoding processing unit that selectively decodes the encoded image data of the picture of a layer equal to or lower than a predetermined layer according to a decoding capability from the video stream included in the received container, takes image data of the pictures obtained by the decoding in a buffer, and reads and outputs the image data of the pictures at a predetermined timing; and a control unit that controls reading of images of the pictures from the buffer in the image decoding processing unit based on the display control information.

In the present technology, the receiving unit receives a container of a predetermined format. The container includes at least a video stream having encoded image data of pictures of a lowest layer set among a predetermined number of video streams including encoded image data of pictures of layer sets, respectively, the predetermined number of video streams being obtained by classifying image data of pictures configuring moving image data into a plurality of layers, encoding the plurality of layers, and dividing the plurality of layers into the predetermined number of layer sets.

In this case, at least the video stream having the encoded image data of the pictures of the lowest layer set among the predetermined number of video streams is encoded so that decoding intervals of the pictures are predetermined intervals, for example, equal intervals. As a result, for example, when there is a decoding capability capable of processing encoded image data of pictures of a plurality of layers included in the lowest layer set, it is possible to consecutively perform the decoding process of the encoded image data of each picture naturally.

The image decoding processing unit selectively decodes the encoded image data of the picture of a layer equal to or lower than a predetermined layer according to a decoding capability from the video stream included in the received container, takes image data of the pictures obtained by the decoding in a buffer, and reads and outputs the image data of the pictures at a predetermined timing. The control unit controls the reading based on the display control information.

For example, the display control information may be information for performing control such that a display of a last picture of the first sequence is repeated by a predetermined number or for controlling a display period of time of the last picture of the first sequence such that a display of pictures of the second sequence is skipped. Further, for example, the display control information may be display offset information for controlling a display timing of pictures of the second sequence.

As described above, in the present technology, when the image data of the pictures obtained by the decoding is taken in the buffer, and the image data of the pictures is read and output at a predetermined timing, the reading is controlled based on the display control information. Thus, it is possible to perform an excellent display without incurring a display gap, for example, even when the frame rate changes dynamically.

Further, the concept of the present technology lies in a reception device, including:

a receiving unit that receives a container of a predetermined format including at least a video stream having encoded image data of pictures of a lowest layer set among a predetermined number of video streams including encoded image data of pictures of layer sets, respectively, the predetermined number of video streams being obtained by classifying image data of pictures configuring moving image data into a plurality of layers, encoding the plurality of layers, and dividing the plurality of layers into the predetermined number of layer sets, at least the video stream having the encoded image data of the pictures of the lowest layer set among the predetermined number of video streams being encoded so that decoding intervals of the pictures are predetermined intervals;

a sequence switching detecting unit that detects a switching portion at which a sequence of the video stream is switched from a first sequence to a second sequence having a different frame rate from the first sequence based on the video stream included in the received container;

an image decoding processing unit that selectively decodes the encoded image data of the picture of a layer equal to or lower than a predetermined layer according to a decoding capability from the video stream included in the received container, takes image data of the pictures obtained by the decoding in a buffer, and reads and outputs the image data of the pictures at a predetermined timing; and a control unit that controls reading of images of the pictures from the buffer in the image decoding processing unit based on a detection output of the sequence switching detecting unit.

In the present technology, the receiving unit receives a container of a predetermined format. The container includes at least a video stream having encoded image data of pictures of a lowest layer set among a predetermined number of video streams including encoded image data of pictures of layer sets, respectively, the predetermined number of video streams being obtained by classifying image data of pictures configuring moving image data into a plurality of layers, encoding the plurality of layers, and dividing the plurality of layers into the predetermined number of layer sets.

In this case, at least the video stream having the encoded image data of the pictures of the lowest layer set among the predetermined number of video streams is encoded so that decoding intervals of the pictures are predetermined intervals, for example, equal intervals. As a result, for example, when there is a decoding capability capable of processing encoded image data of pictures of a plurality of layers included in the lowest layer set, it is possible to consecutively perform the decoding process of the encoded image data of each picture naturally.

The sequence switching detecting unit detects a switching portion at which a sequence of the video stream is switched from a first sequence to a second sequence having a different frame rate from the first sequence based on the video stream included in the received container. The image decoding processing unit selectively decodes the encoded image data of the picture of a layer equal to or lower than a predetermined layer according to a decoding capability from a predetermined number of video streams included in the received container, takes image data of the pictures obtained by the decoding in a buffer, and reads and outputs the image data of the pictures at a predetermined timing. The control unit controls the reading based on a detection output of the sequence switching detecting unit.

As described above, in the present technology, when the image data of the pictures obtained by the decoding is taken in the buffer, and the image data of the pictures is read and output at a predetermined timing, the reading is controlled based on the detection output of the sequence switching. Thus, it is possible to perform an excellent display without incurring a display gap, for example, even when the frame rate changes dynamically.

EFFECTS OF THE INVENTION

According to the present technology, the reception side can perform an excellent display even when the frame rate dynamically changes. The effects described herein are not necessarily limited, and any effect described in the present disclosure may be included.

BRIEF DESCRIPTION OF DRAWINGS

FIG. 3 is a diagram illustrating an example of scalable encoding performed by an encoder.

FIG. 4 is a diagram illustrating another example of scalable encoding performed by the encoder.

FIGS. 5(a) and 5(b) are diagrams illustrating an exemplary structure of a NAL unit header and content of main parameters in the exemplary structure.

FIG. 6 is a diagram for describing a configuration of encoded image data of each picture by HEVC.

FIG. 15 is a diagram illustrating an exemplary structure of an interface for inserting AU timing control information SEI.

FIG. 16 is a diagram illustrating an exemplary structure of the AU timing control information SEI.

FIG. 17 is a diagram illustrating content of main information in an exemplary structure of the AU timing control information SEI.

FIGS. 28(a) and 28(b) are diagrams illustrating an exemplary structure of PES extension field data and content of main information therein.

FIGS. 29(a) and 29(b) are diagrams illustrating an exemplary structure of offset time stamp information and content of main information therein.

FIG. 30 is a diagram illustrating an exemplary structure of an AU presentation control.

FIG. 31 is a diagram illustrating content of main information in the exemplary structure of the AU presentation control.

FIG. 32 is a diagram illustrating an exemplary structure of a temporal control descriptor.

FIG. 33 is a diagram illustrating an exemplary structure of a HEVC descriptor.

MODE FOR CARRYING OUT THE INVENTION

Hereinafter, modes (hereinafter, referred to as "embodiments") for carrying out the invention will be described. The description will proceed in the following order.

1. Embodiments
2. Modified examples

<1. Embodiments>

[Transceiving System]

Figure 1:
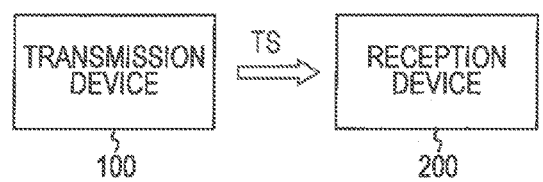
FIG. 1 is a block diagram illustrating an exemplary configuration of a transceiving system according to an embodiment.

FIG. 1 illustrates an exemplary configuration of a transceiving system 10 according to an embodiment. The transceiving system 10 includes a transmission device 100 and a reception device 200.

The transmission device 100 transmits a transport stream TS serving as a container through a broadcast wave. The transport stream TS includes at least a video stream having encoded image data of pictures of the lowest layer set among a predetermined number of video streams each of which has encoded image data of pictures of each layer set which is obtained such that image data of pictures configuring moving image data is classified into a plurality of layers and encoded, and the plurality of layers are divided into a predetermined number of layer sets. In this case, for example, encoding is performed according to H.264/AVC, H.265/HEVC, or the like so that a referenced picture belongs to its own layer and/or a layer lower than its own layer.

In this embodiment, when a plurality of layers are divided into a predetermined number of layer sets, a plurality of layers are included in the lowest layer set, and one layer is included in a layer set positioned to be higher than the lowest layer set. Through this division, for example, when the reception side has a decoding capability capable of processing encoded image data of pictures of a plurality of layers included in the lowest layer set, the reception side can select only the video stream having the encoded image data of the pictures of the lowest layer set, take the selected video stream in a buffer, and perform a decoding process.

Layer identification information identifying an associated layer is added to the encoded image data of the picture of each layer for each picture. In this embodiment, the layer identification information ("nuh_temporal_id_plus1" indicating temporal_id) is arranged in a header portion of a NAL unit (nal_unit) of each picture. As the layer identification information is added as described above, the reception side can identify a layer of each picture in the layer of the NAL unit and can selectively extract encoded image data of a layer equal to or lower than a predetermined layer and perform the decoding process.

In this embodiment, at least the video stream having the encoded image data of the pictures of the lowest layer set among a predetermined number of video streams is encoded so that decoding intervals of pictures are equal intervals. Through this encoding, when the reception side has a decoding capability capable of processing encoded image data of pictures of a plurality of layers included in the lowest layer set, the reception side can consecutively perform the decoding process of the encoded image data of each picture naturally.

In this embodiment, encoding is performed so that a decoding timing of the encoded image data of the pictures of the layer set positioned to be higher than the lowest layer set is an intermediate timing of decoding timings of encoded image data of pictures of all layer sets positioned to be lower than the layer set. The intermediate timing mentioned herein need not be a median timing of decoding timings of two pictures at the lower side and means a timing that does not overlap with decoding timings at the lower side. Therefore, in this case, for example, encoding in which decoding timings of two or more pictures of upper layers are between decoding timings of two pictures at the lower side is included as well. Through this encoding, when the reception side has a capability of decoding encoded image data of pictures of a layer set positioned to be higher than the lowest layer set as well as that of the lowest layer set, the reception side can sequentially perform the decoding process of each picture smoothly.

In this embodiment, when a switching portion at which a sequence of video streams to be transmitted is switched from a first sequence to a second sequence having a different frame rate from the first sequence is provided, display control information is inserted into at least encoded image data of a picture corresponding to the switching portion or a packet containing the encoded image data. The reception side can control reading of image data of each picture from an uncompressed data buffer based on the display control information and perform an excellent display without incurring a display gap even when the frame rate changes dynamically.

For example, the display control information is information for performing control such that, for example, a display of the last picture of the first sequence is repeated by a predetermined number or for controlling a display period of time of the last picture of the first sequence such that a display of pictures of the second sequence is skipped. Further, for example, the display control information is display offset information for controlling the display timing of pictures of the second sequence.

In this embodiment, identification information identifying the last picture of the first sequence is inserted into the encoded image data of the last picture of the first sequence. Through this identification information, the reception side can easily identify the last picture of the first sequence.

Further, in this embodiment, identification information indicating whether or not the display control information gets inserted into the encoded image data or the packet containing the encoded image data is inserted into the layer of the transport stream TS. This configuration information is inserted into video elementary stream loops arranged in association with a predetermined number of video streams under a program map table as a descriptor. Through this identification information, the reception side can easily identify whether or not the display control information gets inserted into the encoded image data without performing the decoding process on the encoded image data.

The reception device 200 receives the transport stream TS transmitted from the transmission device 100 through the broadcast wave. The reception device 200 selectively decodes encoded image data of a picture of the layer equal to or lower than a predetermined layer selected according to a decoding capability from the video streams included in the transport stream TS, and takes image data of each picture obtained by the decoding in a buffer (an uncompressed data buffer). Then, the reception device 200 reads the image data of each picture from the buffer at a predetermined timing, outputs the read image data, and performs image reproduction.

As described above, when a switching portion at which a sequence of video streams to be received is switched from the first sequence to the second sequence having the different frame rate from the first sequence is provided, the display control information is inserted into at least encoded image data of a picture corresponding to the switching portion or a packet containing the encoded image data. Based on the display control information, reading of an image of each picture from the buffer is controlled. Through this control, it is possible to perform an excellent display without incurring a display gap even when the frame rate changes dynamically.

[Configuration of Transmission Device]

Figure 2:
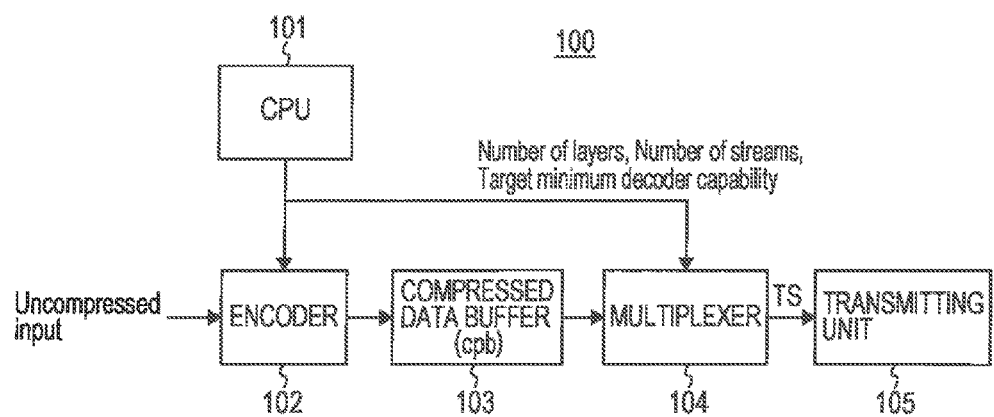
FIG. 2 is a block diagram illustrating an exemplary configuration of a transmission device.

FIG. 2 illustrates an exemplary configuration of the transmission device 100. The transmission device 100 includes a Central Processing Unit (CPU) 101, an encoder 102, a compressed data buffer (a coded picture buffer (cpb)) 103, a multiplexer 104, and a transmitting unit 105. The CPU 101 is a control unit and controls an operation of each unit of the transmission device 100.

The encoder 102 receives uncompressed moving image data, and performs scalable encoding. The encoder 102 classifies image data of pictures configuring the moving image data into a plurality of layers. Then, the encoder 102 encodes the image data of the picture of each classified layer, and generates a video stream including encoded image data of the picture of each layer. The encoder 102 performs, for example, encoding according to H.264/AVC, H.265/HEVC, or the like. At this time, the encoder 102 performs the encoding so that a picture (a referenced picture) to be referred to belongs to its own layer and/or a layer lower than its own layer.

FIG. 3 illustrates an example of scalable encoding performed by the encoder 102. In this example, image data is classified into four layers 0 to 3, and image data of pictures of each layer is encoded. A vertical axis indicates a layer. 0 to 3 are set as temporal_id (the layer identification information) arranged in the header portion of the NAL unit (nal_unit) configuring the encoded image data of the pictures of the layers 0 to 3. Meanwhile, a horizontal axis indicates a display order (a picture order of composition (POC)), and the left side is "before" in terms of a display time, and the right side is "after" in terms of a display time.

FIG. 4 illustrates an example of scalable encoding performed by the encoder 102. In this example, image data is classified into five layers 0 to 4, and image data of pictures of each layer is encoded. A vertical axis indicates a layer. 0 to 4 are set as temporal_id (the layer identification information) arranged in the header portion of the NAL unit (nal_unit) configuring the encoded image data of the pictures of the layers 0 to 4. Meanwhile, a horizontal axis indicates a display order (POC), and the left side is "before" in terms of a display time, and the right side is "after" in terms of a display time.

FIG. 5(a) illustrates an exemplary structure (syntax) of the NAL unit header, and FIG. 5(b) illustrates content (semantics) of a main parameter in the exemplary structure. A 1-bit field of "Forbidden_zero_bit" is mandatorily 0. A 6-bit field of "Nal_unit_type" indicates a NAL unit type. A 6-bit field of "Nuh_layer_id" is assumed to be 0. A 3-bit field of "Nuh_temporal_id_plus1" indicates temporal_id and has a value (1 to 7) obtained by adding 1.

Referring back to FIGS. 3 and 4, each of rectangular frames indicates a picture, a number indicates an order of an encoded picture, that is, an encoding order (a decoding order at the reception side). In the example of FIG. 3, a sub group of pictures is configured with 8 pictures "2" to "9," and "2" is a first picture of the sub group of pictures. "1" is a picture of a previous sub group of pictures. A group of pictures (GOP) is configured with several sub groups of pictures.

In the example of FIG. 4, a sub group of pictures is configured with 16 pictures "2" to "17,", "2" is a first picture of the sub group of pictures. "1" is a picture of a previous sub group of pictures. A GOP is configured with several sub groups of pictures.

As illustrated in FIG. 6, encoded image data of the first picture of the GOP is configured with NAL units of AUD, VPS, SPS, PPS, PSEI, SLICE, SSEI, and EOS. On the other hand, a picture other than the first picture of the GOP is configured with NAL units of AUD, PPS, PSEI, SLICE, SSEI, and EOS. The VPS can be transmitted once per sequence (GOP) together with the SPS, and the PPS can be transmitted for each picture.

Referring back to FIGS. 3 and 4, solid arrows indicate a reference relation of pictures in encoding. For example, the picture "2" is a P picture and encoded with reference to the picture "1." Further, the picture "3" is a B picture and encoded with reference to the pictures "1" and "2." Similarly, the other pictures are encoded with reference to a picture that is close in the display order. A picture of the highest layer is not referred to by other pictures.

The encoder 102 divides a plurality of layers into a predetermined number (2 or more) of layer sets, and generates a predetermined number of video streams each of which has encoded image data of pictures of each layer set. For example, the encoder 102 divides a plurality of layers such that the lowest layer set includes a plurality of layers, and the layer set positioned to be higher than the lowest layer set includes one layer.

For example, in the example of the scalable encoding of FIG. 3, the encoder 102 divides a plurality of layers into two layer sets such that the layers 0 to 2 belong to the lowest layer set, and the layer 3 belongs to the layer set positioned to be higher than the lowest layer set as delimited by a one-dot chain line. In this case, the encoder 102 generates two video streams (encoded streams) each of which includes the encoded image data of the pictures of each layer set.

Further, for example, in the example of the scalable encoding of FIG. 4, the encoder 102 divides a plurality of layers into three layer sets such that the layers 0 to 2 belong to the lowest layer set, the layer 3 belongs to the layer set positioned to be higher than the lowest layer set, and the layer 4 belongs to the layer set positioned to be higher than the layer set positioned to be higher than the lowest layer set as delimited by a two-dot chain line and a one-dot chain line. In this case, the encoder 102 generates three video streams (encoded streams) each of which includes the encoded image data of the pictures of each layer set.

In this case, the video stream having the encoded image data of the pictures of the lowest layer set is a base stream, and a stream type thereof is "0x24." The video stream including the encoded image data of the pictures of the layer set positioned to be higher than the lowest layer set is an enhancement stream, and a stream type thereof is "0x25" which is newly defined.

Further, when there are a plurality of enhancement streams, the stream type is also considered to be newly defined so that each of enhancement streams is identifiable instead of setting the stream types of all the enhancement streams to "0x25." For example, when there are two enhancement streams, the stream type of a first enhancement stream is set to "0x25," and the stream type of a second enhancement stream is set to "0x26."

The stream type configures identification information identifying whether each of a predetermined number of video streams is the base stream or the enhancement stream. The stream type is inserted into the layer of the transport stream TS. In other words, the stream type is inserted into the video elementary stream loop (Video ES loop) arranged in association with each of a predetermined number of video streams under the program map table (PMT).

The encoder 102 performs encoding such that at least the decoding intervals of the encoded image data of the pictures of the lowest layer set are equal intervals. FIG. 7(a) illustrates an example in which in the example of the scalable encoding of FIG. 3, each picture is encoded at a 120 Hz timing at which a temporal resolution is full, and a plurality of layers are divided into the two layer sets such that the layers 0 to 2 are classified as the lowest layer set configuring the base stream (B stream), and the layer 3 is classified as the layer set configuring the enhancement stream (E stream) positioned to be higher than the lowest layer set.

In this case, the temporal resolution of the pictures of the lowest layer set is 60 fps, but there are pictures that are consecutively encoded at a timing of 120 Hz, and it is difficult to consecutively perform a stable decoding process through a decoder having a decoding capability of 60 fps. For this reason, as illustrated in FIG. 7(b), an adjustment is performed so that an encoding timing of the pictures of the lowest layer set configuring the base stream is 60 Hz, and encoding is performed so that the decoding intervals of the encoded image data of the pictures of the lowest layer set are equal intervals. As a result, the decoder having the decoding capability of 60 fps can consecutively perform the stable decoding process on the encoded image data of the pictures of the lowest layer set configuring the base stream.

Figure 7:
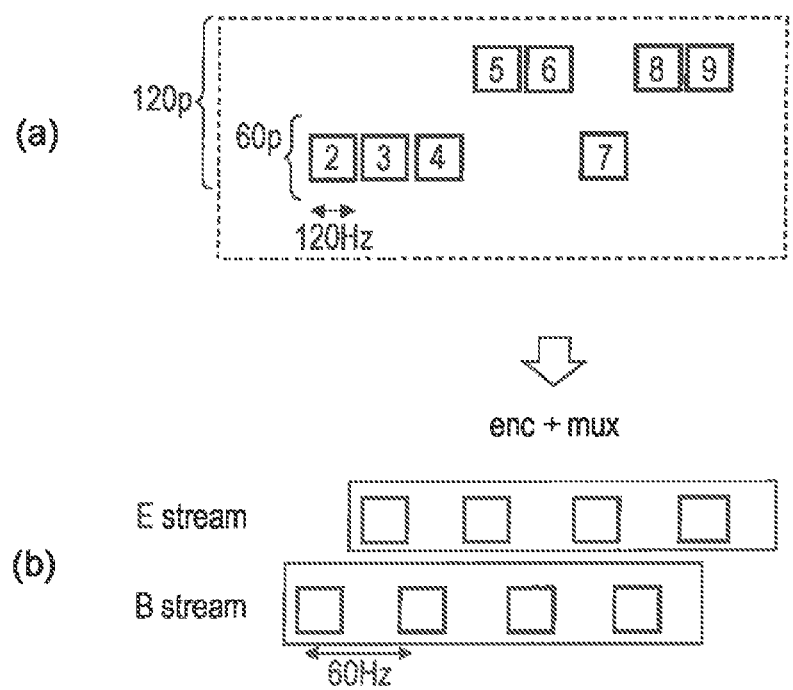
FIGS. 7(a) and 7(b) are diagrams for describing an encoding timing (a decoding timing) of pictures of a predetermined number of video streams (2 streams).

As illustrated in FIG. 7 (b), encoding is performed such that the encoding timings of the pictures of the layer set configuring the enhancement stream (E stream), that is, the decoding timings of the encoded image data of the pictures are intermediate timings of the decoding timings of the encoded image data of the pictures of the lowest layer set configuring the base stream (B stream). As a result, when the reception side has a capability of decoding the encoded image data of the pictures of the layer set configuring the enhancement stream in addition to that of the base stream, the reception side can sequentially perform the decoding process of each picture smoothly.

Figure 8:
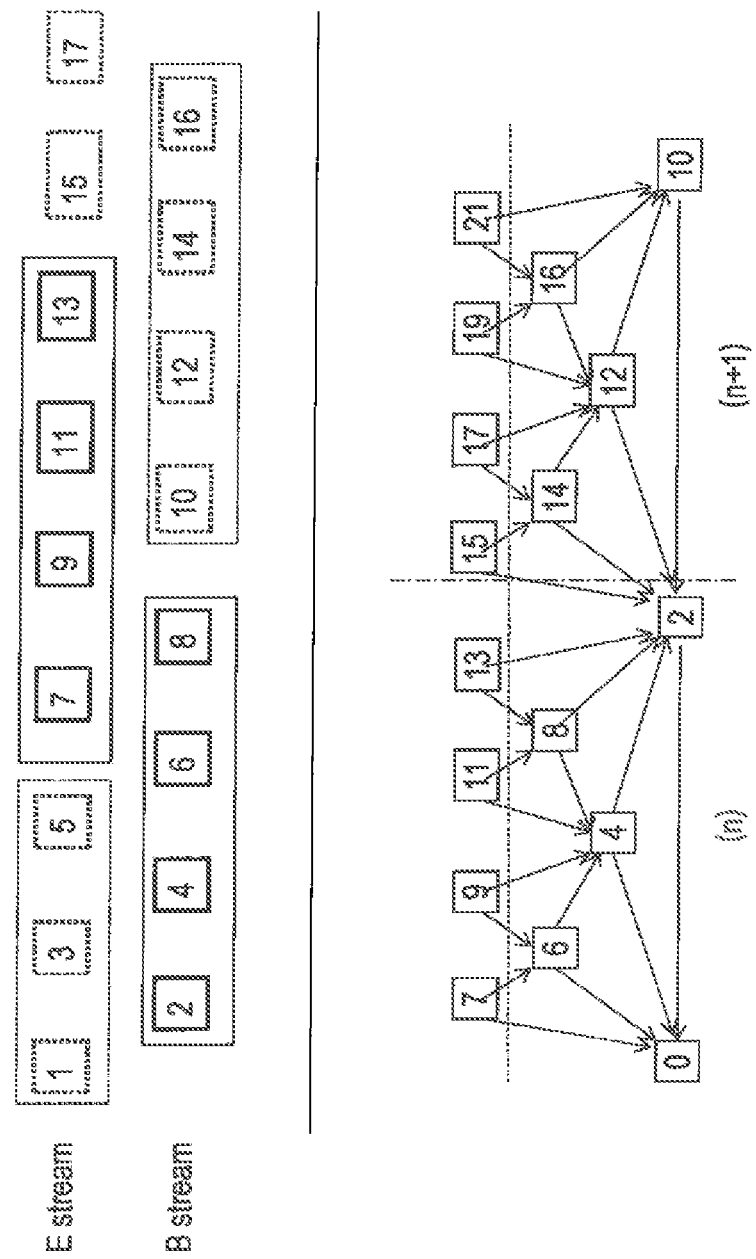
FIG. 8 is a diagram illustrating an example of the encoding timing (decoding timing) of each picture when two video streams, that is, a base stream and an enhancement stream are generated.

FIG. 8 illustrates an example of encoding timings (decoding timings) of the pictures when the two video streams, that is, the base stream (B stream) and the enhancement stream (E stream) are generated in the example of the scalable encoding of FIG. 3. In this example, a decoding delay of the enhancement stream is minimized with respect to the base stream.

In this example, the encoding timings of the pictures of the base stream (B stream) are even-numbered timings, and the encoding timing of the enhancement stream (E stream) is an odd-numbered timing. Further, in this example, the enhancement stream (E stream) is encoded immediately after the encoding order of the highest layer of the base stream (B stream). In other words, a picture "7" of the enhancement stream (E stream) is encoded immediately after a picture "6" of the base stream (B stream).

Figure 9:
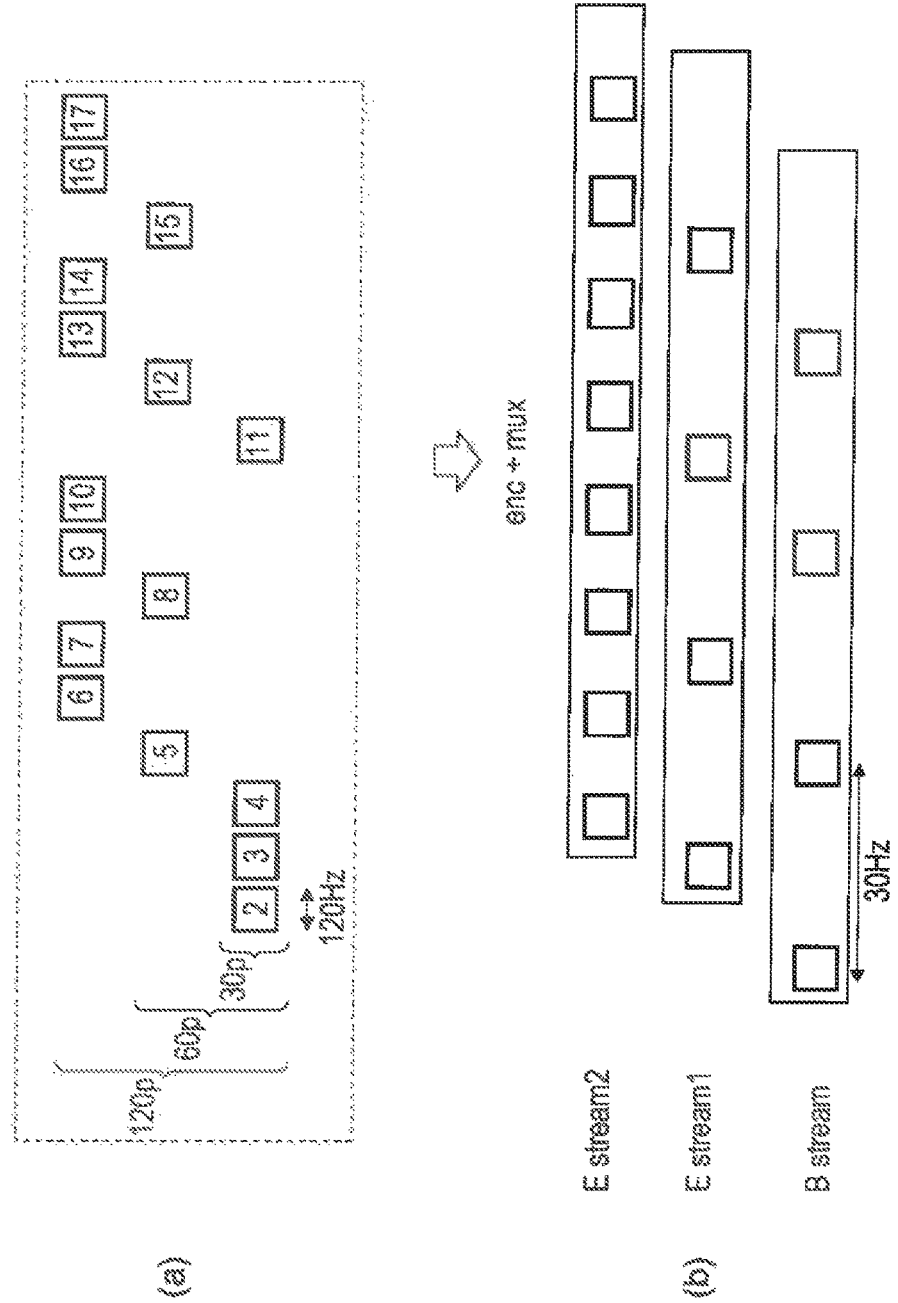
FIGS. 9(a) and 9(b) are diagrams for describing the encoding timing (a decoding timing) of pictures of a predetermined number of video streams (3 streams).

FIG. 9 (a) illustrates an example in which in the example of the scalable encoding of FIG. 4, each picture is encoded at a 120 Hz timing at which a temporal resolution is full, and a plurality of layers are divided into the three layer sets such that the layers 0 to 2 are classified as the lowest layer set configuring the base stream (B stream), the layer 3 is classified as the layer set configuring the enhancement stream (E stream 1) positioned to be higher than the lowest layer set, and the layer 4 is classified as the layer set configuring the enhancement stream (E stream 2) positioned to be higher than the layer set positioned to be higher than the lowest layer set.

In this case, the temporal resolution of the pictures of the lowest layer set is 30 fps, but there are pictures that are consecutively encoded at a timing of 120 Hz, and it is difficult to consecutively perform a stable decoding process through a decoder having a decoding capability of 30 fps. For this reason, as illustrated in FIG. 9(b), an adjustment is performed so that an encoding timing of the pictures of the lowest layer set configuring the base stream is 30 Hz, and encoding is performed so that the decoding intervals of the encoded image data of the pictures of the lowest layer set are equal intervals. As a result, the decoder having the decoding capability of 30 fps can consecutively perform the stable decoding process on the encoded image data of the pictures of the lowest layer set configuring the base stream.

As illustrated in FIG. 9 (b), encoding is performed such that the encoding timings of the pictures of the layer set configuring the enhancement stream (E stream 1), that is, the decoding timings of the encoded image data of the pictures are intermediate timings of the decoding timings of the encoded image data of the pictures of the lowest layer set configuring the base stream (B stream). Further, as illustrated in FIG. 9(b), encoding is performed such that the encoding timings of the pictures of the layer set configuring the enhancement stream (E stream 2), that is, the decoding timings of the encoded image data of the pictures are intermediate timings of the decoding timings of the encoded image data of the pictures of the layer set configuring the base stream (B stream) and the enhancement stream (E stream 1). As a result, when the reception side has a capability of decoding the encoded image data of the pictures of the layer set configuring the two enhancement streams in addition to that of the base stream, the reception side can sequentially perform the decoding process of each picture smoothly.

Figure 10:
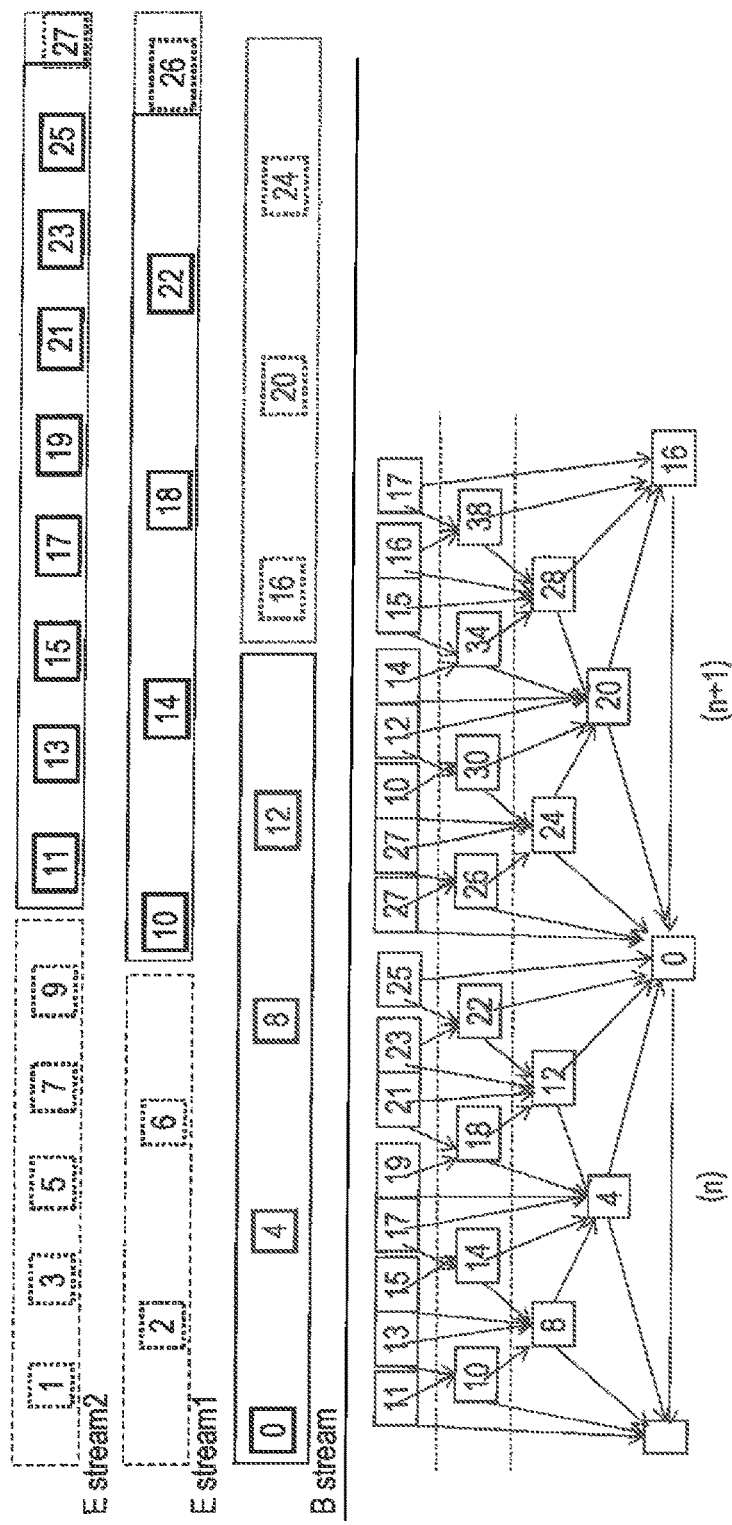
FIG. 10 is a diagram illustrating an example of the encoding timing (decoding timing) of each picture when three video streams, that is, a base stream and two enhancement streams are generated.

FIG. 10 illustrates an example of encoding timings (decoding timings) of the pictures when the three video streams, that is, the base stream (B stream), the enhancement stream (E stream 1), and the enhancement stream (E stream 2) are generated in the example of the scalable encoding of FIG. 4. In this example, a decoding delay of the enhancement stream is minimized with respect to the base stream.

In this example, the encoding timing of the pictures of the base stream (B stream) is a timing of a multiple of 4, and the encoding timing of the enhancement stream (E stream 1) is a timing of a multiple of 4 which is an intermediate timing of the encoding timings of the pictures of the base stream (B stream). Further, the encoding timing of the enhancement stream (E stream 1) is an odd-numbered timing.

In this example, the enhancement stream (E stream 1) is encoded immediately after the encoding order of the highest layer of the base stream (B stream). In other words, a picture "10" of the enhancement stream (E stream 1) is encoded immediately after a picture "8" of the base stream (B stream). Further, in this example, the enhancement stream (E stream 2) is encoded immediately after the encoding order of the enhancement stream (E stream 1). In other words, a picture "11" of the enhancement stream (E stream 2) is encoded immediately after a picture "10" of the enhancement stream (E stream 1).

When the switching portion at which a sequence of a video stream to be generated is switched from the first sequence to the second sequence having a different frame rate from the first sequence is provided, the encoder 102 inserts the display control information into at least encoded image data of the picture corresponding to the switching portion.

The sequence switching portion described above is provided, for example, when the frame rate of the uncompressed moving image data input to the encoder 102 is changed or when the frame rate of the uncompressed moving image data input to the encoder 102 is the same, but the frame rate is changed due to frame thinning or interpolation. Further, when the frame rate is changed by the sequence switching portion, the number of video streams generated by the encoder 102 may be the same or different.

Figure 11:
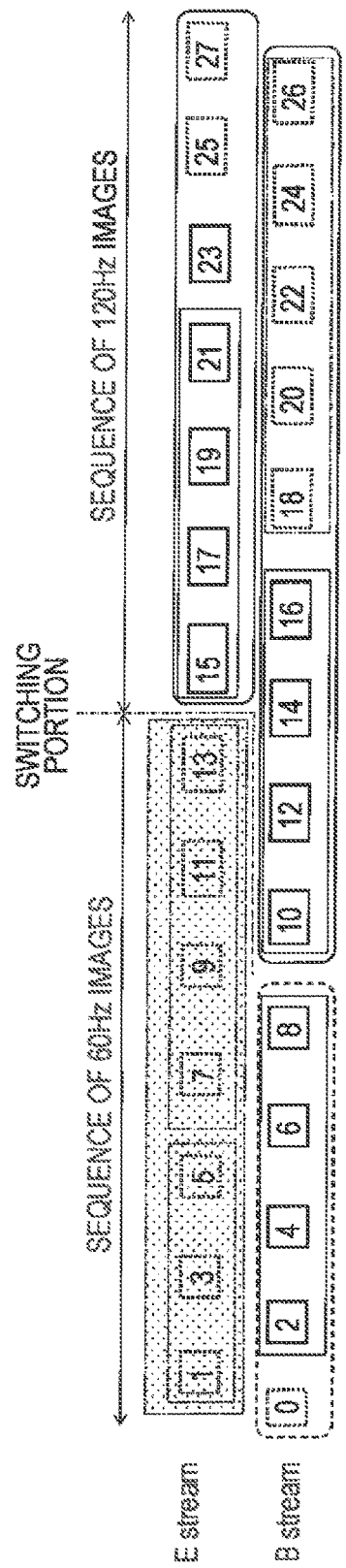
FIG. 11 is a diagram illustrating an example of a sequence switching portion.

FIG. 11 illustrates an example of the sequence switching portion. In this example, switching from the first sequence (a sequence of 60 Hz images) to the second sequence (a sequence of 120 H images) is performed. In the first sequence, only the base stream (B stream) including the encoded image data of the pictures of the layers 0 to 2 in the example of the scalable encoding of FIG. 3 is generated. On the other hand, in the second sequence, the base stream (B stream) including the encoded image data of the pictures of the layers 0 to 2 in the example of the scalable encoding of FIG. 3 and the enhancement stream (E stream) including the encoded image data of the pictures of the layer 3 in the example of the scalable encoding of FIG. 3 are generated.

Figure 12:
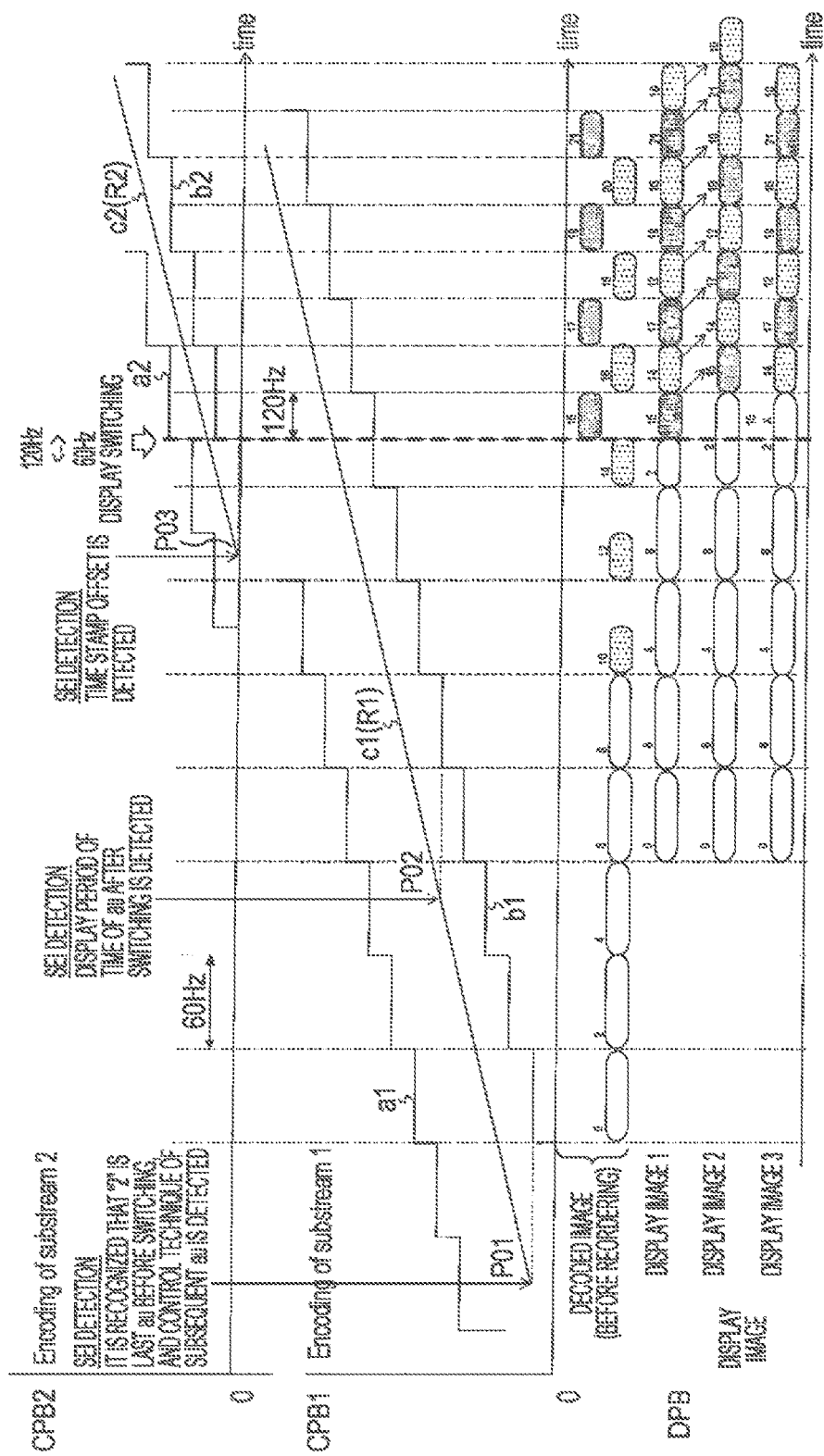
FIG. 12 is a diagram illustrating an example of HRD control of the encoder in the sequence switching portion.

FIG. 12 illustrates an example of Hypothetical Reference Decoder (HRD) control of the encoder 102 in the sequence switching portion illustrated in FIG. 11. In the following description, the base stream is assumed to be a substream 1 (Encoding of Substream 1), and the enhancement stream is assumed to be a substream 2 (Encoding of Substream 2).

A stair-like solid line a1 indicates a transition of a data amount of the substream 1 generated by encoding, and each step corresponds to one picture unit. The height of the step indicates a data amount generated by encoding. A stair-like solid line b1 indicates a transition of a data amount in a compressed data buffer (a coded picture buffer 1 (cpb 1)) consumed by decoding, and each step corresponds to one picture unit. The height of the step indicates a data amount consumed by decoding. An inclination R1 of an inclined solid line c1 indicates a bit rate of encoded image data input to the cpb 1.

A timing P01 is a timing at which first byte data of the picture "2" serving as the last display picture of the first sequence is input to the cpb 1. At the timing P01, the decoder detects the SEI of the encoded image data of the picture "2," recognizes that the picture "2" is the last picture (access unit) before switching, and detects a control technique of a subsequent picture (access unit).

In this case, the display period of time of the picture before switching is detected from "clock_tick" and "time_scale" of the VPS or the SPS. Further, a change in the display period of time is detected based on a change in the same parameter element in a subsequent access unit (AU).

Further, it is recognized that a substream of an upper layer including an access unit (AU) having a display timing later than a display timing of a current access unit (AU) is newly added to the cpb (if a current frame rate is indicated by P, a change in the frame rate from P to N: P<N) or that a substream of an upper layer including an access unit (AU) having a display timing later than a display timing of a current access unit (AU) is not newly input to the cpb (if a current frame rate is indicated by N, a change in the frame rate from N to P: P<N), and a parameter of a subsequent access unit (AU) is checked.

For example, when "next_au_presentation_skip_flag" is "1," a display of the subsequent access unit (AU) is skipped until the display period of time of the current access unit (AU) ends. Further, when "current_au_repeat_flag" is "1," the subsequent access unit (AU) is replaced by repeatedly displaying the current access unit (AU) the number of times designated by "repeat_type." The respective parameters will be described in detail later (see FIG. 16).

A timing P02 is a timing at which first byte data of a picture "10" serving as a first decoded picture of the second sequence is input to the cpb 1. At the timing P02, the decoder detects the SEI of the encoded image data of the picture "10," and detects a display period of time of a picture (an access unit) after switching. In this case, the display period of time is detected from "clock_tick" and "time_scale" of the VPS or the SPS.

A stair-like solid line a2 indicates a transition of a data amount of the substream 2 generated by encoding, and each step corresponds to one picture unit. The height of the step indicates a data amount generated by encoding. A stair-like solid line b2 indicates a transition of a data amount in a cpb 2 consumed by decoding, and each step corresponds to one picture unit. The height of the step indicates a data amount consumed by decoding. An inclination R2 of an inclined solid line c2 indicates a bit rate of encoded image data input to the cpb 2.

A timing P03 is a timing at which first byte data of a picture "15" serving as the first display picture of the second sequence is input to the cpb 2. At the timing P03, the decoder detects the SEI of the encoded image data of the picture "15," and detects a time stamp offset. In this case, a picture display is performed at a corrected display timing obtained by adding an offset value to a timing of "dpb_output_delay." For the decoding timing, a picture is decoded at a corrected decoding timing obtained by adding an offset value to a timing of "cpb_removal_delay."

The example in which R1 and R2 are fixed bit rates (constant_bit_rate) has been described above, but the present invention is not limited thereto, and the concept is the same even when R1 and R2 are variable bit rates (variable_bit_rate).

In the example of FIG. 12, the substream 1 is decoded in the order of the pictures "0," "2," "4," "6," "8," "10," "12," . . . , and the substream 2 is decoded in the order of the pictures "15," "17," "19," . . . . In other words, only the pictures of the substream 1 are decoded in the first sequence, and the pictures of the substream 1 and the pictures of the substream 2 are alternately decoded in the second sequence.

The decoded image data of each picture is input to an uncompressed data buffer (a decoded picture buffer (dpb)) and read and output from the dpb at a timing of a "display image 1" illustrated in FIG. 12.

In this case, the picture "2" is a picture of the first sequence (the sequence of 60 Hz images) but displayed at 120 Hz. In this regard, in this embodiment, as described above, the display control information is inserted into at least the encoded image data of the picture of the switching portion, and thus the reception side can display a "display image 2" or a "display image 3" illustrated in FIG. 12.

In the "display image 2," the display timing of each picture of the second sequence is delayed by one cycle of 120 Hz. In the "display image 3," the display of the pictures of the second sequence is skipped by the display period of time of the last picture of the first sequence. In both the "display image 2" and the "display image 3," the picture "2" is displayed at 60 Hz, and the display gap does not occur.

Figure 13:
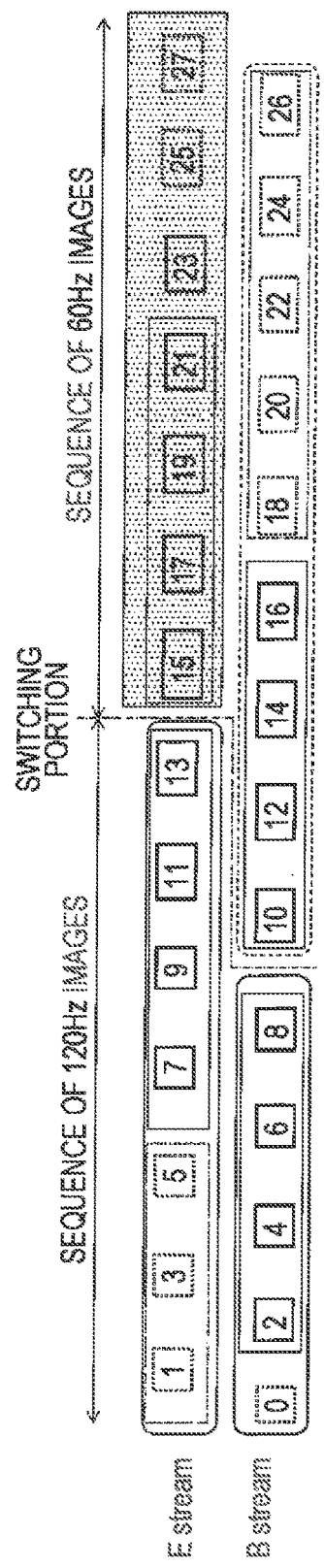
FIG. 13 is a diagram illustrating another example of the sequence switching portion.

FIG. 13 illustrates another example of the sequence switching portion. In this example, switching from the first sequence (a sequence of 120 Hz images) to the second sequence (a sequence of 60 H images) is performed. In the first sequence, the base stream (B stream) including the encoded image data of the pictures of the layers 0 to 2 in the example of the scalable encoding of FIG. 3 and the enhancement stream (E stream) including the encoded image data of the pictures of the layer 3 in the example of the scalable encoding of FIG. 3 are generated. On the other hand, in the second sequence, only the base stream (B stream) including the encoded image data of the pictures of the layers 0 to 2 in the example of the scalable encoding of FIG. 3 is generated.

Figure 14:
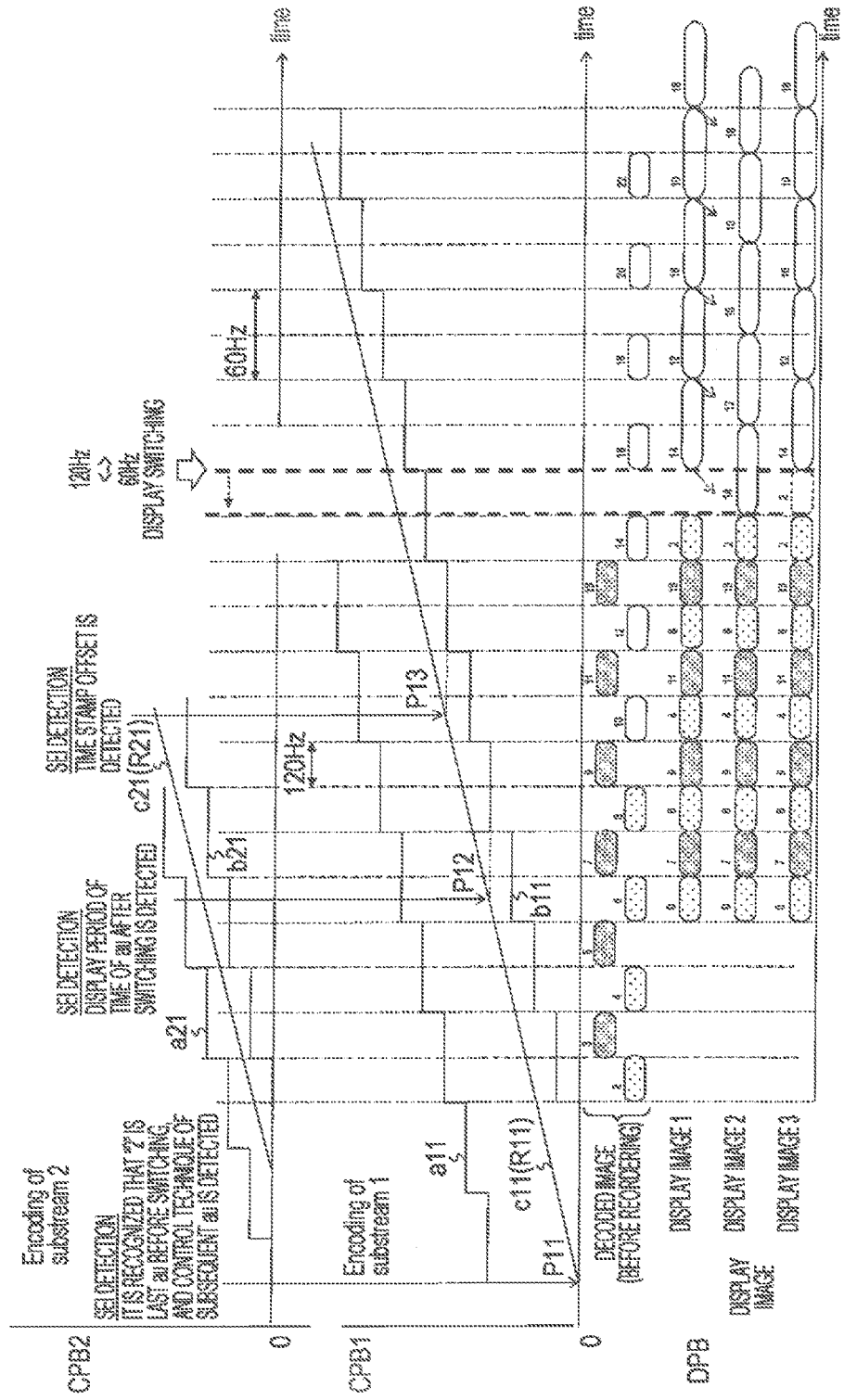
FIG. 14 is a diagram illustrating another example of HRD control of the encoder in the sequence switching portion.

FIG. 14 illustrates an example of HRD control of the encoder 102 in the sequence switching portion illustrated in FIG. 13. In the following description, the base stream is assumed to be the substream 1 (Encoding of Substream 1), and the enhancement stream is assumed to be the substream 2 (Encoding of Substream 2).

A stair-like solid line a11 indicates a transition of a data amount of the substream 1 generated by encoding, and each step corresponds to one picture unit. The height of the step indicates a data amount generated by encoding. A stair-like solid line b11 indicates a transition of a data amount in the cpb 1 (compressed data buffer) consumed by decoding, and each step corresponds to one picture unit. The height of the step indicates a data amount consumed by decoding. An inclination R11 of an inclined solid line c11 indicates a bit rate of encoded image data input to the cpb 1.

A timing P11 is a timing at which first byte data of the picture "2" serving as the last display picture of the first sequence is input to the cpb 1. At the timing P11, the decoder detects the SEI of the encoded image data of the picture "2," recognizes that the picture "2" is the last picture (access unit) before switching, and detects a control technique of a subsequent picture (access unit).

A timing P12 is a timing at which first byte data of a picture "10" serving as a first decoded picture of the second sequence is input to the cpb 1. At the timing P12, the decoder detects the SEI of the encoded image data of the picture "10," and detects a display period of time of a picture (an access unit) after switching.

A timing P13 is a timing at which first byte data of a picture "14" serving as the first display picture of the second sequence is input to the cpb 1. At the timing P13, the decoder detects the SEI of the encoded image data of the picture "14," and detects a time stamp offset.

The example in which R11 and R21 are fixed bit rates (constant_bit_rate) has been described above, but the present invention is not limited thereto, and the concept is the same even when R11 and R21 are variable bit rates (variable_bit_rate).

In the example of FIG. 14, the substream 1 is decoded in the order of the pictures "2," "4," "6," "8," "10," "12" . . . , and the substream 2 is decoded in the order of the pictures "3," "5," "7," . . . . In other words, the pictures of the substream 1 and the pictures of the substream 2 are alternately decoded in the first sequence, and only the pictures of the substream 1 are decoded in the second sequence. The decoded image data of each picture is input to the dpb (uncompressed data buffer) and read and output from the dpb at a timing of a "display image 1" illustrated in FIG. 14.

In this case, the picture "2" is a picture of the first sequence (the sequence of 120 Hz images) but displayed at 60 Hz. In this regard, in this embodiment, as described above, the display control information is inserted into at least the encoded image data of the picture of the switching portion, and thus the reception side can display a "display image 2" or a "display image 3" illustrated in FIG. 14.

In the "display image 2," the display timing of each picture of the second sequence is advanced by one cycle of 120 Hz. In the "display image 3," the display of the last picture of the first sequence is repeated once. In both the "display image 2" and the "display image 3," the picture "2" is displayed at 120 Hz, and the display gap does not occur.

The encoder 102 inserts AU timing control information SEI (au_timing_control_information SEI) that includes the display control information and is newly defined as one of prefixes SEI (Prefix_SEX).

FIG. 15(a) illustrates an exemplary structure (syntax) of an interface (I/F) for inserting the AU timing control information SEI. A field of "uuid_iso_iec_11578" has a UUID value described in "ISO/IEC 11578:1996 Annex A." "au_timing_control_information ( )" is inserted into a field of "user_data_payload_byte."

FIG. 16 illustrates an exemplary structure (syntax) of "au_timing_control_information ( )." FIG. 17 illustrates content of main information (semantics) in the exemplary structure. An ID of predetermined user data is added to a 16-bit field of "userdata_id." An 8-bit field of "au_timing_control_information_length" indicates a byte number (a count from the present element to the next element) of "au_timing_control_information."

A 1-bit field of "last_au_flag" indicates that the current access unit (picture) is the last access unit of a coded video sequence (CVD). "1" indicates that the current access unit (picture) is the last access unit, and "0" indicates that the current access unit (picture) is not the last access unit.

A 1-bit field of "next_au_presentation_skip_flag" indicates that a display of a subsequent access unit is skipped. "1" indicates that the display of the subsequent access unit is skipped until the display period of time of the current access unit ends. "0" indicates that the display of the subsequent access unit is not skipped. In this case, it indicates that a decoded image is displayed at a display timing designated by the stream.

A 1-bit field of "current_au_repeat_flag" indicates that the display of the current access unit is repeated. "1" indicates that an access unit to be displayed at a next timing grid is replaced by repeating the display of the current access unit. "0" indicates that the next access unit is displayed at a display timing designated by the stream.

When "current_au_repeat_flag" is "1," there is a 4-bit field of "repeat_type." The 4-bit field designates the number of repetitions of the current access unit. For example, "0001" indicates that the number of repetitions is 1, "0010" indicates that the number of repetitions is 2, and "0011" indicates that the number of repetitions is 3.

A 1-bit field of "offset_timing_control_flag" indicates that offset information is transmitted. "1" indicates that "offset_to_cpb_removal_delay" and "offset_to_dpb_output_delay" are transmitted, and there is a 24-bit field in which each of "offset_to_cpb_removal_delay" and "offset_to_dpb_output_ delay" is arranged. The 24-bit field of "offset_to_cpb_removal_delay" indicates a difference value with "cpb_removal_delay" of a corresponding picture. "offset_to_dpb_output_delay" indicates a difference value with "dpb_output_delay" of a corresponding picture.

Figure 18:
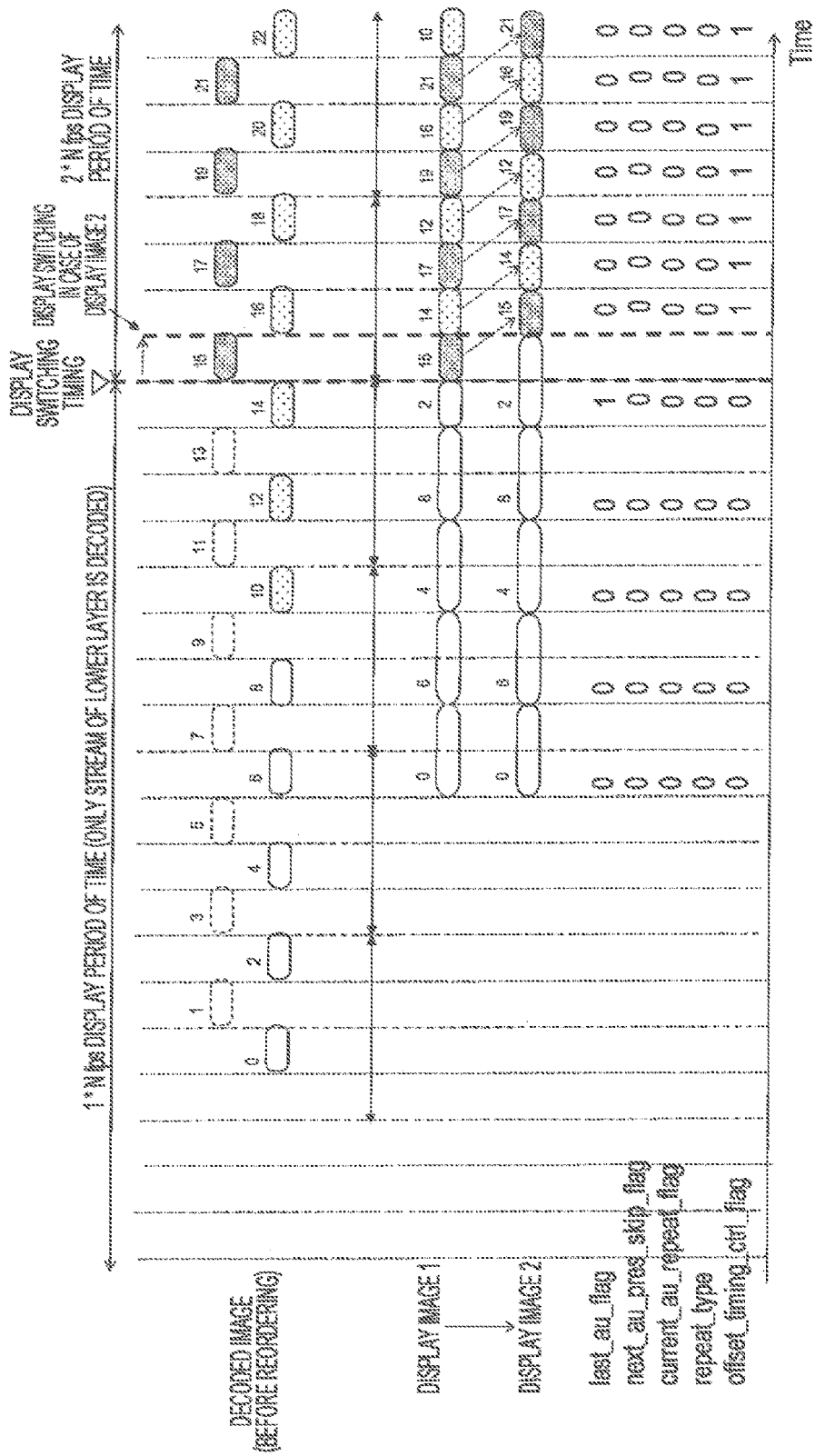
FIG. 18 is a diagram illustrating an example of a transition of a value of each flag of the AU timing control information SEI in sequence switching (switching from a 1× speed to a 2× speed).
Figure 19:
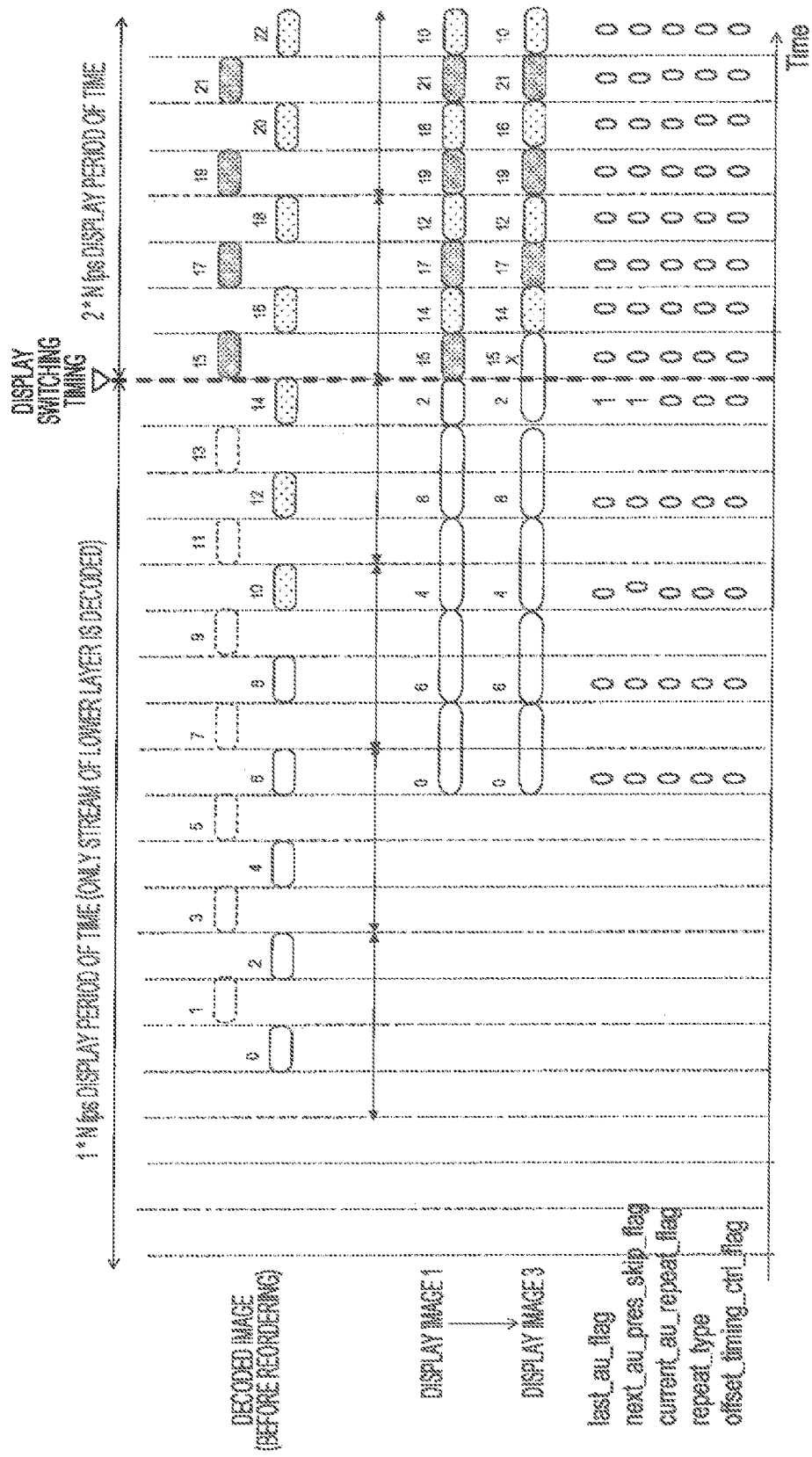
FIG. 19 is a diagram illustrating another example of a transition of a value of each flag of the AU timing control information SEI in sequence switching (switching from a 1× speed to a 2× speed).

FIGS. 18 and 19 illustrate a transition of a value of each flag of the AU timing control information SEI (see FIGS. 15 to 17) in the sequence switching (switching from the 1× speed to the 2× speed) of FIGS. 11 and 12.

FIG. 18 illustrates a transition of a value of each flag when change control from the display of the "display image 1" to the display of the "display image 2" is performed at the reception side. In this case, it is illustrated that "last_au_flag" of the picture "2" serving as the last picture of the first sequence is "1," and this picture is the last picture of the first sequence. Further, "offset_timing_control_flag" of the pictures of the second sequence is 1, and "offset_to_cpb_removal_delay" and "offset_to_dpb_output_delay" are transmitted. As a result, at the reception side, control is performed such that the display timing of each picture of the second sequence is delayed by one cycle of the second sequence, and thus the display of the "display image 2" is implemented.

FIG. 19 illustrates a transition of a value of each flag when change control from the display of the "display image 1" to the display of the "display image 3" is performed at the reception side. In this case, it is illustrated that "last_au_flag" of the picture "2" serving as the last picture of the first sequence is "1," and this picture is the last picture of the first sequence. Further, it is illustrated that "next_au_presentation_skip_flag" of the picture "2" is "1," and the display of the subsequent access unit is skipped until the display period of time of the current access unit ends. As a result, at the reception side, the display of the pictures of the second sequence is skipped by the display period of time of the picture "2," and thus the display of the "display image 3" is implemented.

Figure 20:
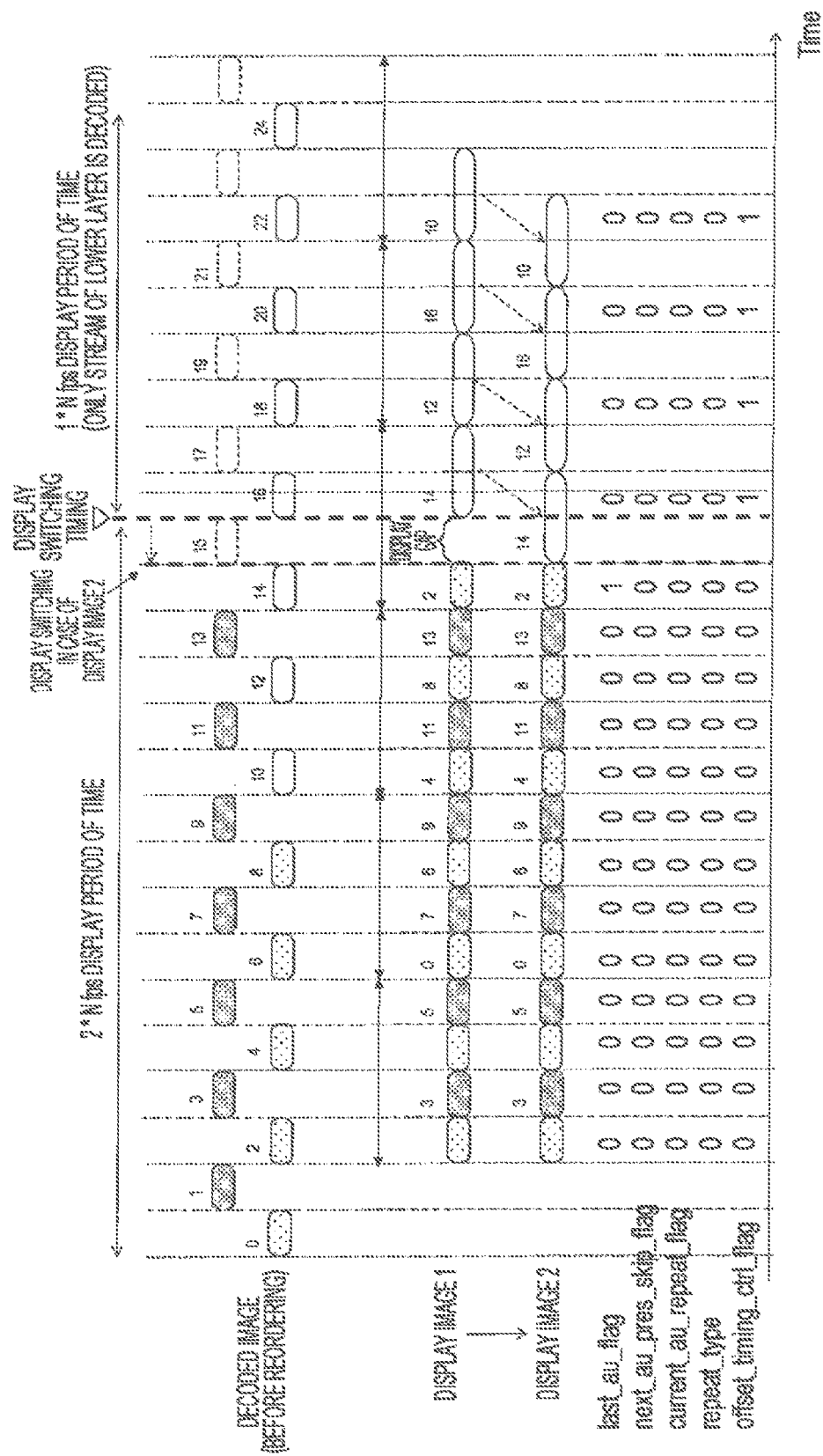
FIG. 20 is a diagram illustrating an example of a transition of a value of each flag of the AU timing control information SEI in sequence switching (switching from a 2× speed to a 1× speed).
Figure 21:
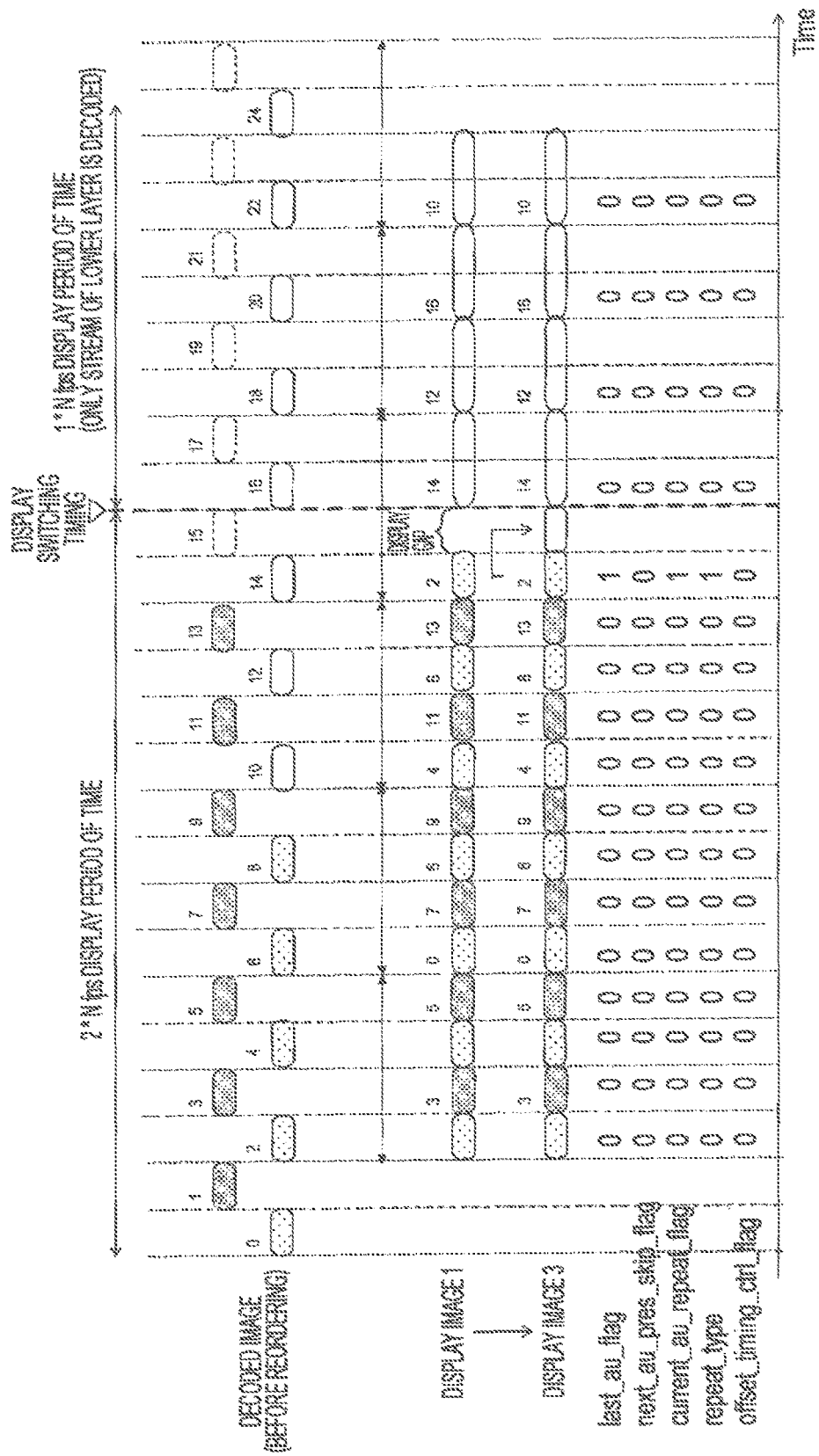
FIG. 21 is a diagram illustrating another example of a transition of a value of each flag of the AU timing control information SEI in sequence switching (switching from a 2× speed to a 1× speed).

FIGS. 20 and 21 illustrate a transition of a value of each flag of the AU timing control information SEI (see FIGS. 15 to 17) in the sequence switching (switching from the 1× speed to the 2× speed) of FIGS. 13 and 14.

FIG. 20 illustrates a transition of a value of each flag when change control from the display of the "display image 1" to the display of the "display image 2" is performed at the reception side. In this case, it is illustrated that "last_au_flag" of the picture "2" serving as the last picture of the first sequence is "1," and this picture is the last picture of the first sequence. Further, "offset_timing_control_flag" of the pictures of the second sequence is "1," and "offset_to_cpb_removal_delay" and "offset_to_dpb_output_delay" are transmitted. As a result, at the reception side, control is performed such that the display timing of each picture of the second sequence is advanced by one cycle of the first sequence, and thus the display of the "display image 2" is implemented.

FIG. 21 illustrates a transition of a value of each flag when change control from the display of the "display image 1" to the display of the "display image 3" is performed at the reception side. In this case, it is illustrated that "last_au_flag" of the picture "2" serving as the last picture of the first sequence is "1," and this picture is the last picture of the first sequence. Further, it is illustrated that "current_au_repeat_flag" of the picture "2" is "1," and the access unit to be displayed at the next timing grid is replaced by repeating the display of the current access unit. Further, it is illustrated that "repeat_type" of the picture "2" is "0001," and the number of repetitions is 1. As a result, at the reception side, the display of the picture "2" is repeated once, and the display of the "display image 3" is implemented.

Figure 22:
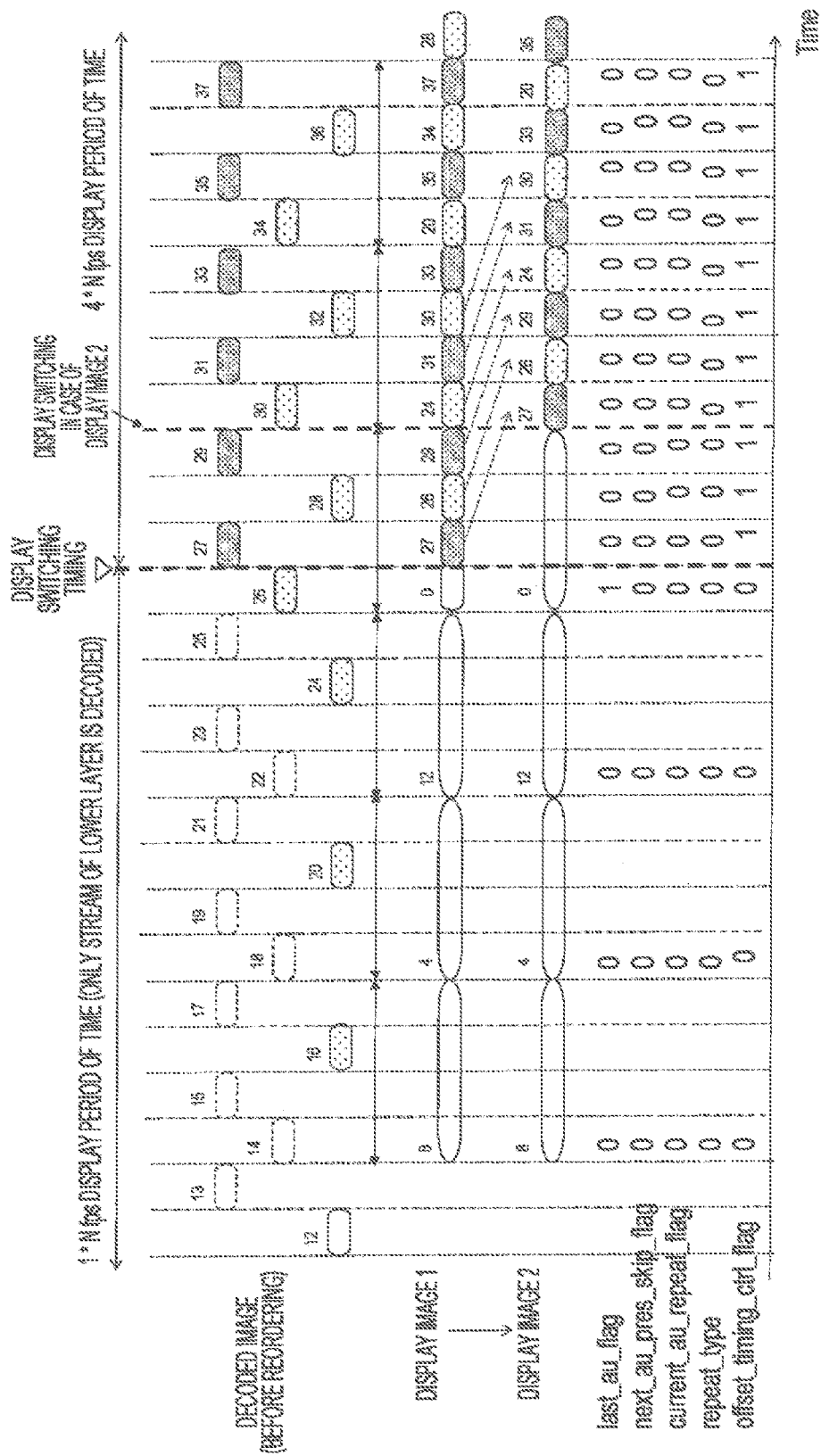
FIG. 22 is a diagram illustrating an example of a transition of a value of each flag of the AU timing control information SEI in sequence switching (switching from a 1× speed to a 4× speed).
Figure 23:
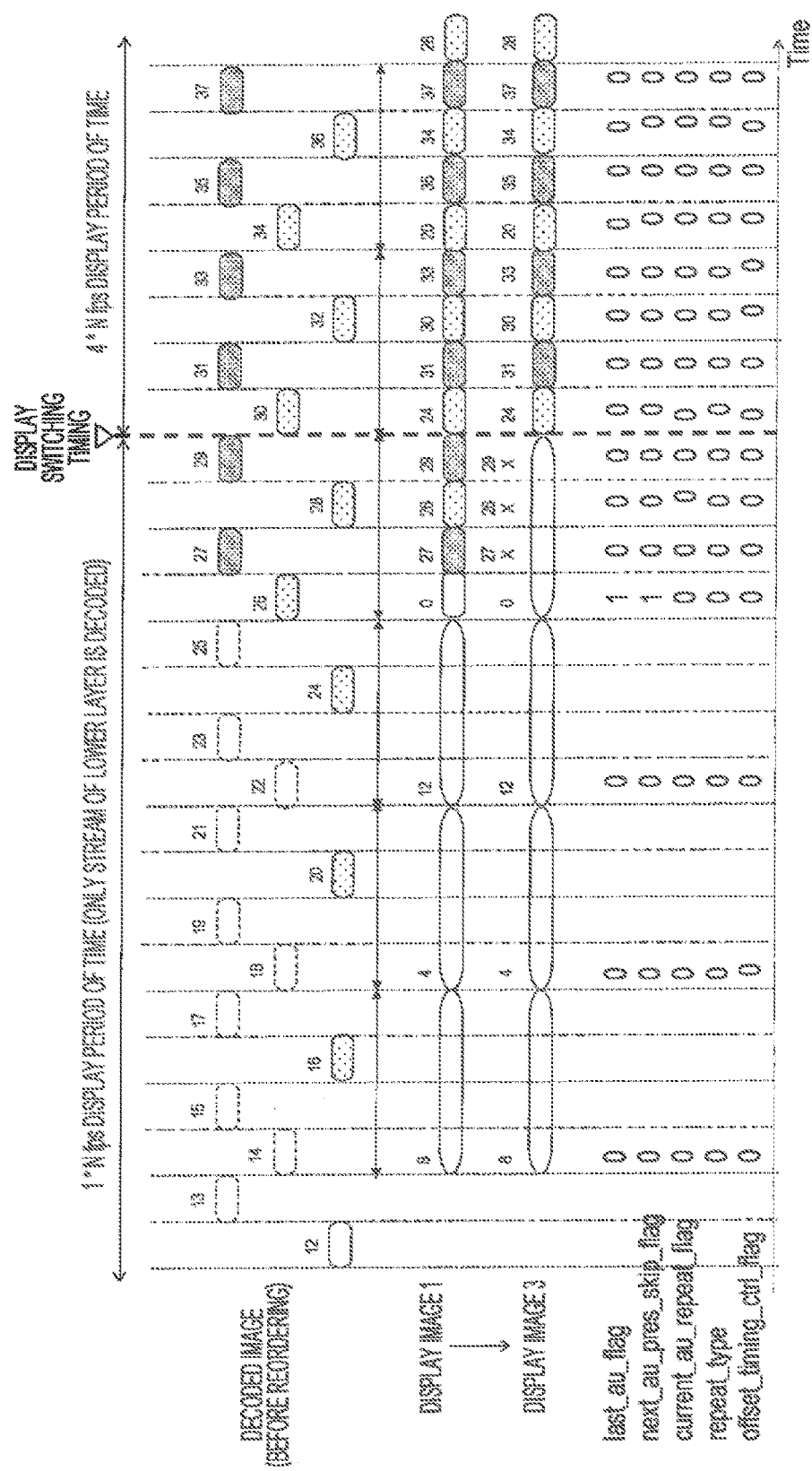
FIG. 23 is a diagram illustrating another example of a transition of a value of each flag of the AU timing control information SEI in sequence switching (switching from a 1× speed to a 4× speed).

FIGS. 22 and 23 illustrate a transition of a value of each flag of the AU timing control information SEI (see FIGS. 15 to 17) in the sequence switching from the 1× speed to the 4× speed. In this example, switching from the first sequence (for example, a sequence of 30 Hz images) to the second sequence (for example, a sequence of 120 Hz images) is performed.

Only the base stream (B stream) including the encoded image data of the pictures of the layers 0 to 2 in the example of the scalable encoding of FIG. 4 is generated in the first sequence. On the other hand, the base stream (B stream) including the encoded image data of the pictures of the layers 0 to 2 in the example of the scalable encoding of FIG. 4, the enhancement stream (E stream 1) including the encoded image data of the pictures of the layer 3 in the example of the scalable encoding of FIG. 4, and the enhancement stream (E stream 2) including the encoded image data of the pictures of the layer 4 in the example of the scalable encoding of FIG. 4 are generated in the second sequence.

FIG. 22 illustrates a transition of a value of each flag when change control from the display of the "display image 1" to the display of the "display image 2" is performed at the reception side. In this case, it is illustrated that "last_au_flag" of the picture "0" serving as the last picture of the first sequence is "1," and this picture is the last picture of the first sequence. Further, "offset_timing_control_flag" of the pictures of the second sequence is "1," and "offset_to_cpb_removal_delay" and "offset_to_dpb_output_delay" are transmitted. As a result, at the reception side, control is performed such that the display timing of each picture of the second sequence is delayed by three cycles of the second sequence, and the display of the "display image 2" is implemented.

FIG. 23 illustrates a transition of a value of each flag when change control from the display of the "display image 1" to the display of the "display image 3" is performed at the reception side. In this case, it is illustrated that "last_au_flag" of the picture "0" serving as the last picture of the first sequence is "1," and this picture is the last picture of the first sequence. Further, "next_au_presentation_skip_flag" of the picture "0" is "1," and the display of the subsequent access unit is skipped until the display period of time of the current access unit ends. As a result, at the reception side, the display of the pictures of the second sequence is skipped by the display period of time of the picture "0," and the display of the "display image 3" is implemented.

Figure 24:
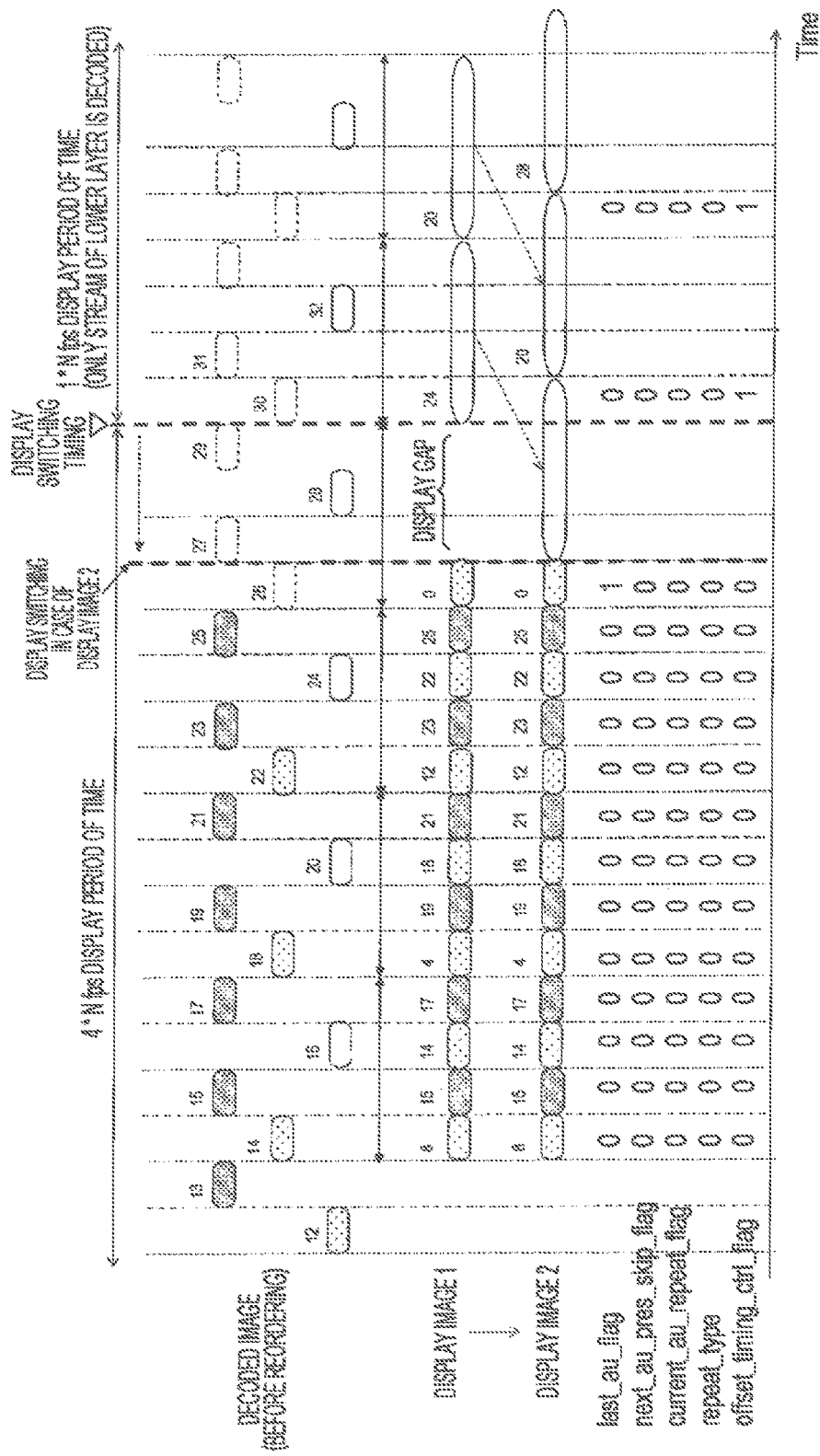
FIG. 24 is a diagram illustrating an example of a transition of a value of each flag of the AU timing control information SEI in sequence switching (switching from a 4× speed to a 1× speed).
Figure 25:
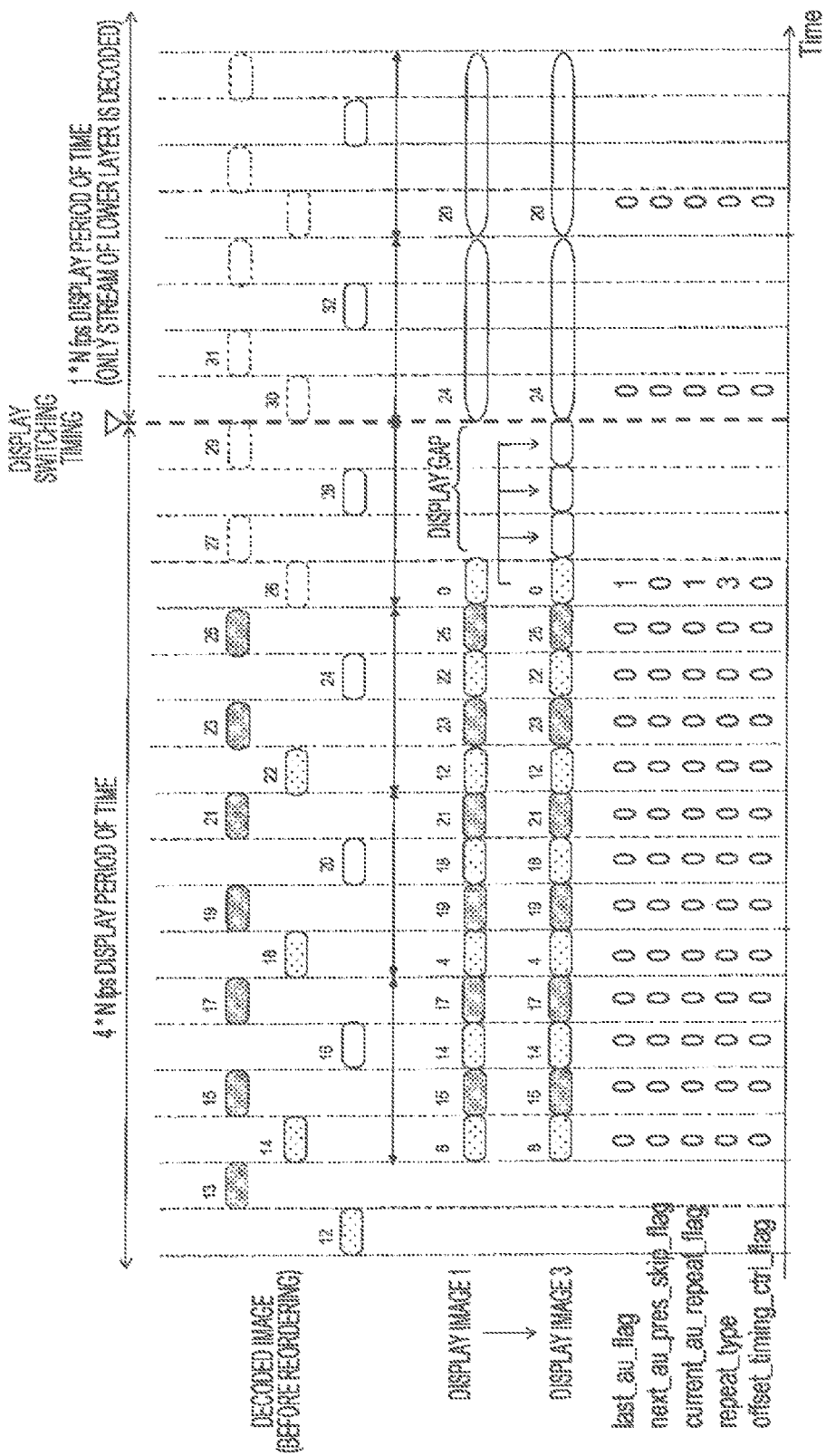
FIG. 25 is a diagram illustrating another example of a transition of a value of each flag of the AU timing control information SEI in sequence switching (switching from a 4× speed to a 1× speed).

FIGS. 24 and 25 illustrate a transition of a value of each flag of the AU timing control information SEI (see FIGS. 15 to 17) in the sequence switching from the 4× speed to the 1× speed. In this example, switching from the first sequence (for example, a sequence of 120 Hz images) to the second sequence (for example, a sequence of 30 Hz images) is performed.

The base stream (B stream) including the encoded image data of the pictures of the layers 0 to 2 in the example of the scalable encoding of FIG. 4, the enhancement stream (E stream 1) including the encoded image data of the pictures of the layer 3 in the example of the scalable encoding of FIG. 4, and the enhancement stream (E stream 2) including the encoded image data of the pictures of the layer 4 in the example of the scalable encoding of FIG. 4 are generated in the first sequence. On the other hand, only the base stream (B stream) including the encoded image data of the pictures of the layers 0 to 2 in the example of the scalable encoding of FIG. 4 is generated in the second sequence.

FIG. 24 illustrates a transition of a value of each flag when change control from the display of the "display image 1" to the display of the "display image 2" is performed at the reception side. In this case, it is illustrated that "last_au_flag" of the picture "0" serving as the last picture of the first sequence is "1," and this picture is the last picture of the first sequence. "offset_timing_control_flag" of the pictures of the second sequence is "1," and "offset_to_cpb_removal_delay" and "offset_to_dpb_output_delay" are transmitted. As a result, at the reception side, control is performed such that the display timing of each picture of the second sequence is advanced by three cycles of the first sequence, and the display of the "display image 2" is implemented.

FIG. 25 illustrates a transition of a value of each flag when change control from the display of the "display image 1" to the display of the "display image 3" is performed at the reception side. In this case, it is illustrated that "last_au_flag" of the picture "0" serving as the last picture of the first sequence is "1," and this picture is the last picture of the first sequence. Further, it is illustrated that "current_au_repeat_flag" of the picture "2" is "1," and the access unit to be displayed at the next timing grid is replaced by repeating the display of the current access unit. Furthermore, it is illustrated in "repeat_type" of the picture "2" is "00011," and the number of repetitions is 3. As a result, at the reception side, the display of the picture "0" is repeated three times, and the display of the "display image 3" is implemented.

Although a detailed description is omitted, in the case of switching to other magnifications such as sequence switching from the 1× speed to the 3× speed or sequence switching from the 3× speed to the 1× speed, similarly, control is performed based on the AU timing control information SEI, and at the reception side, the display of the "display image 2" or the "display image 3" is implemented.

Figure 26:
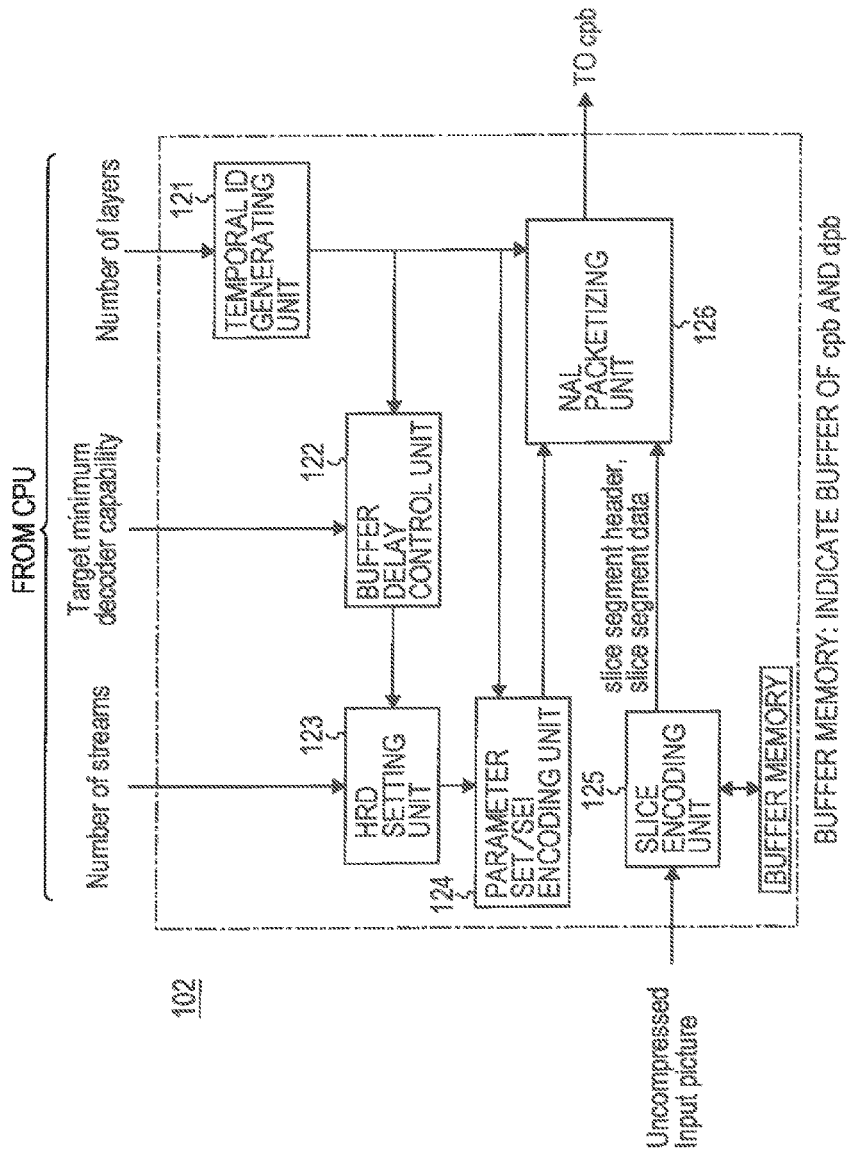
FIG. 26 is a block diagram illustrating an exemplary configuration of the encoder.

FIG. 26 illustrates an exemplary configuration of the encoder 102. The encoder 102 includes a temporal ID generating unit 121, a buffer delay control unit 122, an HRD setting unit 123, a parameter set/SEI encoding unit 124, a slice encoding unit 125, and an NAL packetizing unit 126.

The number-of-layers information is supplied from the CPU 101 to the temporal ID generating unit 121. The temporal ID generating unit 121 generates temporal_id according to the number of layers based on the number-of-layers information. For example, in the scalable encoding example of FIG. 3, temporal_id=0 to 3 is generated. Further, for example, in the scalable encoding example of FIG. 4, temporal_id=0 to 4 is generated.

The buffer delay control unit 122 is supplied with information of a minimum decoding capability (a target minimum decoder capability) from the CPU 101 and supplied with temporal_id generated by the temporal ID generating unit 121. The buffer delay control unit 122 calculates "initial_cpb_removal_delay" serving as a cpb buffering (buffering) initial value and "cpb_removal_delay" and "dpb_output_delay" of each picture for each video stream.

The buffer delay control unit 122 controls "Cpb_removal_delay" in the cpb buffer of each substream. The buffer delay control unit 122 performs control such that a buffer failure does not occur in the dpb buffer between the decoding timing and the display timing of the decoder. In this case, "cpb_removal_delay" is control such that the decoding timings of the pictures of the lowest layer set are equal intervals.

Further, in this case, "cpb_removal_delay" is controlled such that an encoding timing of the encoded image data of the pictures of the layer set positioned to be higher than the lowest layer set is an intermediate timing of encoding timings of the encoded image data of the pictures of all layer sets positioned to be lower than the layer set. Furthermore, "dpb_output_delay" is controlled such that no failure occurs in the cpb buffer. The encoding timing is the same meaning as the decoding timing at which reading from the compressed data buffer (cpb) is performed at the reception side.

The HRD setting unit 123 is supplied with "cpb_removal_delay" and "dpb_output_delay" of the picture of each video stream calculated by the buffer delay control unit 122 and supplied with information of the number of streams from the CPU 101. The HRD setting unit 123 performs a HRD setting based on the information.

The parameter set/SEI encoding unit 124 is supplied with the HRD setting information and temporal_id. The parameter set/SEI encoding unit 124 generates parameter sets of the pictures of each layer such as VPS, SPS, and PPS and various kinds of SEI according to the number of streams to be encoded.

For example, the AU timing control SEI (au_timing_control SEI) is generated. Further, for example, picture timing SEI including "cpb_removal_delay" and "dpb_output_delay" is generated. Furthermore, for example, buffering period SEI including "initial_cpb_removal_time" is generated. The buffering period SEI is generated in association with the first picture (access unit) of the GOP.

"initial cpb removal time" indicates a time (an initial time) at which the encoded image data of the first picture of the GOP is extracted from the compressed data buffer (cpb) when the encoded image data of the first picture of the GOP is decoded. "cpb_removal_delay" is a time at which the encoded image data of each picture is extracted from the compressed data buffer (cpb), and the time is decided according to "initial_cpb_removal_time." Further, "dpb_output_delay" indicates a time at which it is extracted after it is decoded and input to the uncompressed data buffer (dpb).

The slice encoding unit 125 encodes the image data of the pictures of each layer, and obtains slice data (a slice segment header and slice segment data). The slice encoding unit 125 inserts "ref_idx_l0_active (ref_idx_l1_active)" indicating an index of a prediction destination picture of a "prediction unit" in the "slice segment header" as information indicating a prediction state in the time direction through a frame buffer. As a result, at the time of decoding, the referenced picture is decided together with the layer level indicated by temporal_id. Further, the slice encoding unit 125 inserts "short_term_ref_pic_set_idx" or "it_idx_sps" in the "slice segment header" as an index of a current slice.

The NAL packetizing unit 126 generates the encoded image data of the picture of each layer based on the parameter set and the SEI generated by the parameter set/SEI encoding unit 124 and the slice data generated by the slice encoding unit 125, and outputs video streams (encoded streams) that correspond in number to the number of streams.

At this time, temporal_id indicating the layer is added to the NAL unit header for each picture (see FIGS. 5(a) and 5(b)). Further, the pictures belonging to the layer indicated by temporal_id are grouped as a sublayer (sub_layer), and a level designation value "Level_idc" of the bit rate of each sublayer is indicated by "sublayer_level_idc" and inserted into the VPS or the SPS.

Figure 27:
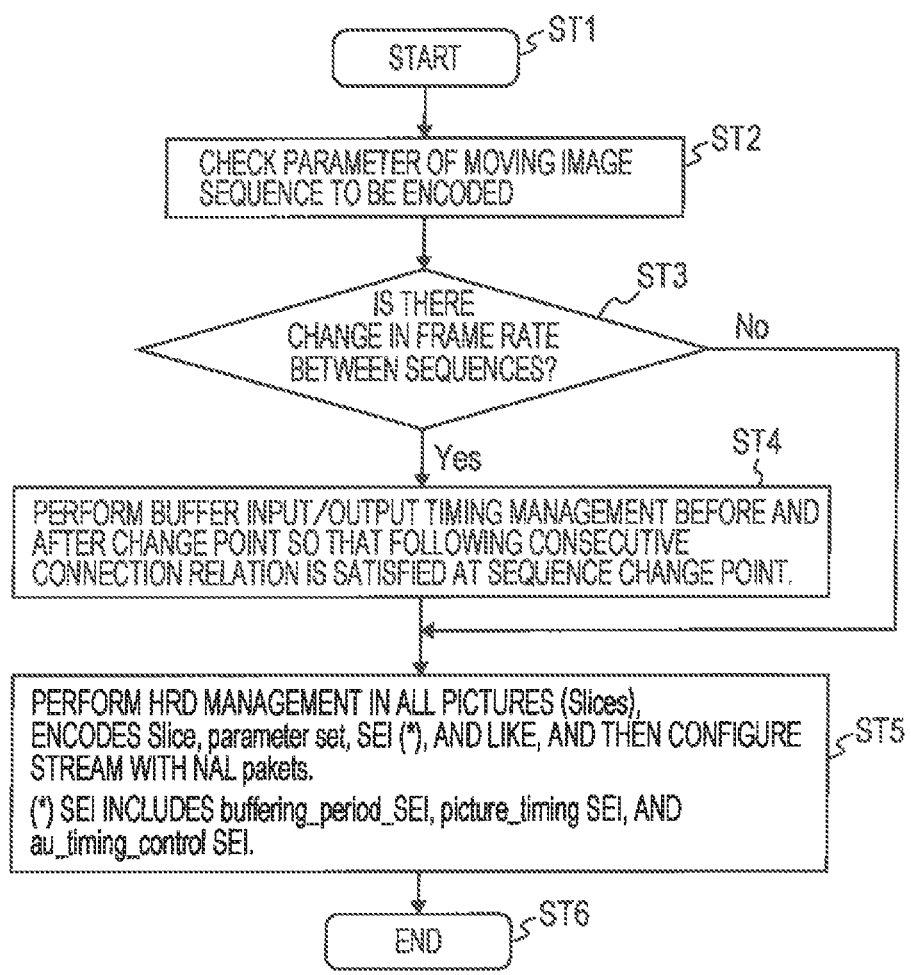
FIG. 27 is a diagram illustrating an example of a process flow of the encoder.

FIG. 27 illustrates a process flow of the encoder 102. In step ST1, the encoder 102 starts the process and then proceeds to the process of step ST2. In step ST2, the encoder 102 checks a parameter of a moving image sequence to be encoded. The parameter includes the frame rate (frame frequency) as well.

Then, in step ST3, the encoder 102 determines whether or not there is a change in the frame rate between the sequences. When there is a change in the frame rate, the encoder 102 proceeds to the process of step ST4. In step ST4, buffer input/output timing management before and after a change point is performed.

After the process of step ST4, the encoder 102 proceeds to the process of step ST5. When there is no change in the frame rate in step ST3, the encoder 102 immediately proceeds to the process of step 5. In step ST5, the encoder 102 performs HRD management in all the pictures (slice), encodes the slice, the parameter set, the SEI, and the like, and then configures the stream with NAL packets. Thereafter, in step ST6, the encoder 102 ends the process.

Referring back to FIG. 2, the compressed data buffer (cpb) 103 temporarily accumulates the video stream including the encoded data of the pictures of each layer which is generated by the encoder 102. The multiplexer 104 obtains the transport stream TS serving as a multiplexed stream by reading the video stream accumulated in the compressed data buffer 103, generating PES packets, generating transport packets, and performing multiplexing.

The transport stream TS includes at least the video stream including the encoded image data of the pictures of the lowest layer set among a predetermined number of video streams including the encoded image data of the pictures of the layer sets obtained by dividing a plurality of layers as described above. In other words, the transport stream TS typically includes all of a predetermined number of video streams generated by the encoder 102, but the video stream including the encoded image data of the pictures of the layer set at the upper side is considered to be excluded.

The multiplexer 104 inserts the display control information into the packet containing the video stream, for example, the PES packet. The display control information is the same as the display control information inserted into the encoded image data by the encoder 102 as described above. In this embodiment, offset type stamp information (offset_timestamp_information), the AU presentation control (au_presentation_control), and the like are defined in a PES extension field of the PES packet.

FIG. 28(a) illustrates an exemplary structure (syntax) of PES extension field data (pes_extension_field_data). FIG. 28(b) illustrates content of main information (semantics) in the exemplary structure. "PES_extension field length" is assumed to be given outside the syntax structure. An 8-bit field of "start_sync_byte" indicates a code value indicating a start of the extension field.

An 8-bit field of "extension_field_type" indicates a type of extension field. "0x02" indicates that "offset_timestamp_information ( )" and "au_presentation_control ( )" are supplied. A 4-bit field of "maximum_temporal_layer_minus1" indicates the number of layers of all a plurality of substreams (substreams) configuring a service, and has a value obtained by subtracting 1 from a maximum value of "temporal_layer_id."

FIG. 29(a) illustrates an exemplary structure (syntax) of "offset_timestamp_information ( )." FIG. 29(b) illustrates content of main information (semantics) in the exemplary structure. A 24-bit field of "offset_to_DTS" indicates an offset difference value (with a 90 KHz unit code) from a Decoding Time Stamp (DTS) attached to the PES header. A 24-bit field of "offset_to_PTS" indicates an offset difference value (with a 90 KHz unit code) from a Presentation Time Stamp (PTS) attached to the PES header.

FIG. 30 illustrates an exemplary structure (syntax) of "au_presentation_control ( )." FIG. 31 illustrates content of main information (semantics) in the exemplary structure. A 1-bit field of "last_au_flag" indicates that the current access unit (picture) is the last access unit of the CVD. "1" indicates that the current access unit is the last access unit, and "0" indicates that the current access unit is not the last access unit.

A 1-bit field of "next_au_presentation_skip_flag" indicates that the display of the subsequent access unit is skipped. "1" indicates that the display of the subsequent access unit is skipped until the display period of time of the current access unit ends. "0" indicates that the display of the subsequent access unit is not skipped. In this case, it indicates that a decoded image is displayed at a display timing designated by the stream.

A 1-bit field of "current_au_repeat_flag" indicates that the display of the current access unit is repeated. "1" indicates that an access unit to be displayed at a next timing grid is replaced by repeating the display of the current access unit. "0" indicates that the next access unit is displayed at a display timing designated by the stream.

When "current_au_repeat_flag" is "1," there is a 4-bit field of "repeat_type." The 4-bit field designates the number of repetitions of the current access unit. For example, "0001" indicates that the number of repetitions is 1, "0010" indicates that the number of repetitions is 2, and "0011" indicates that the number of repetitions is 3.

The multiplexer 104 inserts identification information indicating whether or not the AU timing control SEI (au_timing_control SEI) gets inserted in the encoded image data into the layer of the transport stream TS. This identification information is inserted into the video elementary stream loop arranged in association with each of a predetermined number of video streams under the program map table as a descriptor.

The multiplexer 104 inserts a temporal control descriptor (Temporal_control_descriptor) which is newly defined together with an HEVC descriptor (HEVC_descriptor). FIG. 32 illustrates an exemplary structure (syntax) of the temporal control descriptor.

A 8-bit field of "Temporal_control_descriptor_tag" indicates a descriptor type. Here, it indicates the temporal control descriptor. An 8-bit field of "Temporal_control_descriptor_length" indicates a length (size) of the descriptor, and the length of the descriptor is indicated by a subsequent byte number. Here, it indicates that the length of the descriptor is a one byte. A 1-bit field of "au_timing_control_SEI_existed" indicates whether or not there is the AU timing control SEI, and "1" indicates that there is the AU timing control SEI.

FIG. 33 illustrates an exemplary structure (syntax) of the HEVC descriptor (HEVC_descriptor). An 8-bit field of "descriptor_tag" indicates a descriptor type, and indicates the HEVC descriptor herein. An 8-bit field of "descriptor_length" indicates a length (size) of the descriptor, and the length of the descriptor is indicated by a subsequent byte number.

An 8-bit field of "level_idc" indicates the level designation value of the bit rate. Further, when "temporal_layer_subset_flag is 1," there are a 5-bit field of "temporal_id_min" and a 5-bit field of "temporal_id_max." "temporal_id_min" indicates a value of temporal_id of the lowest layer of scalable encoded data included in a corresponding video stream. "temporal_id_max" indicates a value of temporal_id of the highest layer of scalable encoded data included in a corresponding video stream.

Further, the multiplexer 104 inserts identification information for identifying whether each video stream is the base stream or the enhancement stream. In this case, the identification information is inserted in the video elementary stream loop (Video ES loop) arranged in association with each of a predetermined number of video streams as the stream type under the program map table.

In this case, the stream type of the base stream is set to "0x24." The stream type of the enhancement stream is, for example, set to "0x25" which is newly defined. Further, when there are a plurality of enhancement streams, all the enhancement streams are not set to the same stream type, and a plurality of stream types may newly be defined as the stream types of the enhancement streams so that each of the enhancement streams is identifiable. For example, when there are two enhancement streams, the stream type of the first enhancement stream is set to "0x25," and the stream type of the second enhancement stream is set to "0x26."

Figure 34:
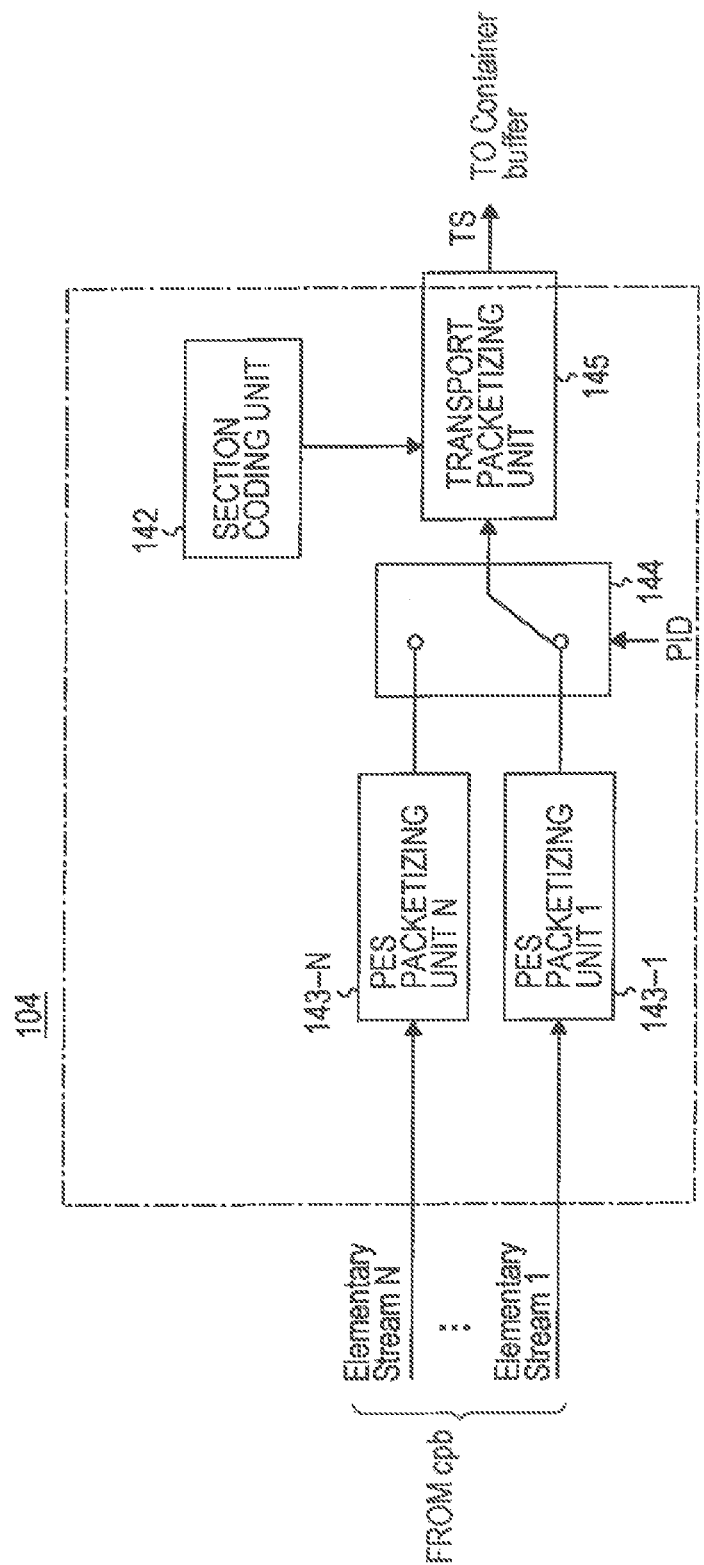
FIG. 34 is a block diagram illustrating an exemplary configuration of a multiplexer.

FIG. 34 illustrates an exemplary configuration of the multiplexer 104. The multiplexer 104 includes a section coding unit 142, PES packetizing units 143-1 to 143-N, a switch unit 144, and a transport packetizing unit 145.

The PES packetizing units 143-1 to 143-N read video streams 1 to N accumulated in the compressed data buffer 103, and generate the PES packets. Here, at least one base stream is included in each of the video streams 1 to N. When N is 2 or more, one base stream and one or more enhancement streams are included.

At this time, the PES packetizing units 143-1 to 143-N add time stamps such as a DTS and a PTS to the PES header based on the HRD information of the video streams 1 to N. In this case, the DTS and the PTS are generated at the accuracy synchronized with a System Time Clock (STC) time with reference to "cpu_removal_delay" and "dpb_output_delay" of each picture and arranged at a predetermined position of the PES header.

The PES packetizing units 143-1 to 143-N read the video streams (Elementary Stream) accumulated in the compressed data buffer 103 and generate the PES packets. At this time, the PES packetizing units 143-1 to 143-N add time stamps such as the DTS and the PTS to the PES header based on the HRD information of the video streams and the like. In this case, conversion to the DTS and the PTS is performed at the accuracy synchronized with the STC time with reference to "cpu_removal_delay" and "dpb_output_delay" of each picture, and the DTS and the PTS are arranged at a predetermined position of the PES header.

At this time, the PES packetizing units 143-1 to 143-N generate the offset type stamp information (offset_timestamp_information) and the AU presentation control (au_presentation_control) in the PES extension field of the PES packet based on discontinuity of the time stamp, the SEI, the HRD information of the video stream, or the like. Then, the PES packetizing units 143-1 to 143-N insert the information into the PES extension field of the PES packet.

The switch unit 144 selectively extracts the PES packets generated by the PES packetizing units 143-1 to 143-N based on a packet identifier (PID), and transfers the extracted PES packet to the transport packetizing unit 145. The transport packetizing unit 145 generates a TS packet in which the PES packet is included in the payload, and obtains the transport stream TS.

The section coding unit 142 generates various kinds of section data to be inserted into the transport stream TS. Information such as the number of layers and the number of streams is supplied from the CPU 101 to the section coding unit 142. The section coding unit 142 generates HEVC descriptor (HEVC_descriptor) based on the information. Further, the number of layers and information indicating whether or not the AU timing control SEI (au_timing_control SEI) gets inserted into the encoded image data from the CPU 101 are supplied from the CPU 101 to the section coding unit 142. The section coding unit 142 generates the temporal control descriptor (Temporal_control_descriptor) based on the information.

The section coding unit 142 transfers various kinds of section data to the transport packetizing unit 145. The transport packetizing unit 145 generates the TS packet including the section data, and inserts the generated TS packet into the transport stream TS. At this time, the stream type is also inserted into the video elementary stream loop (Video ES loop) arranged in association with each video stream. In this case, the stream type of the base stream is set to "0x24," and the stream type of the enhancement stream is, for example, set to "0x25" which is newly defined.

Figure 35:
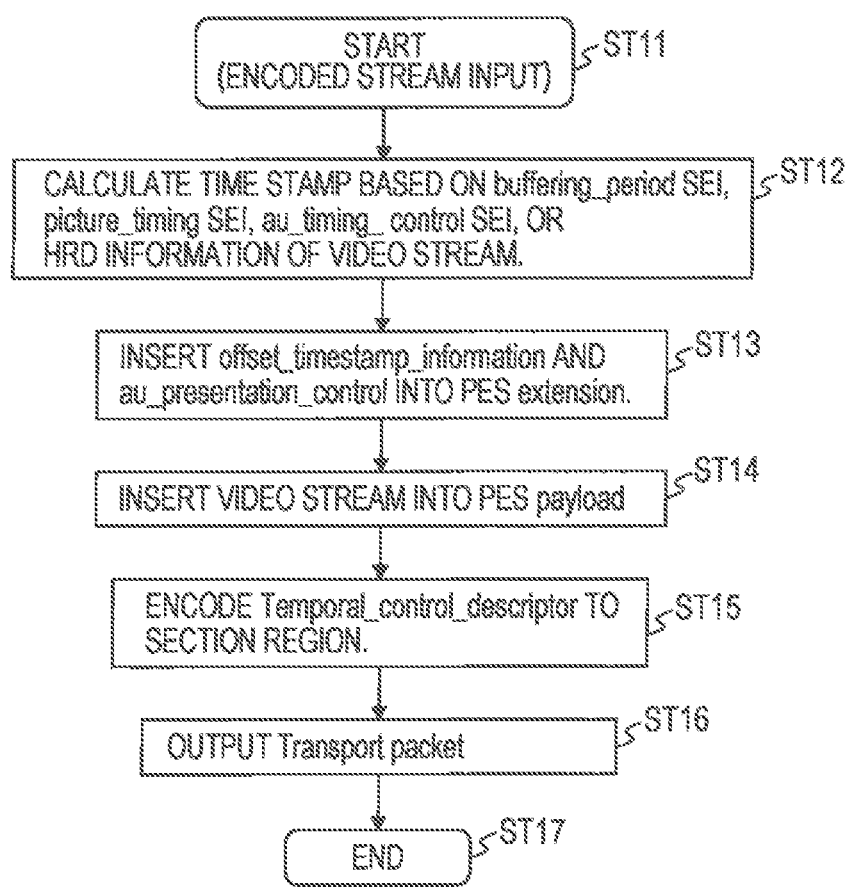
FIG. 35 is a diagram illustrating an example of a process flow of the multiplexer.

FIG. 35 illustrates a process flow of the multiplexer 104. In step ST11, the multiplexer 104 starts the process, and then proceeds to the process of step ST12. In step ST12, the multiplexer 104 calculates the time stamp based on the picture timing SEI, the buffering period SEI, the AU timing control SEI, or the HRD information of the video stream (Elementary Stream).

Then, in step ST13, the multiplexer 104 generates the offset type stamp information (offset_timestamp_information) and the AU presentation control (au_presentation_control), and inserts the offset type stamp information (offset_timestamp_information) and the AU presentation control (au_presentation_control) into the PES extension field. Then, in step ST14, the multiplexer 104 inserts the video stream (Elementary Stream) into the PES payload.

Then, in step ST15, the multiplexer 104 encodes the temporal control descriptor (Temporal_control_descriptor) to a section region. Then, in step ST16, the multiplexer 104 converts it into the TS packet, and outputs the TS packet. In step ST17, the multiplexer 104 ends the process after the process of step ST16 ends.

Figure 36:
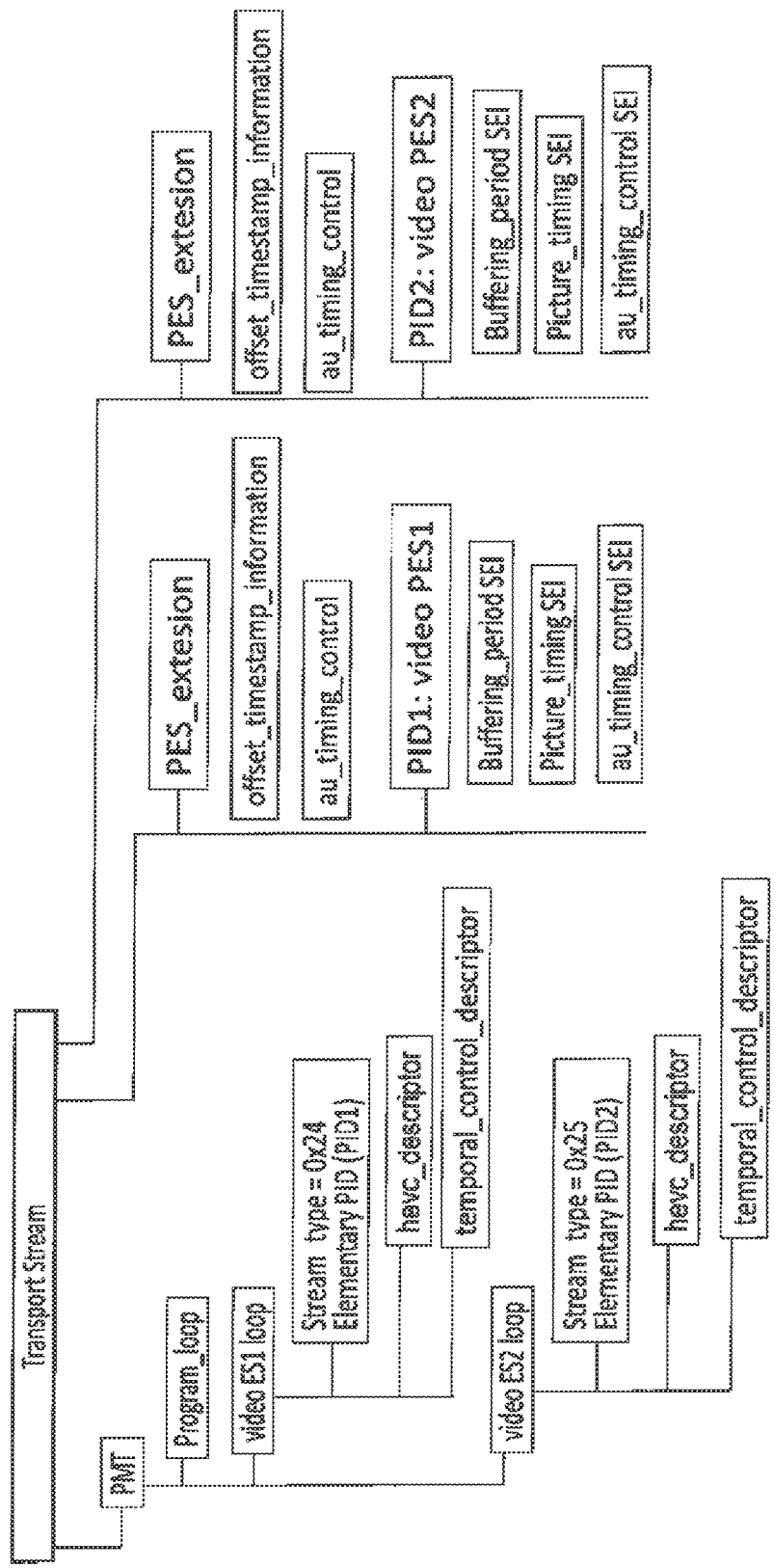
FIG. 36 is a diagram illustrating an exemplary configuration of a transport stream TS in two-stream delivery.

FIG. 36 illustrates an exemplary configuration of the transport stream TS when a certain service is delivered through two streams. The two video streams, that is, the base stream and the enhancement stream are included in the transport stream TS. In other words, in this exemplary configuration, there is a PES packet "video PES1" of the base stream, and there is a PES packet "video PES2" of the enhancement stream.

The offset type stamp information (offset_timestamp_information) and the AU presentation control (au_presentation_control) are inserted into the PES extension field of the PES header. The buffering period SEI, the picture timing SEI, the AU timing control SEI, and the like are inserted into the encoded image data of each picture. The DTS and the PTS are also arranged in the PES header.

A Program Map Table (PMT) is included in the transport stream TS as one of Program Specific Information (PSI). The PSI is information indicating a program to which each elementary stream included in the transport stream belongs.

In the PMT, there is a program loop in which information associated with the entire program is described. Further, in the PMT, there is an elementary stream loop including information associated with each video stream. In this exemplary configuration, there is a video elementary stream loop "video ES1 loop" corresponding to the base stream, and there is a video elementary stream loop "video ES2 loop" corresponding to the enhancement stream.

Information such as the stream type and the packet identifier (PID) and a descriptor describing information associated with the video stream are arranged in "video ES1 loop" in association with the base stream (video PES1). The stream type is set to "0x24" indicating the base stream. The HEVC descriptor and the temporal control descriptor are inserted as one of the descriptors.

Information such as the stream type and the packet identifier (PID) and a descriptor describing information associated with the video stream are arranged in "video ES2 loop" in association with the enhancement stream (video PES2). The stream type is set to, for example, "0x25" that indicates the enhancement stream and is newly defined. The HEVC descriptor and the temporal control descriptor are inserted as one of the descriptors.

Referring back to FIG. 2, the transmitting unit 105 modulates the transport stream TS, for example, according to a modulation scheme suitable for broadcasting such as QPSK/OFDM or the like, and transmits an RF modulation signal through a transmission antenna.

An operation of the transmission device 100 illustrated in FIG. 2 will briefly be described. The uncompressed moving image data is input to the encoder 102. The encoder 102 performs the scalable encoding on the moving image data. In other words, the encoder 102 classifies the image data of the pictures configuring the moving image data into a plurality of layers, encodes the plurality of layers, and generates the video streams including the encoded image data of the pictures of the respective layers. At this time, the encoding is performed so that a picture to be referred to belongs to its own layer and/or a layer lower than its own layer.

The encoder 102 divides the plurality of layers into a predetermined number of layer sets, and generates a predetermined number of video streams each of which includes the encoded image data of the pictures of each layer set. In this case, the base stream including the encoded image data of the pictures of the lowest layer set is generated, and a predetermined number of enhancement streams including the encoded image data of the pictures of the layer set positioned to be higher than the lowest layer set are generated. Then, in this case, the encoding is performed so that the decoding intervals of the encoded image data of the pictures of the lowest layer set are equal intervals.

When the switching portion at which a sequence of a predetermined number of video streams to be generated is switched from the first sequence to the second sequence having the different frame rate from the first sequence, the encoder 102 inserts the display control information (the AU timing control information SEI: see FIG. 16) into at least the encoded image data of the picture corresponding to the switching portion.

The predetermined number of video streams generated by the encoder 102 are supplied to and temporarily accumulated in the compressed data buffer (cpb) 103. The multiplexer 104 obtains the transport stream TS serving as a multiplexed stream by reading each video stream accumulated in the compressed data buffer 103, generating PES packets, generating transport packets, and performing multiplexing.

The multiplexer 104 inserts the display control information (the offset type stamp information and the AU presentation control: see FIGS. 29 and 30) into the packet containing the video stream, for example, the PES extension field of the PES packet. The multiplexer 104 inserts the identification information (the temporal control descriptor: see FIG. 32) indicating whether or not the AU timing control SEI (au_timing_control SEI) gets inserted in the encoded image data into the layer of the transport stream TS.

The multiplexer 104 inserts the identification information identifying whether each of the predetermined number of video streams is the base stream or the enhancement stream into the layer of the transport stream TS. For example, the identification information is the stream type inserted into the video elementary stream loop (Video ES loop) arranged in association with each video stream. In this case, the stream type of the base stream is set to "0x24," and the stream type of the enhancement stream is set to, for example, "0x25" which is newly defined.

The transport stream TS generated by the multiplexer 104 is transferred to the transmitting unit 105. The transmitting unit 105 modulates the transport stream TS, for example, according to the modulation scheme suitable for broadcasting such as QPSK/OFDM or the like, and transmits the RF modulation signal through the transmission antenna.

[Configuration of Reception Device]

Figure 37:
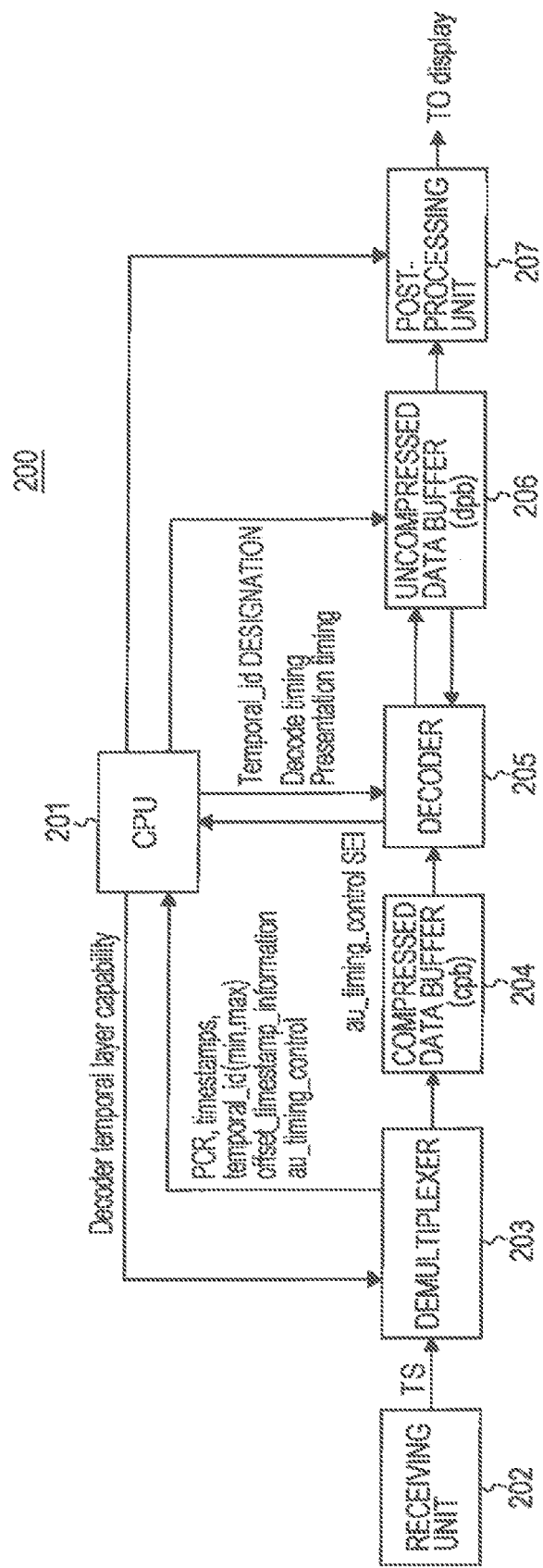
FIG. 37 is a block diagram illustrating an exemplary configuration of a reception device.

FIG. 37 illustrates an exemplary configuration of the reception device 200. The reception device 200 includes a CPU 201, a receiving unit 202, a demultiplexer 203, and a compressed data buffer (cpb) 204. The reception device 200 further includes a decoder 205, an uncompressed data buffer (dpb) 206, and a post-processing unit 207. The CPU 201 configures a control unit, and controls an operation of each unit of the reception device 200.

The receiving unit 202 demodulates the RF modulation signal received through the reception antenna, and acquires the transport stream TS. The demultiplexer 203 selectively extracts the encoded image data of the pictures of the layer set from the transport stream TS according to the decoding capability (decoder temporal layer capability), and transfers the extracted encoded image data to the compressed data buffer (cpb) 204.

Figure 38:
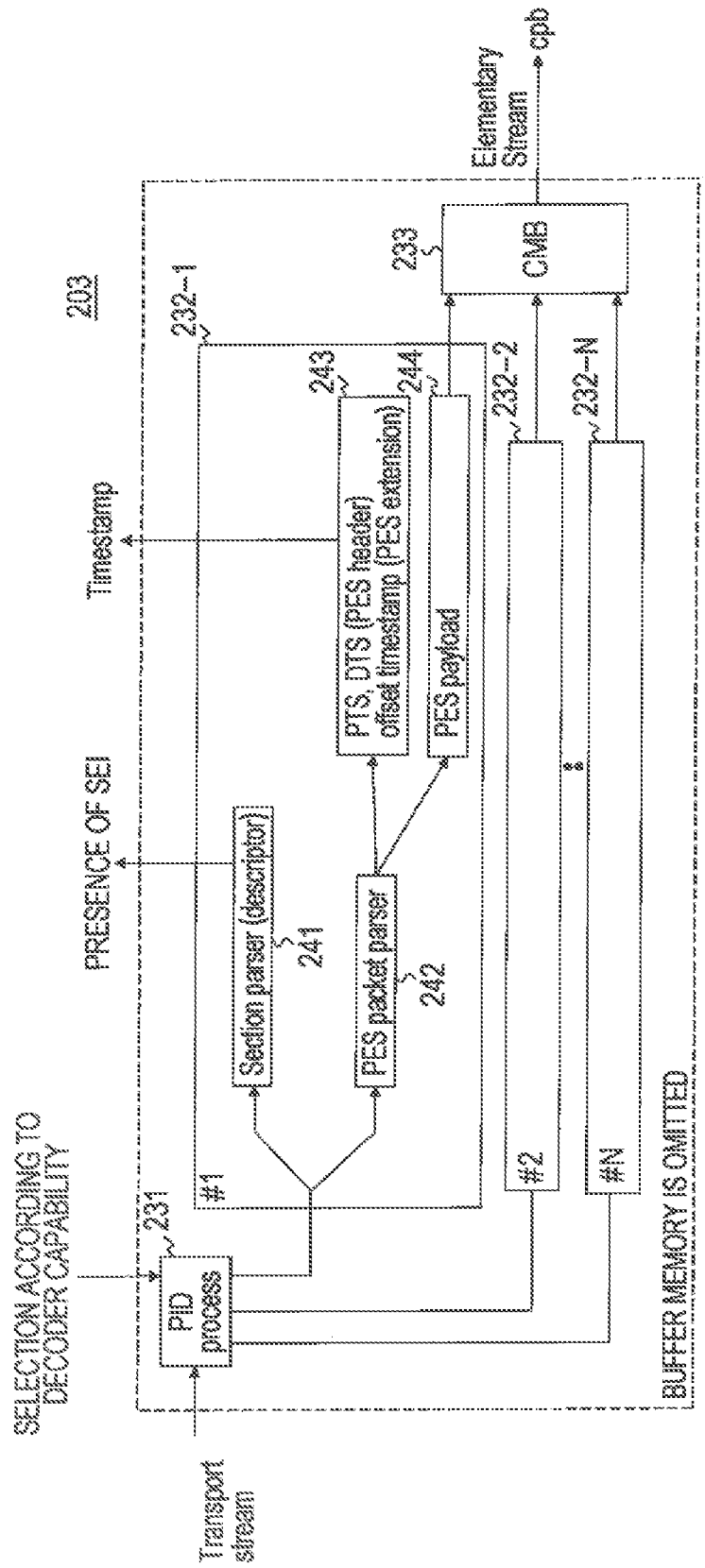
FIG. 38 is a block diagram illustrating an exemplary configuration of a demultiplexer.

FIG. 38 illustrates an exemplary configuration of the demultiplexer 203. The demultiplexer 203 includes a PID processing unit 231, N stream processing units 232-1 to 232-N, and a stream combining unit 233. The PID processing unit 231 performs filtering based on the packet identifier (PID) according to the decoding capability, and extracts a predetermined number of video streams including at least the base stream. The video streams extracted by the PID processing unit 231 are transferred to the corresponding stream processing units. For example, the stream processing unit 232-1 processes the base stream, and the stream processing units 232-2 to 232-N process the enhancement stream.

The stream processing unit 232-1 includes a section parser 241, a PES packet parser 242, a PES header extracting unit 243, and a PES payload extracting unit 244. The section analyzing unit 241 analyzes section data of a target video stream, acquires presence information of the AU timing control SEI in the encoded image data based on, for example, the temporal control descriptor, and transfers the presence information to the CPU 201.

The PES packet analyzing unit 242 analyzes the PES packet. The PES header extracting unit 243 acquires the PTS and the DTS inserted into the header and the offset time stamp inserted in the PES extension based on the analysis of the PES packet analyzing unit 242, and transfers the PTS, the DTS, and the offset time stamp to the CPU 201. The CPU 201 corrects the PTS and the DTS based on the offset time stamp, and decides the decoder timing or the display timing. The PES payload extracting unit 244 extracts the encoded image data of the picture included in the PES payload based on the analysis of the PES packet analyzing unit 242, and transfers the extracted encoded image data to the stream combining unit 233.

The stream processing units 232-2 to 232-N extract the encoded image data of the picture included in the ES payload by performing the same process as the stream processing unit 232-1, and transfer the extracted encoded image data to the stream combining unit 233. The stream combining unit 233 combines the encoded image data of the respective pictures transferred from the stream processing units 232-1 to 232-N, and transfers the combined encoded image data to the compressed data buffer (cpb) 204 as a single video stream (elementary video stream).

Figure 39:
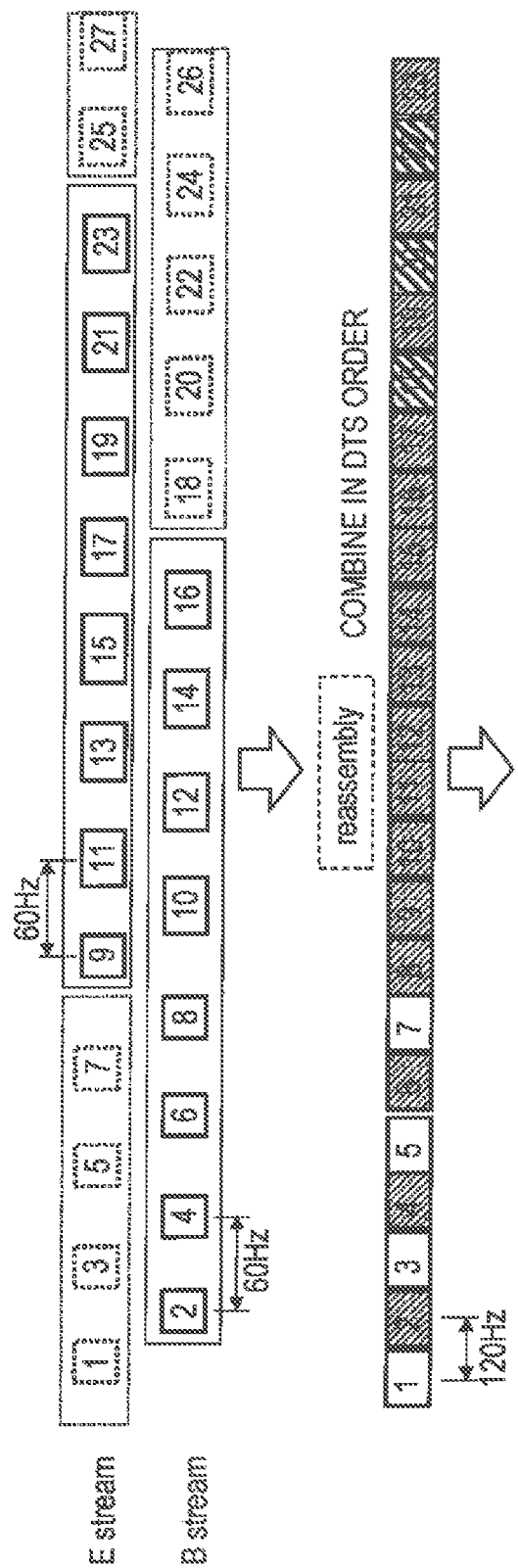
FIG. 39 is a diagram illustrating an example of stream combining.

In this case, the stream combining unit 233 combines the video streams (encoded streams) to be output from a target layer selecting unit 252 into one. The encoded image data of the respective pictures are combined into one stream based on decoding timing information. FIG. 39 illustrates an example of stream combining. In this example, the pictures of the base stream arranged at intervals of 60 Hz are combined with the pictures of the enhancement stream at intervals of 60 Hz. In this case, the respective pictures are regarded as one stream having a time stamp of 120 Hz.

Figure 40:
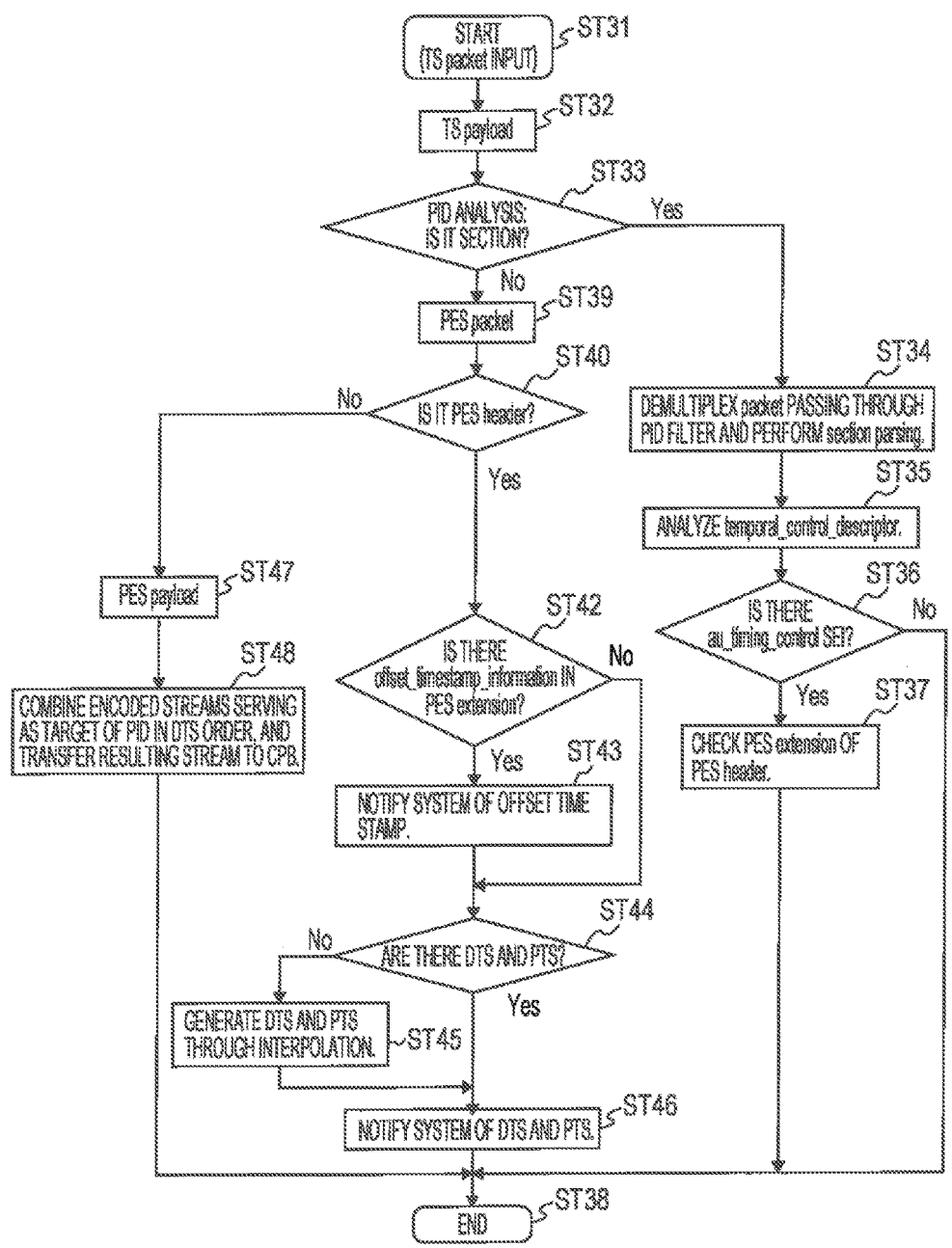
FIG. 40 is a diagram illustrating an example of a process flow of the demultiplexer.

FIG. 40 illustrates an example of a process flow of the demultiplexer 203. In step ST31, the demultiplexer 203 starts the process, and then, in step ST32, the demultiplexer 203 extracts a TS payload. Then, in step ST33, the demultiplexer 203 performs PID analysis, and determines whether or not the TS payload is a section. When the TS payload is determined to be a section, in step ST34, the demultiplexer 203 demultiplexes packets passing through a corresponding PID filter, and performs section parsing.

Then, in step ST35, the demultiplexer 203 analyzes the temporal control descriptor (Temporal_control_descriptor). Then, in step ST36, the demultiplexer 203 determines whether or not there is the AU timing control SEI (au_timing_control SEI). When there is the AU timing control SEI, in step ST37, the demultiplexer 203 checks the PES extension of the PES header.

After the process of step ST37, the demultiplexer 203 proceeds to step ST38 and ends the process. Further, when it is determined in step ST36 that there is the AU timing control SEI, the demultiplexer 203 immediately proceeds to step ST38, and ends the process.

Further, when the TS payload is determined not to be a section in step ST33, in step ST39, the demultiplexer 203 extracts the PES packet. Then, in step ST40, the demultiplexer 203 determines whether or not the PES packet is the PES header. When the PES packet is the PES header, in step ST42, the demultiplexer 203 determines whether or not there is the offset time stamp information (offset_timestamp_information) in the PES extension.

When there is the offset type stamp information, in step ST43, the demultiplexer 203 notifies a system, that is, the CPU 201 of the offset time stamp (offset_to_DTS and offset_to_PTS). Thereafter, the demultiplexer 203 proceeds to the process of step ST44. When it is determined in step ST42 that there is no offset time stamp information, the demultiplexer 203 immediately proceeds to the process of step ST44.

In step ST44, the demultiplexer 203 determines whether or not there are a DTS and a PTS. When there are the DTS and the PTS, the demultiplexer 203 proceeds to the process of step ST46. On the other hand, when there is neither the DTS nor the PTS, in step ST45, the demultiplexer 203 generates the DTS and the PTS through the interpolation, and then proceeds to the process of step ST46. In step ST46, the demultiplexer 203 notifies the system, that is, the CPU 201 of the DTS and the PTS. Thereafter, the demultiplexer 203 proceeds to step ST38, and ends the process.

Further, when it is determined in step ST40 that the PES packet is not the PES header, in step ST47, the demultiplexer 203 extracts the PES payload. Then, in step ST48, the demultiplexer 203 combines the encoded streams serving as the target of the PID in the DTS order, and transfers the resulting stream to the compressed data buffer (cpb) 204. Thereafter, the demultiplexer 203 proceeds to step ST38, and ends the process.

Referring to FIG. 37, the compressed data buffer (cpb) 204 temporarily accumulates the video stream (encoded stream) extracted by the demultiplexer 203. The decoder 205 extracts the encoded image data of the pictures of the layer designated as the layer to be decoded from the video streams accumulated in the compressed data buffer 204. Then, the decoder 205 decodes the extracted encoded image data of each picture at the decoding timing of the picture, and transfers the decoded image data to the uncompressed data buffer (dpb) 206.

Here, in the decoder 205, the layer to be decoded is designated by temporal_id from the CPU 201. The designated layer is all the layers included in the video stream (encoded stream) extracted by the demultiplexer 203 or some layers at the low layer side and set automatically by the CPU 201 or according to the user's operation. Further, the decoding timing is allocated to the decoder 205 from the CPU 201 based on the DTS. When decoding the encoded image data of each picture, the decoder 205 reads the image data of the referenced picture from the uncompressed data buffer 206 as necessary and uses the image data.

Figure 41:
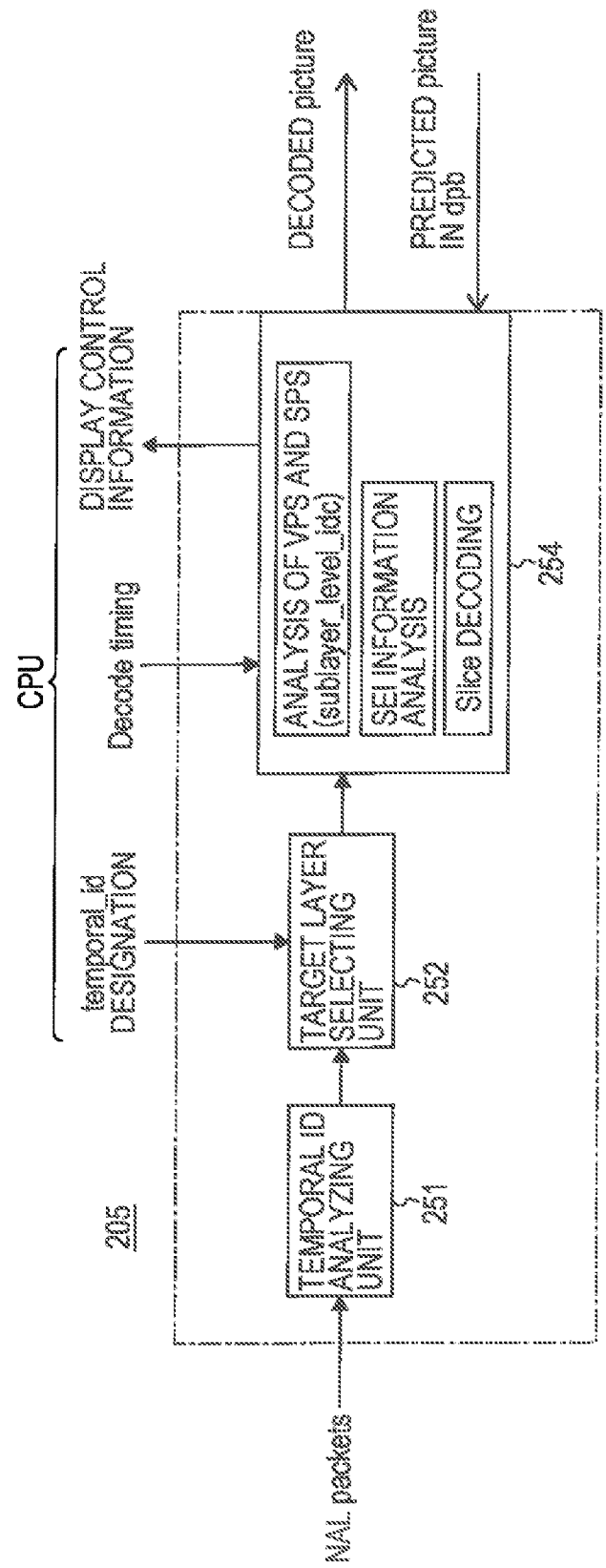
FIG. 41 is a block diagram illustrating an exemplary configuration of a decoder.

FIG. 41 illustrates an exemplary configuration of the decoder 205. The decoder 205 includes a temporal ID analyzing unit 251, the target layer selecting unit 252, and a decoding unit 254. The temporal ID analyzing unit 251 reads the video stream (encoded stream) accumulated in the compressed data buffer 204, and analyzes temporal_id inserted into the NAL unit header of the encoded image data of each picture.

The target layer selecting unit 252 extracts the encoded image data of the pictures of the layer designated as the layer to be decoded from the video stream read from the compressed data buffer 204 based on the analysis result of the temporal ID analyzing unit 251. The encoded image data of each picture extracted by the target layer selecting unit 252 is transferred to the decoding unit 254. The decoding unit 254 sequentially decodes the encoded image data of each picture at the decoding timing, and transfers the decoded image data to the uncompressed data buffer (dpb) 206.

In this case, the decoding unit 254 analyzes the VPS and the SPS, detects, for example, the level designation value "sublayer_level_idc" of the bit rate of each sublayer, and checks whether or not the decoding can be performed within the decoding capability. In this case, the decoding unit 254 further analyzes the SEI, detects, for example, "initial_cpb_removal_time" and "cpb_removal_delay," and checks the decoding timing given from the CPU 201 is appropriate.

Further, the decoding unit 254 analyzes the AU timing control SEI (au_timing_control SEI), and transfers the included display control information to the CPU 201. The CPU 201 controls reading of each picture from the compressed data buffer (dpb) 206 based on the display control information, and implements the display of the "display image 2" or the "display image 3" in the sequence switching portion as described above (see FIG. 12, FIG. 14, and FIGS. 18 to 25).

Further, when decoding the slice, the decoding unit 254 acquires "ref_idx_10_active (ref_idx_11_active)" as information indicating a prediction destination in the time direction from the slice header, and performs prediction in the time direction. The decoded picture is processed as a reference by other pictures using "short_term_ref_pic_set_idx," or "it_idx_sps" obtained from the slice header as an index.

Referring back to FIG. 37, the uncompressed data buffer (dpb) 206 temporarily accumulates the image data of each picture decoded by the decoder 205. The post-processing unit 207 performs a process of adjusting the frame rates of the image data of the pictures sequentially read from the uncompressed data buffer (dpb) 206 at the display timing according to the display capability. In this case, the display timing is given from the CPU 201 based on the PTS.

For example, when the frame rate of the image data of the decoded pictures is 120 fps, and the display capability is 120 fps, the post-processing unit 207 transfers the image data of the decoded pictures to the display without change. Further, for example, when the frame rate of the image data of the decoded pictures is 120 fps, and the display capability is 60 fps, the post-processing unit 207 performs a sub-sampling process so that the resolution in the time direction for the image data of the decoded pictures is ½ times, and transfers the image data of 60 fps to the display.

Further, for example, when the frame rate of the image data of the decoded pictures is 60 fps, and the display capability is 120 fps, the post-processing unit 207 performs an interpolation process so that the resolution in the time direction for the image data of the decoded pictures is double, and transfers the image data of 120 fps to the display. Further, for example, when the frame rate of the image data of the decoded pictures is 60 fps, and the display capability is 60 fps, the post-processing unit 207 transfers the image data of the decoded pictures to the display without change.

Figure 42:
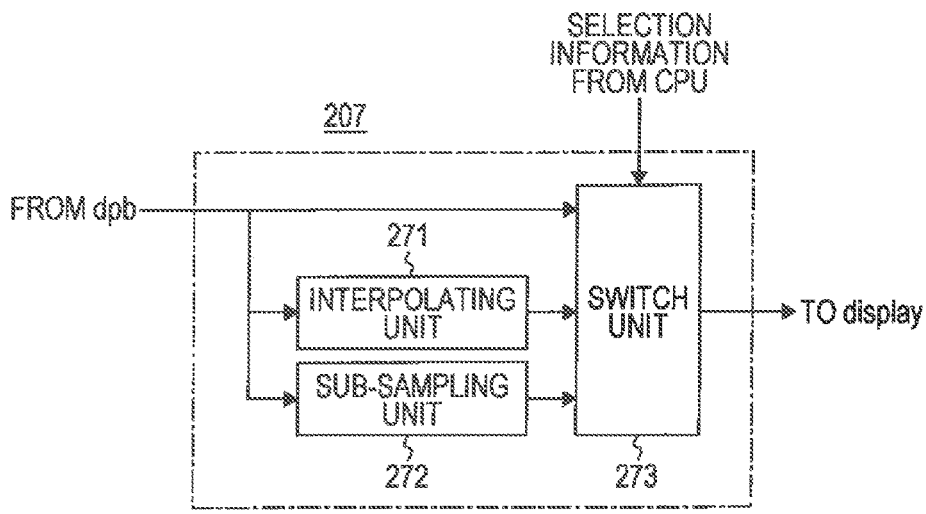
FIG. 42 is a diagram illustrating an exemplary configuration of a post-processing unit.

FIG. 42 illustrates an exemplary configuration of the post-processing unit 207. This example is an example in which it is possible to deal with the case in which the frame rate of the image data of the decoded pictures is 120 fps or 60 fps, and the display capability is 120 fps or 60 fps.

The post-processing unit 207 includes an interpolating unit 271, a sub-sampling unit 272, and a switch unit 273. The image data of the decoded pictures from the uncompressed data buffer 206 is input to the switch unit 273 directly, after the frame rate becomes double through the interpolating unit 271, or after the frame rate becomes ½ times through the sub-sampling unit 272.

Selection information is supplied from the CPU 201 to the switch unit 273. The CPU 201 generates the selection information automatically with reference to the display capability or according to the user's operation. The switch unit 273 selectively outputs any one of the inputs based on the selection information. As a result, the frame rate of the image data of the pictures sequentially read from the uncompressed data buffer (dpb) 206 at the display timing is adjusted to the display capability.

Figure 43:
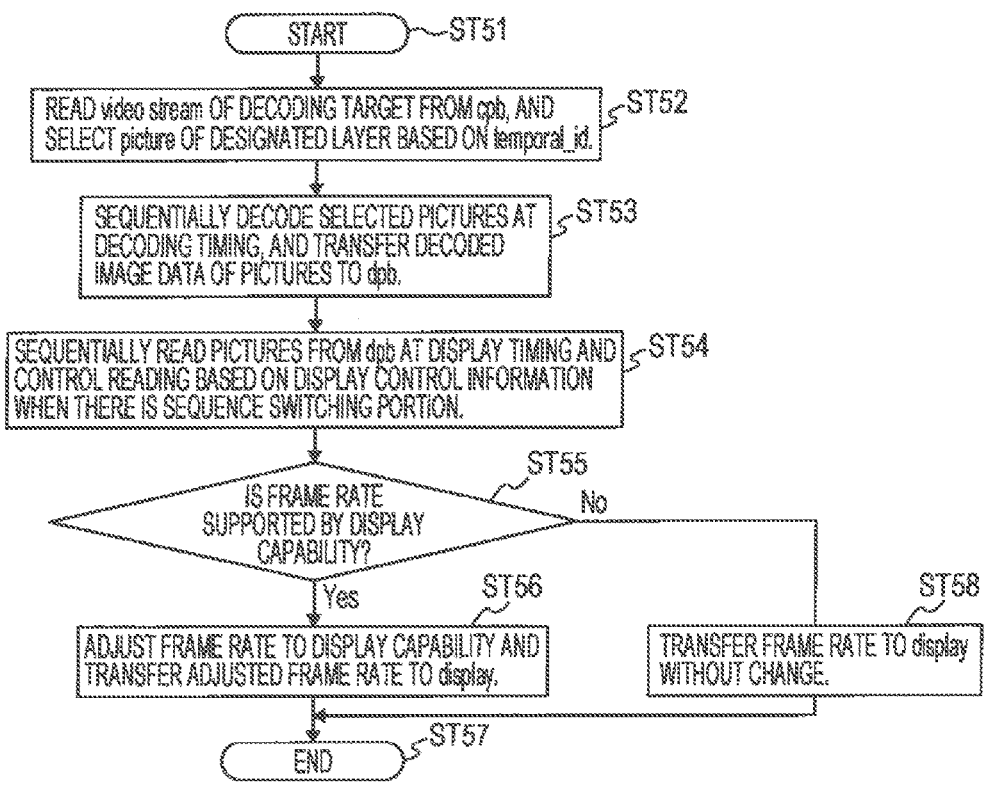
FIG. 43 is a diagram illustrating an example of a process flow of the decoder and the post-processing unit.

FIG. 43 illustrates an example of a process flow of the decoder 205 and the post-processing unit 207. In step ST51, the decoder 205 and the post-processing unit 207 start the process, and then proceed to the process of step ST52. In step ST52, the decoder 205 reads the video stream of the decoding target accumulated in the compressed data buffer (cpb) 204, and selects the picture of the layer designated as the decoding target from the CPU 201 based on temporal_id.

Then, in step ST53, the decoder 205 sequentially decodes the encoded image data of the selected pictures at the decoding timing, transfers the image data of the decoded pictures to be temporarily accumulated in the uncompressed data buffer (dpb) 206. Then, in step ST54, the post-processing unit 207 reads the image data of the pictures from the uncompressed data buffer (dpb) 206 at the display timing.

At this time, when there is the sequence switching portion, the reading is controlled based on the display control information. The reading control includes reading timing control for implementing the "display image 2" in addition to repetition control and skip control for implementing the "display image 3" as described above. Further, as the display control information, of course, the AU timing control SEI (au_timing_control SEI) can be used, but the offset type stamp information (offset_timestamp_information) and the AU presentation control (au_presentation_control) included in the PES extension may be used.

Then, in step ST55, the post-processing unit 207 determines whether or not the frame rate of the read image data of the pictures matches the display capability. When the frame rate does not match the display capability, in step ST56, the post-processing unit 207 adjusts the frame rate to the display capability and transfers the adjusted frame rate to the display, and thereafter, in step ST57, the process ends. On the other hand, when the frame rate matches the display capability, in step ST58, the post-processing unit 207 transfers the frame rate to the display without change, and then, in step ST57, the process ends.

An operation of the reception device 200 of FIG. 37 will briefly be described. The receiving unit 202 demodulates the RF modulation signal received through the reception antenna, and acquires the transport stream TS. The transport stream TS is transferred to the demultiplexer 203. The demultiplexer 203 performs the PID filtering on all or some video streams from the transport stream TS according to the decoding capability (the decoder temporal layer capability).

For example, when the decoding capability is high, all the video streams of the base stream and the enhancement stream are selected. Further, for example, when the decoding capability is low, a predetermined number of video streams including the decodable layer and the base stream are selected. Then, the encoded image data of the pictures of the selected video streams are transferred from the demultiplexer 203 to be temporarily accumulated in the compressed data buffer (cpb) 204.

The decoder 205 extracts the encoded image data of the pictures of the layer designated as the layer to be decoded from the video streams accumulated in the compressed data buffer 204. Then, the decoder 205 decodes the extracted encoded image data of the respective picture at the decoding timing of the corresponding picture, transfers the extracted encoded image data to be temporarily accumulated in the uncompressed data buffer (dpb) 206. In this case, when the encoded image data of the pictures are decoded, the image data of the referenced picture is read from the uncompressed data buffer 206 and used as necessary.

The image data of the pictures sequentially read from the uncompressed data buffer (dpb) 206 at the display timing is transferred to the post-processing unit 207. The post-processing unit 207 performs the interpolation or the sub-sampling for adjusting the frame rate of the image data of the pictures to the display capability on the image data of the pictures. The image data of the pictures processed by the post-processing unit 207 is supplied to the display, and the moving image configured with the image data of the pictures is displayed.

As described above, in the transceiving system 10 illustrated in FIG. 1, at the transmission side, when the switching portion at which the sequence of video streams to be transmitted is switched from the first sequence to the second sequence having a different frame rate from the first sequence is provided, the display control information is inserted into at least the encoded image data of the picture corresponding to the switching portion and/or the PES extension and then transmitted. Thus, for example, at the reception side, it is possible to control the reading of the image data of the pictures from the uncompressed data buffer based on the display control information, and it is possible perform an excellent display without incurring the display gap even when the frame rate changes dynamically.

Further, in the transceiving system 10 illustrated in FIG. 1, at the transmission side, the identification information identifying the last picture of the first sequence is inserted into the encoded image data of the last picture of the first sequence and/or the PES extension. Thus, for example, when the switching portion at which a sequence of video streams to be transmitted is switched from the first sequence to the second sequence having a different frame rate from the first sequence is provided, the reception side can easily identify the last picture of the first sequence based on the identification information.

Further, in the transceiving system 10 illustrated in FIG. 1, at the transmission side, the identification information identifying whether or not the display control information gets inserted into the encoded image data is inserted into the layer of the container. Thus, for example, at the reception side, it is possible to easily identify whether or not the display control information gets inserted into the encoded image data based on the identification information without performing the decoding process on the encoded image data.

Further, in the transceiving system 10 illustrated in FIG. 1, at the reception side, the image data of each picture obtained by the decoding is taken into the buffer, and when the image data of each picture is read and output at a predetermined timing, the reading is controlled based on the display control information inserted into the encoded image data and/or the PES extension. Thus, it is possible to perform an excellent display without incurring a display gap, for example, even when the frame rate changes dynamically.

<2. Modified Examples>

In the above embodiment, at the transmission side, the display control information is inserted into the encoded image data and/or the PES extension, and at the reception side, the display control is performed based on the display control information. However, even when the display control information is not inserted into the encoded image data and/or the PES extension, the reception side is considered to detect the sequence switching portion of the transmitted video streams and perform the same display control. In this case, for example, it is possible to obtain the display period of time from "clock_tick" and "time_scale" of the VPS or the SPS and detect the sequence switching portion based on the change in the display period of time.

Further, in the above embodiment, the transceiving system 10 includes the transmission device 100 and the reception device 200, but a configuration of a transceiving system to which the present technology can be applied is not limited thereto. For example, a portion of the reception device 200 may have a set-top box and a monitor which are connected through a digital interface such as High-Definition Multimedia Interface (HDMI). Here, "HDMI" is a registered trademark.

Further, the above embodiment has been described in connection with the example in which the container is the transport stream (MPEG-2 TS). However, the present technology can similarly be applied to a system having a configuration delivered to a reception terminal using a network such as the Internet as well. In the Internet delivery, the delivery is often performed through a container having MP4 or any other format. In other words, containers having various formats such as a transport stream (MPEG-2 TS) employed in a digital broadcasting standard or MP4 used in the Internet delivery are used as the container.

Further, the above embodiment has been described in connection with the example in which the encoding is performed so that the decoding intervals of the encoded image data of the pictures of the lowest layer set are equal intervals, but the present technology is not necessarily limited thereto, and the encoding has only to be performed at predetermined intervals.

Further, the present technology may have the following configuration.

(1) A transmission device, including:
an image encoding unit that classifies image data of pictures configuring moving image data into a plurality of layers, encodes the image data of the pictures of each of the classified layers, divides the plurality of layers into a predetermined number of layer sets, and generates the predetermined number of video streams including the encoded image data of the pictures of divided layer sets, respectively, the image encoding unit performing the encoding so that at least decoding intervals of the encoded image data of the pictures of the lowest layer set are predetermined intervals;
a transmitting unit that transmits a container of a predetermined format including at least a video stream having the encoded image data of the pictures of the lowest layer set among the predetermined number of generated video streams; and
an information inserting unit that, when a switching portion at which a sequence of the video streams to be transmitted is switched from a first sequence to a second sequence having a different frame rate from the first sequence is provided, inserts display control information into at least encoded image data of a picture corresponding to the switching portion or a packet containing the encoded image data.

(2) The transmission device according to (1),
wherein the display control information is information for performing control such that a display of a last picture of the first sequence is repeated by a predetermined number or for controlling a display period of time of the last picture of the first sequence such that a display of pictures of the second sequence is skipped.

(3) The transmission device according to (1),
wherein the display control information is display offset information for controlling a display timing of pictures of the second sequence.

(4) The transmission device according to (1),
wherein the container is a transport stream, and
the information inserting unit inserts the display control information into an extension field of a PES packet.

(5) The transmission device according to any of (1) to (4),
wherein the information inserting unit further inserts identification information identifying a last picture of the first sequence into encoded image data of the last picture of the first sequence.

(6) The transmission device according to any of (1) to (5), further including
an identification information inserting unit that inserts identification information identifying whether or not the display control information gets inserted into the encoded image data into a layer of the container.

(7) The transmission device according to (6),
wherein the container is a transport stream, and
the identification information inserting unit inserts the identification information into a video elementary stream loop arranged in association with each of the predetermined number of video streams under a program map table as a descriptor.

(8) The transmission device according to any of (1) to (7),
wherein the image encoding unit performs the encoding so that decoding timings of the encoded image data of the pictures of a layer set positioned to be higher than the lowest layer set are intermediate timings of decoding timings of the encoded image data of the pictures of all layer sets positioned to be lower than the layer set.

(9) A transmission method, including:

an image encoding step of classifying image data of pictures configuring moving image data into a plurality of layers, encoding the image data of the pictures of each of the classified layers, dividing the plurality of layers into a predetermined number of layer sets, and generating the predetermined number of video streams each of which includes the encoded image data of the pictures of each divided layer set, the image encoding step including performing the encoding so that at least decoding intervals of the encoded image data of the pictures of the lowest layer set are predetermined intervals;

a transmission step of transmitting, by a transmitting unit, a container of a predetermined format including at least a video stream having the encoded image data of the pictures of the lowest layer set among the predetermined number of video streams generated in the image encoding step; and an information insertion step of, when a switching portion at which a sequence of the video streams to be transmitted is switched from a first sequence to a second sequence having a different frame rate from the first sequence is provided, inserting display control information into at least encoded image data of a picture corresponding to the switching portion or a packet containing the encoded image data.

(10) A reception device, including:

a receiving unit that receives at least a video stream having encoded image data of pictures of a lowest layer set among a predetermined number of video streams including encoded image data of pictures of layer sets, respectively, the predetermined number of video streams being obtained by classifying image data of pictures configuring moving image data into a plurality of layers, encoding the plurality of layers, and dividing the plurality of layers into the predetermined number of layer sets; and a processing unit that processes the received video stream, wherein at least the video stream having the encoded image data of the pictures of the lowest layer set among the predetermined number of video streams is encoded so that decoding intervals of the pictures are predetermined intervals, and when a switching portion at which a sequence of the received video stream is switched from a first sequence to a second sequence having a different frame rate from the first sequence is provided, display control information is inserted into at least encoded image data of a picture corresponding to the switching portion or a packet containing the encoded image data.

(11) The reception device according to (10), wherein the display control information is information for performing control such that a display of a last picture of the first sequence is repeated by a predetermined number or for controlling a display period of time of the last picture of the first sequence such that a display of pictures of the second sequence is skipped.

(12) The reception device according to (10), wherein the display control information is display offset information for controlling a display timing of pictures of the second sequence.

(13) A reception device, including:

a receiving unit that receives a container of a predetermined format including at least a video stream having encoded image data of pictures of a lowest layer set among a predetermined number of video streams including encoded image data of pictures of layer sets, respectively, the predetermined number of video streams being obtained by classifying image data of pictures configuring moving image data into a plurality of layers, encoding the plurality of layers, and dividing the plurality of layers into the predetermined number of layer sets, wherein at least the video stream having the encoded image data of the pictures of the lowest layer set among the predetermined number of video streams is encoded so that decoding intervals of the pictures are predetermined intervals, and when a switching portion at which a sequence of the video stream included in the received container is switched from a first sequence to a second sequence having a different frame rate from the first sequence is provided, display control information is inserted into at least encoded image data of a picture corresponding to the switching portion or a packet containing the encoded image data;

an image decoding processing unit that selectively decodes the encoded image data of the picture of a layer equal to or lower than a predetermined layer according to a decoding capability from the video stream included in the received container, takes image data of the pictures obtained by the decoding in a buffer, and reads and outputs the image data of the pictures at a predetermined timing; and a control unit that controls reading of images of the pictures from the buffer in the image decoding processing unit based on the display control information.

(14) The reception device according to (13), wherein the display control information is information for performing control such that a display of a last picture of the first sequence is repeated by a predetermined number or for controlling a display period of time of the last picture of the first sequence such that a display of pictures of the second sequence is skipped.

(15) The reception device according to (13), wherein the display control information is display offset information for controlling a display timing of pictures of the second sequence.

(16) A reception device, including:

a receiving unit that receives a container of a predetermined format including at least a video stream having encoded image data of pictures of a lowest layer set among a predetermined number of video streams including encoded image data of pictures of layer sets, respectively, the predetermined number of video streams being obtained by classifying image data of pictures configuring moving image data into a plurality of layers, encoding the plurality of layers, and dividing the plurality of layers into the predetermined number of layer sets, at least the video stream having the encoded image data of the pictures of the lowest layer set among the predetermined number of video streams being encoded so that decoding intervals of the pictures are predetermined intervals;

a sequence switching detecting unit that detects a switching portion at which a sequence of the video stream is switched from a first sequence to a second sequence having a different frame rate from the first sequence based on the video stream included in the received container;

an image decoding processing unit that selectively decodes the encoded image data of the picture of a layer equal to or lower than a predetermined layer according to a decoding capability from the video stream included in the received container, takes image data of the pictures obtained by the decoding in a buffer, and reads and outputs the image data of the pictures at a predetermined timing; and a control unit that controls reading of images of the pictures from the buffer in the image decoding processing unit based on a detection output of the sequence switching detecting unit.

One of the main features of the present technology lies in that when the sequence of video streams to be transmitted is switched from the first sequence to the second sequence having the different frame rate from the first sequence, the display control information is inserted into at least the encoded image data of the picture corresponding to the switching portion or the PES extension, and thus even when the frame rate changes dynamically, the reception side can perform the excellent display (see FIG. 36).

REFERENCE SIGNS LIST

10 Transceiving system
100 Transmission device
101 CPU
102 Encoder
103 Compressed data buffer (cpb)
104 Multiplexer
105 Transmitting unit
121 Temporal ID generating unit
122 Buffer delay control unit
123 HRD setting unit
124 Parameter set/SEI encoding unit
125 Slice encoding unit
126 NAL packetizing unit
142 Section coding unit
143-1 to 143-N PES packetizing unit
144 Switch unit
145 Transport packetizing unit
200 Reception device
201 CPU
202 Receiving unit
203 Demultiplexer
204 Compressed data buffer (cpb)
205 Decoder
206 Uncompressed data buffer (dpb)
207 Post-processing unit
231 PID processing unit
232-1 to 232-N Stream processing unit
233 Stream combining unit
241 Section parser
242 PES packet parser
243 PES header extracting unit
244 PES payload extracting unit
251 Temporal ID analyzing unit
252 Target layer selecting unit
254 Decoding unit
271 Interpolating unit
272 Sub-sampling unit
273 Switch unit

The invention claimed is:

1. A transmission device, comprising:
a central processing unit (CPU) configured to:
classify image data of a plurality of pictures into a plurality of layers, wherein the image data of the plurality of pictures configures moving image data;
encode the image data of the plurality of pictures of each of the plurality of layers;
divide the plurality of layers into a specific number of layer sets based on the encoded image data of the plurality of pictures; and
generate a specific number of video streams based on the specific number of layer sets, wherein
the specific number of video streams includes the encoded image data of the plurality of pictures of the specific number of layer sets,
the image data of the plurality of pictures is encoded so that a decoding timing of the encoded image data of the plurality of pictures of a lowest layer set of the specific number of layer sets is a specific timing,
the decoding timing of the encoded image data of the plurality of pictures of a first layer set of the specific number of layer sets is an intermediate timing of the decoding timing of the encoded image data of the plurality of pictures of a plurality of layer sets of the specific number of layer sets, and
the plurality of layer sets is at a first position lower than the first layer set; and
an antenna configured to transmit a container of a specific format, wherein
the container includes at least one video stream of the specific number of video streams, and
the at least one video stream has the encoded image data of the plurality of pictures of the lowest layer set, wherein the CPU is further configured to:
insert display control information into at least one of encoded image data of a last picture of the plurality of pictures or a packet containing the encoded image data of the plurality of pictures, based on a switching portion at which a first sequence of a plurality of video streams of the specific number of video streams for transmission is switched to a second sequence of the plurality of video streams, wherein
the last picture corresponds to the switching portion,
the first sequence of the plurality of video streams includes the last picture of the plurality of pictures, and
a frame rate of the second sequence is different from a frame rate of the first sequence; and
control, based on the display control information, a display timing of specific pictures, of the plurality of pictures, of the second sequence such that a display of the last picture of the first sequence is repeated by a specific number.

2. The transmission device according to claim 1, wherein the CPU is further configured to control, based on the display control information, a display period of time of the last picture of the first sequence such that a display of the specific pictures of the second sequence is skipped.

3. The transmission device according to claim 1, wherein the container is a transport stream, and
the CPU is further configured to insert the display control information into an extension field of a PES packet.

4. The transmission device according to claim 1, wherein the CPU is further configured to insert identification information, that identifies the last picture of the first sequence, into the encoded image data of the last picture of the first sequence.

5. The transmission device according to claim 1, wherein the CPU is further configured to insert identification information into a layer of the container, and
the identification information identifies insertion of the display control information into the encoded image data of the plurality of pictures.

6. The transmission device according to claim 5, wherein the container is a transport stream, and
the CPU is further configured to insert the identification information into a video elementary stream loop arranged in association with each of the specific number of video streams under a program map table as a descriptor.

7. The transmission device according to claim 1, wherein the encoded image data of the plurality of pictures of the first layer set is at a second position higher than the lowest layer set.

8. A transmission method, comprising:
classifying image data of a plurality of pictures into a plurality of layers, wherein the image data of the plurality of pictures configures moving image data;
encoding the image data of the plurality of pictures of each of the plurality of layers;
dividing the plurality of layers into a specific number of layer sets based on the encoded image data of the plurality of pictures;
generating a specific number of video streams based on the specific number of layer sets, wherein
the specific number of video streams includes the encoded image data of the plurality of pictures of the specific number of layer sets,
the image data of the plurality of pictures is encoded such that a decoding timing of the encoded image data of the plurality of pictures of a lowest layer set of the specific number of layer sets is a specific timing,
the decoding timing of the encoded image data of the plurality of pictures of a first layer set of the specific number of layer sets is an intermediate timing of the decoding timing of the encoded image data of the plurality of pictures of a plurality of layer sets of the specific number of layer sets, and
the plurality of layer sets is at a position lower than the first layer set;
controlling an antenna to transmit a container of a specific format, wherein
the container includes at least one video stream of the specific number of video streams, and
the at least one video stream has the encoded image data of the plurality of pictures of the lowest layer set;
inserting display control information into at least one of encoded image data of a last picture of the plurality of pictures or a packet containing the encoded image data of the plurality of pictures, based on a switching portion at which a first sequence of a plurality of video streams of the specific number of video streams for transmission is switched to a second sequence of the plurality of video streams, wherein
the last picture corresponds to the switching portion,
the first sequence of the plurality of video streams includes the last picture of the plurality of pictures, and
a frame rate of the second sequence is different from a frame rate of the first sequence; and
controlling, based on the display control information, a display timing of specific pictures, of the plurality of pictures, of the second sequence such that a display of the last picture of the first sequence is repeated by a specific number.

9. A reception device, comprising:
a receiver configured to receive at least one video stream of a specific number of video streams from a transmission device, wherein
the specific number of video streams includes encoded image data of a plurality of pictures of each layer set of a specific number of layer sets, the specific number of video streams is generated by classifying image data of the plurality of pictures into a plurality of layers, dividing the plurality of layers into the specific number of layer sets, and encoding the image data of the plurality of pictures of each of the plurality of layers,
the received at least one video stream comprises the encoded image data of the plurality of pictures of a lowest layer set of the specific number of layer sets, and
the image data of the plurality of pictures configures moving image data; and
a central processing unit (CPU) configured to
process the received at least one video stream, wherein the at least one video stream is encoded so that a decoding timing of the encoded image data of the plurality of pictures is a specific timing,
display control information is inserted into at least one of encoded image data of a last picture of the plurality of pictures or a packet containing the encoded image data of the plurality of pictures, based on a switching portion at which a first sequence of the received at least one video stream is switched to a second sequence of the received at least one video stream, wherein
the first sequence includes the last picture of the plurality of pictures,
a display timing of specific pictures, of the plurality of pictures, of the second sequence is controlled based on the display control information such that a display of the last picture of the first sequence is repeated by a specific number,
the last picture corresponds to the switching portion,
a frame rate of the second sequence is different from a frame rate of the first sequence,
the decoding timing of the encoded image data of the plurality of pictures of a first layer set of the specific number of layer sets is an intermediate timing of the decoding timing of the encoded image data of the plurality of pictures of a plurality of layer sets of the specific number of layer sets, and
the plurality of layer sets is at a position lower than the first layer set.

10. The reception device according to claim 9, wherein a display period of time of the last picture of the plurality of pictures of the first sequence is controlled based on the display control information such that a display of the specific pictures of the second sequence is skipped.

11. The reception device according to claim 9, wherein the display control information is display offset information to control the display timing of the specific pictures of the second sequence.

12. reception device, comprising:
a receiver configured to receive a container of a specific format including at least one video stream of a specific number of video streams from a transmission device, wherein
the specific number of video streams includes encoded image data of a plurality of pictures of each layer set of a specific number of layer sets,
the specific number of video streams is generated by classifying image data of the plurality of pictures into a plurality of layers, dividing the plurality of layers into the specific number of layer sets, and encoding the image data of the plurality of pictures of each of the plurality of layers, the received at least one video stream comprises the encoded image data of the plurality of pictures of a lowest layer set of the specific number of layer sets, the at least one video stream is encoded so that a decoding timing of the encoded image data of the plurality of pictures is a specific timing, display control information is inserted into at least one of encoded image data of a last picture of the plurality of pictures or a packet containing the encoded image data of the plurality of pictures, based on a switching portion at which a first sequence of the at least one video stream, included in the received container, is switched to a second sequence of the at least one video stream, the first sequence includes the last picture of the plurality of pictures, a display timing of specific pictures, of the plurality of pictures, of the second sequence is controlled based on the display control information such that a display of the last picture of the first sequence is repeated by a specific number, the image data of the plurality of pictures configures moving image data, the last picture corresponds to the switching portion, a frame rate of the second sequence is different from a frame rate of the first sequence, the decoding timing of the encoded image data of the plurality of pictures of a first layer set of the specific number of layer sets is an intermediate timing of the decoding timing of the encoded image data of the plurality of pictures of a plurality of layer sets of the specific number of layer sets, and the plurality of layer sets is at a position lower than the first layer set; and a central processing unit (CPU) configured to:

selectively decode the encoded image data of the plurality of pictures of a layer equal to or lower than a specific layer of the plurality of layers based on a decoding capability from the at least one video stream included in the received container;

select the image data of the plurality of pictures obtained by the decode of the encoded image data of the plurality of pictures in a buffer;

read the image data of the plurality of pictures;

output the image data of the plurality of pictures at the specific timing; and control reading of images of the plurality of pictures from the buffer based on the display control information.

13. The reception device according to claim 12, wherein a display period of time of the last picture of the first sequence is controlled based on the display control information such that a display of the specific pictures of the second sequence is skipped.

14. The reception device according to claim 12, wherein the display control information is display offset information to control the display timing of the specific pictures of the second sequence.

15. A reception device, comprising:

a receiver configured to receive a container of a specific format including at least one video stream of a specific number of video streams from a transmission device, wherein the specific number of video streams includes encoded image data of a plurality of pictures of each layer set of a specific number of layer sets, the specific number of video streams is generated by classifying image data of the plurality of pictures into a plurality of layers, dividing the plurality of layers into the specific number of layer sets, and encoding the image data of the plurality of pictures of each of the plurality of layers, the received at least one video stream comprises the encoded image data of the plurality of pictures of a lowest layer set of the specific number of layer sets, the at least one video stream is encoded so that a decoding timing of the encoded image data of the plurality of pictures is a specific timing, the image data of the plurality of pictures configures moving image data, the decoding timing of the encoded image data of the plurality of pictures of a first layer set of the specific number of layer sets is an intermediate timing of the decoding timing of the encoded image data of the plurality of pictures of a plurality of layer sets of the specific number of layer sets, and the plurality of layer sets is at a position lower than the first layer set; and a central processing unit (CPU) configured to:

detect a switching portion at which a first sequence of the at least one video stream is switched to a second sequence of the at least one video stream based on the at least one video stream included in the received container, wherein a frame rate of the second sequence is different from a frame rate of the first sequence, display control information is inserted into at least one of encoded image data of a last picture of the plurality of pictures or a packet containing the encoded image data of the plurality of pictures, based on the switching portion, and a display timing of specific pictures, of the plurality of pictures, of the second sequence is controlled based on the display control information such that a display of the last picture, of the plurality of pictures, of the first sequence is repeated by a specific number;

selectively decode the encoded image data of the plurality of pictures of a layer equal to or lower than a specific layer of the plurality of layers based on a decoding capability from the at least one video stream included in the received container;

select the image data of the plurality of pictures obtained by the decode of the encoded image data of the plurality of pictures in a buffer;

read the image data of the plurality of pictures;

output the image data of the plurality of pictures at the specific timing; and control reading of images of the plurality of pictures from the buffer based on a detection output of the switching of the first sequence to the second sequence.

* * * * *